(12) United States Patent
Sato et al.

(10) Patent No.: US 9,298,414 B2
(45) Date of Patent: Mar. 29, 2016

(54) INFORMATION PROCESSING APPARATUS AND STORAGE MEDIUM

(71) Applicant: SONY CORPORATION, Tokyo (JP)

(72) Inventors: Daisuke Sato, Tokyo (JP); Daisuke Nagano, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/202,282

(22) Filed: Mar. 10, 2014

(65) Prior Publication Data

US 2014/0285400 A1 Sep. 25, 2014

(30) Foreign Application Priority Data

Mar. 25, 2013 (JP) .................................. 2013-061805

(51) Int. Cl.
*G09G 5/00* (2006.01)
*G06F 3/14* (2006.01)

(52) U.S. Cl.
CPC .......... *G06F 3/1446* (2013.01); *G09G 2356/00* (2013.01); *G09G 2358/00* (2013.01)

(58) Field of Classification Search
None
See application file for complete search history.

(56) References Cited

U.S. PATENT DOCUMENTS

2005/0017921 A1* 1/2005 Okude et al. ................... 345/1.1
2011/0199389 A1* 8/2011 Lu et al. ......................... 345/619
2012/0290653 A1* 11/2012 Sharkey ......................... 709/204

FOREIGN PATENT DOCUMENTS

| JP | H08-137417 A | 5/1996 |
| JP | 2001-312346 A | 11/2001 |
| JP | 2005-003732 A | 1/2005 |
| JP | 2006-078648 A | 3/2006 |

* cited by examiner

*Primary Examiner* — Nicholas Lee
(74) *Attorney, Agent, or Firm* — Hazuki International, LLC

(57) ABSTRACT

There is provided an information processing apparatus including a housing which has a polyhedron shape and includes at least one surface on which an output section is provided, a communication section which communicates with at least one mobile terminal, and a control section which performs output control from the output section in cooperation with the mobile terminal by communicating with the mobile terminal.

20 Claims, 40 Drawing Sheets

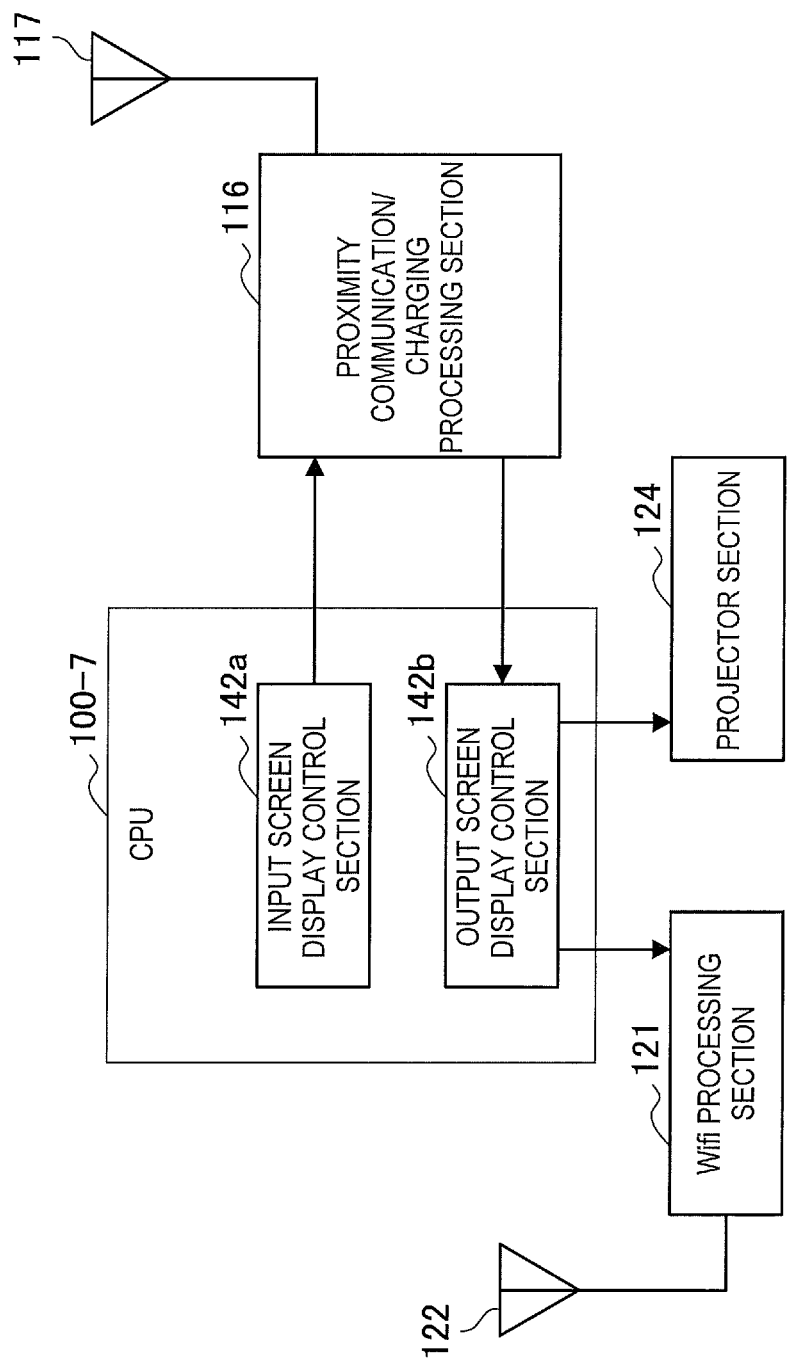

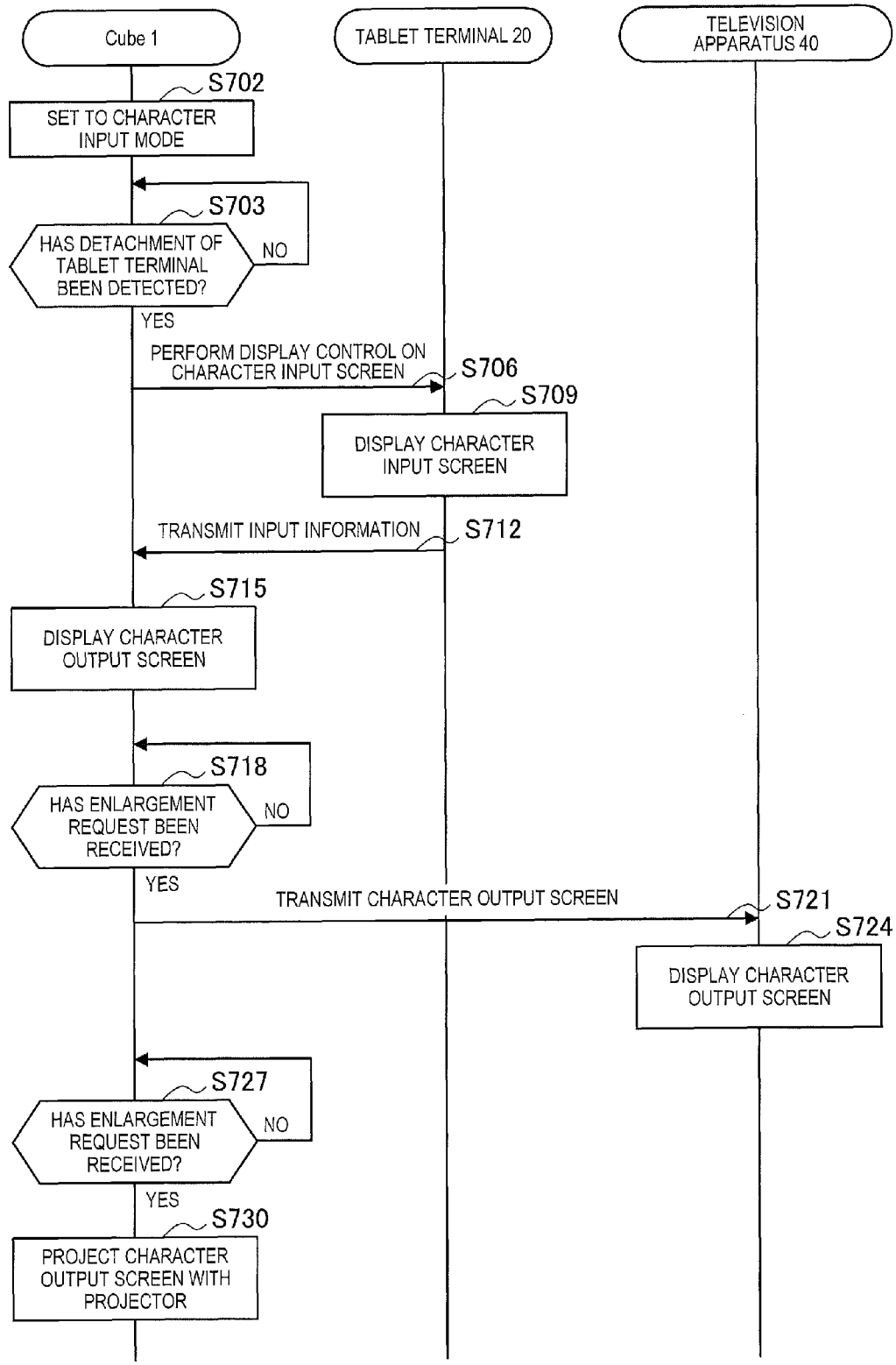

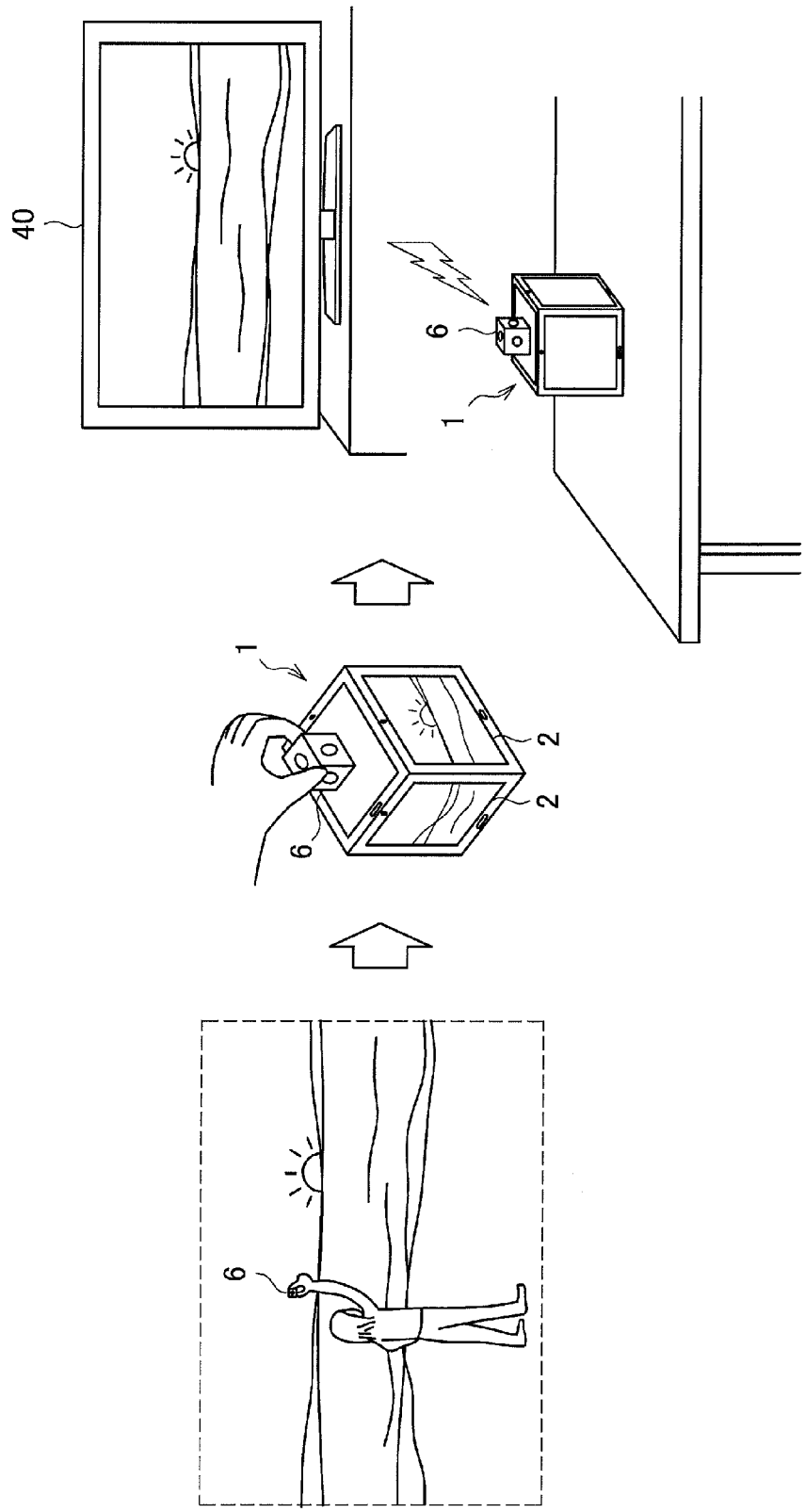

INFORMATION PROCESSING APPARATUS AND STORAGE MEDIUM

CROSS REFERENCE TO RELATED APPLICATION(S)

This application claims the benefit of Japanese Priority Patent Application JP 2013-061805 filed Mar. 25, 2013, the entire contents of which are incorporated herein by reference.

BACKGROUND

The present disclosure relates to an information processing apparatus and a storage medium.

In recent years, display devices and game devices have been proposed which are formed from cubes.

For example, JP H8-137417A discloses a mobile display device with an external shape forming a cube and including liquid crystal display panels on all surfaces, which implements complex games using the plurality of panels and independently displays television signals/video signals on the panels, by a structure which can simultaneously display a plurality of information.

Further, JP 2005-3732A and JP 2006-078648A disclose that display sections are included on all surfaces of a cube.

Further, JP 2001-312346A discloses that screens are each arranged and displayed on plane display panels so as to constitute a cube image.

SUMMARY

However, none of the displays devices in JP H8-137417A, JP 2005-3732A, JP 2006-078648A and JP 2001-312346A, which have display sections included on all surfaces of a cube, consider the point of cooperative operations by communicating with mobile terminals such as tablet terminals, mobile phone terminals or smart phones.

Accordingly, the present disclosure proposes a new and improved information processing apparatus and storage medium capable of performing output control in cooperation with mobile terminals.

According to an embodiment of the present disclosure, there is provided an information processing apparatus including a housing which has a polyhedron shape and includes at least one surface on which an output section is provided, a communication section which communicates with at least one mobile terminal; and a control section which performs output control from the output section in cooperation with the mobile terminal by communicating with the mobile terminal.

According to an embodiment of the present disclosure, there is provided a non-transitory computer-readable storage medium having a program stored therein, the program causing a computer to function as a communication section which communicates with a mobile terminal, and a control section which performs output control from an output section, the output section being provided on a housing which has a polyhedron shape and includes at least one surface, in cooperation with the mobile terminal by communicating with the mobile terminal.

According to embodiments of the present disclosure as described above, output control can be performed in cooperation with mobile terminals.

BRIEF DESCRIPTION OF THE DRAWINGS

FIG. 34 is a block diagram which shows a functional configuration of the CPU according to the seventh embodiment;

FIG. 35 is a flow chart which shows an input/output screen display control process according to the seventh embodiment;

FIG. 38 is a figure for describing cooperative operations between the Cube and an imaging apparatus according to an embodiment of the present disclosure.

DETAILED DESCRIPTION OF THE EMBODIMENT(S)

Figure 1:
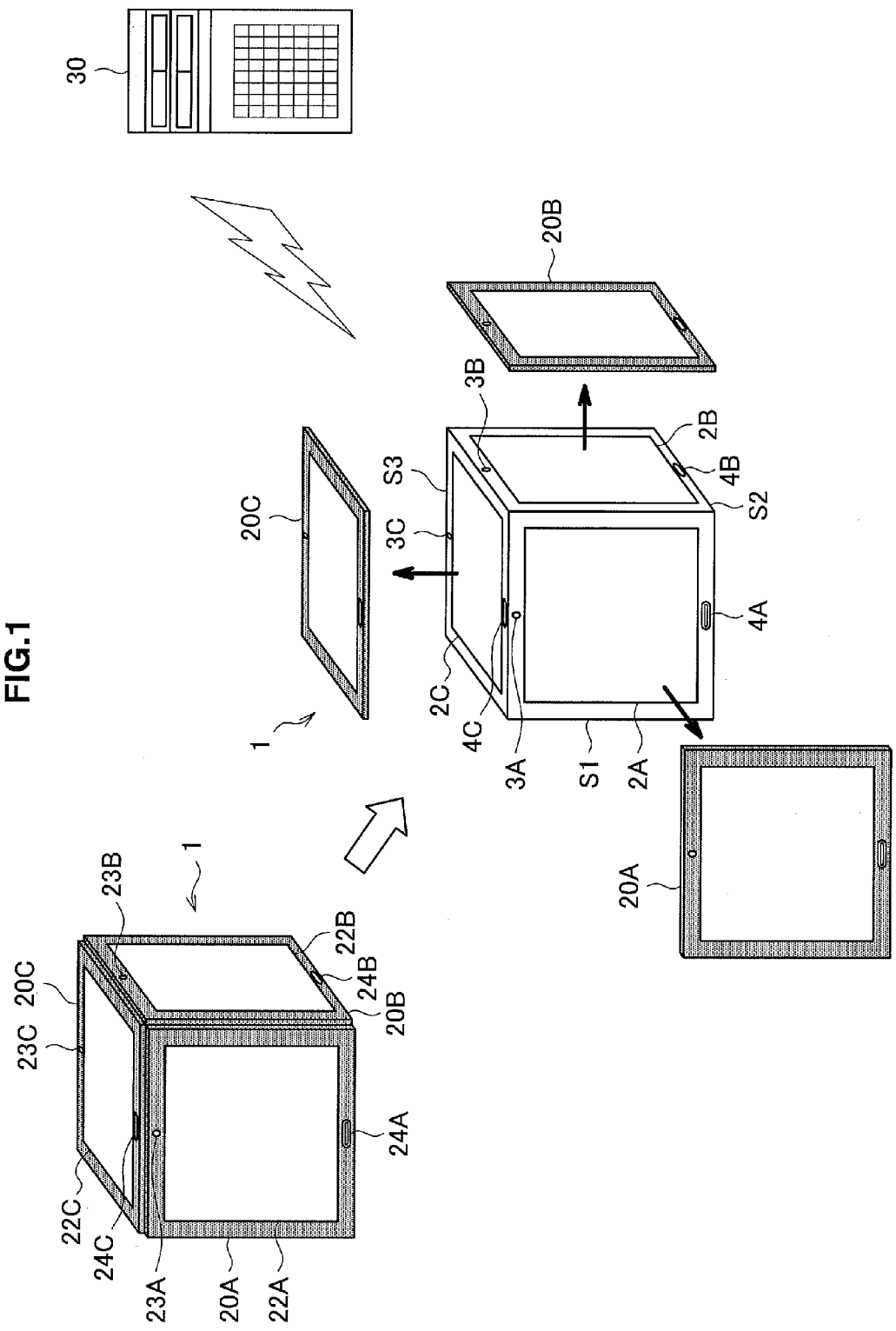
FIG. 1 is a figure for describing an external appearance configuration of a Cube according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the appended drawings, there are cases where a plurality of structural elements that have substantially the same function and structure are distinguished by attaching different letters of the alphabet after the same reference numeral. However, in the case where it is not necessary to particularly distinguish each of the plurality of structural elements having substantially the same function and structure, only the same reference numeral will be attached.

Further, the present disclosure will be described according to the order of items shown below.

1. Outline of the Cube 1
2. Configuration of the Cube 1
3. Each of the Embodiments
 3-1. The First Embodiment
 3-2. The Second Embodiment
 3-3. The Third Embodiment
 3-4. The Fourth Embodiment
 3-5. The Fifth Embodiment
 3-6. The Sixth Embodiment
 3-7. The Seventh Embodiment
4. Supplementation
5. Conclusion 1. Outline of the Cube 1

The technology according to the present disclosure can be executed in various forms, such as described in detail in "3. Each of the Embodiments" as examples. Further, a Cube 1 according to each of the embodiments of the present disclosure, which includes the functions of an information processing apparatus, includes:

A. A polyhedron shaped housing which includes one or more surfaces on which output sections (display section 2, display section 22, speaker 4, speaker 24) are included;

B. A communication section (proximity communication/charging processing section 116) which communicates with mobile terminals (tablet terminals 20); and C. A control section (CPU 100) which performs output control from the output sections in cooperation with the mobile terminals by communicating with the mobile terminals.

Hereinafter, first an outline of such a Cube 1 common to each of the embodiments will be described by referring to FIG. 1.

FIG. 1 is an explanatory diagram which shows an external appearance configuration of the Cube 1 according to an embodiment of the present disclosure. As shown in FIG. 1, the Cube 1 according to an embodiment of the present disclosure is formed from a cube shaped housing which includes one or more surfaces, and has output sections, such as display sections 22A to 22C and speakers (audio output sections) 24A to 24C, and imaging sections 23A to 23C are included on each surface. Note that, the output section units included on each surface may be detachable from the Cube 1, and in this case, such as shown in FIG. 1, the detached output section units can be used as tablet terminals 20A to 20C.

In addition, output sections, such as display sections 2A to 2C and speakers (audio output sections) 4A to 4C, and imaging sections 3A to 3C may be included on each surface of the Cube 1 from which the tablet terminals 20A to 20C have been detached. In this way, in the case where tablet terminals 20 are attached, the Cube 1 can use the display sections 22 and speakers 24 of the tablet terminals 20 as the output sections included on each surface of the Cube 1.

The tablet terminals 20 detachable from the Cube 1 are attached to each surface of the Cube 1 by physical structures using magnets or latches.

Further, while only the upper surface S3 and the side surfaces S1 and S2 of the Cube 1 formed from the cube shaped housing are illustrated in the example shown in FIG. 1, the other side surfaces and the lower surface have a similar configuration.

Further, it is possible for the Cube 1 according to the present embodiment to wirelessly communicate with nearby tablet terminals (including contact and contactless). Here, the tablet terminals which communicate with the Cube 1 may be the tablet terminals 20 detachable from the Cube 1 shown in FIG. 1, or may be undetachable tablet terminals. Further, it is possible for the Cube 1 and the tablet terminals 20 shown in FIG. 1 to wirelessly communicate with a server 30. In this way, it is possible for the Cube 1 to acquire content from the server 30, and to communicate with remotely located tablet terminals 20 via the server 30.

Note that, while the Cube 1 (an information processing apparatus formed from a cube shaped housing) is illustrated in FIG. 1 as an example of an information processing apparatus, the information processing apparatus according to an embodiment of the present disclosure is not limited to a cube shape, and may be a polyhedron shape other than that of a cube.

(Background)

Here, while technology has been proposed in the related art in which a display device formed by a cube displays independent images for each surface, no related art considers the point of cooperative operations by communicating with mobile terminals such as tablet terminals, mobile phone terminals or smart phones.

If a cube display device is able to perform cooperative operations by communicating with mobile terminals, operation controls can be implemented which were not able to be envisioned by the cube display devices of the related art, and the convenience will be improved.

Accordingly, the point of view of this situation led to creating the Cube 1 according to each of the embodiments of the present disclosure. By performing cooperative operations by communicating with nearby tablet terminals (including contact and contactless), the Cube 1 according to each of the embodiments of the present disclosure can implement operation controls which were not able to be envisioned by cube display devices of the related art, and can improve the convenience. Hereinafter, a hardware configuration common to such a Cube 1 according to each of the embodiments of the present disclosure will be described by referring to FIG. 2.

2. Configuration of the Cube 1

Figure 2:
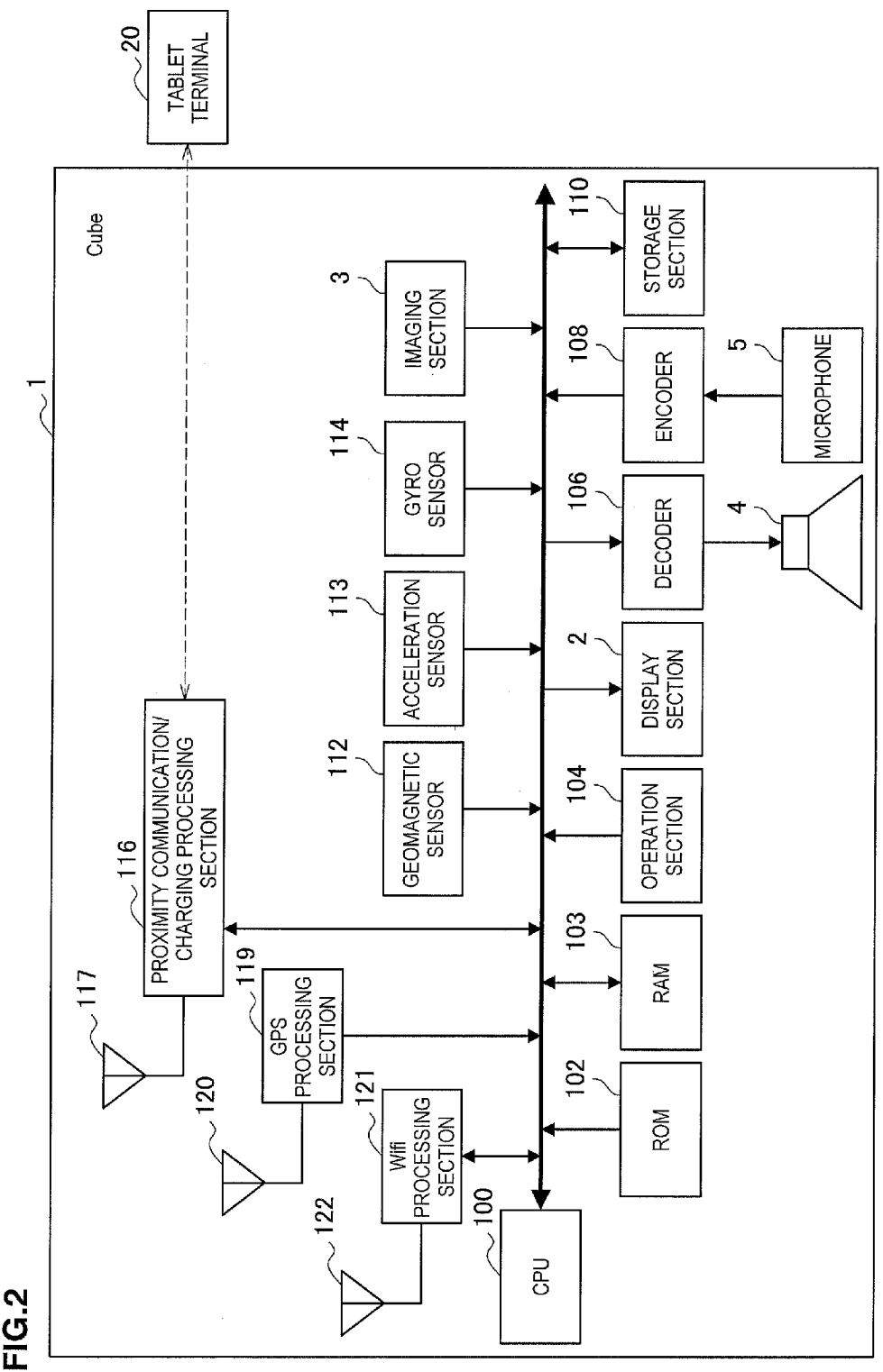
FIG. 2 is block diagram which shows an example of a hardware configuration of the Cube according to an embodiment of the present disclosure.

FIG. 2 is a block diagram which shows an example of a hardware configuration of the Cube 1 according to an embodiment of the present disclosure.

As shown in FIG. 2, for example, the Cube 1 has a proximity communication/charging antenna 117, a proximity communication/charging processing section 116, a GPS antenna 120, a GPS processing section 119, a Wifi antenna 122, a Wifi processing section 121, a geomagnetic sensor 112, an acceleration sensor 113, a gyro sensor 114, an imaging section 3, a CPU (Central Processing Unit) 100, a ROM (Read Only Memory) 102, a RAM (Random Access Memory) 103, an operation section 104, a display section 2, a decoder 106, a speaker 4, an encoder 108, a microphone 5, and a storage section 110.

Note that, the hardware configuration shown here is an example, and a part of the constituent elements, for example, the geomagnetic sensor 112, the acceleration sensor 113, the gyro sensor 114, the encoder 108, the microphone 5, the speaker 4, the imaging section 3 or the display section 2, may be omitted. Further, the Cube 1 can output content from the speakers 24, imaging sections 23 or display sections 22 of the detachably attached tablet terminals 20, and can acquire captured images. Further, the Cube 1 according to the present embodiment may include display sections 2 fixed to at least one surface out of all the surfaces of the Cube 1, and may be configured so that tablet terminals 20 are detachably included on the other surfaces.

Further, it is needless to say that constituent elements other than the constituent elements shown here, for example, a vibration section or a projector section, may be additionally included.

(Proximity Communication/Charging Antenna 117)

The proximity communication/charging antenna 117 connects wirelessly with nearby tablet terminals 20 (including contact and contactless), and is an example of an antenna having a function which performs transmission/reception of data with the tablet terminals 20, and a function which supplies power to the tablet terminals 20. The proximity communication/charging antenna 117 is included on at least one or more surfaces out of all the surfaces of the cube shaped housing which forms the Cube 1, and connects wirelessly with nearby tablet terminals 20. Proximity communication is implemented, for example, by Bluetooth (registered trademark), infrared communication, near field communication or the like. Further, proximity charging is implemented, for example, by an electromagnetic induction system, an electromagnetic wave system, an electromagnetic field resonance system or the like.

Here, in the case where display sections 2 are included on each surface from which the tablet terminals 20 have been detached, interference from magnetic fields can be reduced by setting the proximity communication/charging antenna 117 on the outer portion of each of the display sections 2A to 2C, and including a magnetic material on the rear surface of the tablet terminals 20. Further, the proximity communication/charging antenna 117 is not limited to tablet terminals 20 detachable from the Cube 1, and it is possible, for example, to connect wirelessly with undetachable tablet terminals and to perform transmission/reception of data and to supply power.

(Proximity Communication/Charging Processing Section 116)

The proximity communication/charging processing section 116 has a function which performs various signal process for data transmitted and received by the proximity communication/charging antenna 117, and a function which performs a process for supplying power by the proximity communication/charging antenna 117. For example, the proximity communication/charging processing section 116 outputs device IDs or user IDs received from the tablet terminals 20 to the CPU 100, and transmits content information to the tablet terminals 20 in accordance with control of the CPU 100.

Further, in the case where proximity communication/charging antennas 117 are included on each surface of the Cube 1 from which the tablet terminals 20 have been detached, it is possible for the proximity communication/charging processing section 116 to detect detachment of the tablet terminals 20 from each surface of the Cube 1. Specifically, for example, it is possible for the proximity communication/charging processing section 116 to detect detachment in accordance with the field intensities of the tablet terminals 20. Further, in the case where touch sensors (an example of the operation section 104) are included on each surface, it is possible for the proximity communication/charging processing section 116 to detect detachment in accordance with a detection result by the touch sensors and the possibility of near field communication by the proximity communication/charging antenna 117.

(GPS Antenna 120)

The GPS antenna 120 is an example of an antenna which receives signals from a positioning satellite. The GPS antenna 120 can receive GPS signals from a plurality of GPS satellites, and inputs the received GPS signals into the GPS processing section 119.

(GPS Processing Section 119)

The GPS processing section 119 is an example of a calculation section which calculates position information based on the signals received from the positioning satellite. The GPS processing section 119 calculates present position information based on a plurality of GPS signals input from the GPS antenna 120, and outputs calculated position information. Specifically, the GPS processing section 119 calculates the position of each GPS satellite from orbital data of the GPS satellites, and calculates each distance from each GPS satellite up to this Cube 1, based on a time difference between the transmission time and the reception time of the GPS signals. Also, a three-dimensional present position can be calculated, based on the calculated position of each GPS satellite, and the distance from each GPS satellite up to this Cube 1. Note that, the orbital data of the GPS satellites used here may be included in the GPS signals, for example. Or, the orbital data of the GPS satellites may be acquired from an external server via the Wifi antenna 122.

(Wifi Antenna 122)

The Wifi antenna 122 is an antenna having a function, for example, which transmits/receives communication signals with a wireless LAN (Local Area Network) communication network in accordance with a specification of Wifi (registered trademark). The Cube 1 can be connected with the server 30 on a network, via the Wifi antenna 122. Further, the Wifi antenna 122 can supply the received signals to the CPU 100.

(Wifi Processing Section 121)

The Wifi processing section 121 has a function which performs various signal processes on the signals supplied from the Wifi antenna 122. The Wifi processing section 121 can supply digital signals generated from supplied analog signals to the CPU 100.

(Geomagnetic Sensor 112)

The geomagnetic sensor 112 is a sensor which detects terrestrial magnetism as a voltage value. The geomagnetic sensor 112 may be a three-axial terrestrial magnetism sensor which detects a terrestrial magnetism for each of the X axis direction, the Y axis direction and the Z axis direction. The geomagnetic sensor 112 can supply the detected terrestrial magnetisms data to the CPU 100.

(Acceleration Sensor 113)

The acceleration sensor 113 is a sensor which detects acceleration as a voltage value. The acceleration sensor 113 may be a three-axial acceleration sensor which detects the acceleration along the X-axis direction, the acceleration along the Y-axis direction, and the acceleration along the Z-axis direction. The acceleration sensor 113 can supply the detected acceleration data to the CPU 100.

(Gyro Sensor 114)

The gyro sensor 114 is a type of measuring instrument which detects an angle and angular velocity of an object. This gyro sensor 114 may be a three-axial gyro sensor which detects a velocity (angular velocity), which changes the rotation angle around the X-axis, the Y-axis and the Z-axis, as a voltage value. The gyro sensor 114 can supply the detected angular velocity data to the CPU 100.

(Imaging Section 3)

The imaging section 3 has a function which images still images or moving images via a lens, in accordance with control of the CPU 100. The imaging section 3 may store captured images in the storage section 110.

The imaging section 3 according to the present embodiment is capable of imaging the surroundings of the Cube 1 in all directions. Specifically, as shown in FIG. 1, by including a plurality of imaging section 3A to 3C facing an outer direction, the surroundings of the Cube 1 in all directions can be imaged on each surface of the polyhedron shaped housing which forms the Cube 1. Further, in the case where the tablet terminals 20 are detachably attached to each surface of the Cube 1, it is possible for the Cube 1 to acquire captured images of the surroundings of the Cube 1 in all directions, by using the imaging sections 23A to 23C of the tablet terminals 20.

Further, other than the plurality of imaging sections 3A to 3C shown in FIG. 1, an imaging section 3 according to the present embodiment may be included within the Cube 1, and may be implemented by one 360 degree camera capable of imaging in all directions via each transparent or semi-transparent surface.

(CPU 100)

The CPU 100 functions as a calculation processing apparatus and a control apparatus, and controls all the operations within the Cube 1 in accordance with various programs. Further, the CPU 100 may be a microprocessor. This CPU 100 can implement various functions in accordance with various programs.

Further, by functioning as CPUs 100-1 to 100-7, which will be described later, the CPU 100 can implement each of the operation processes which will be described in the first to seventh embodiments.

(ROM 102, RAM 103)

The ROM 102 can store programs, calculation parameters or the like which are used by the CPU 100. The RAM 103 can temporarily store programs used in the execution of the CPU 100, parameters which arbitrarily change in this execution, or the like.

(Operation Section 104)

The operation section 104 has a function which detects user operations. The operation section 104 is constituted, for example, of an input section for inputting input information by a user, such as touch sensors, buttons, the microphone 5 or switches, provided on each surface of the polyhedron shaped housing, and an input control circuit which generates input signals based on an input by the user and outputs the generated input signals to the CPU 100.

(Display Section 2)

The display section 2 is an example of an output section, is implemented by a liquid crystal display (LCD: Liquid Crystal Display) device, an organic EL (OLED: Organic Light Emitting Diode) display device or the like, and is fixed to a surface of the Cube 1. Further, the display section 2 may be implemented by a touch panel display on which touch sensors (an example of the operation section 104) are layered. The display section 2 according to the present embodiment displays prescribed content, in accordance with control by the CPU 100.

(Decoder 106, Speaker 4)

The decoder 106 has a function which performs decoding and analog conversion or the like of input data, in accordance with control of the CPU 100. For example, the decoder 106 performs decoding and analog conversion or the like of audio data (audio content) input via the Wifi antenna 122 and the Wifi processing section 121, and can output audio signals to the speaker 4. The speaker 4 (audio output section) is an example of an output section, and can output audio based on the audio signals supplied from the decoder 106.

(Encoder 108, Microphone 5)

The encoder 108 has a function which performs digital conversion and encoding or the like of input data, in accordance with control of the CPU 100. The encoder 108 performs digital conversion and encoding or the like of audio signals input from the microphone 5, and can output audio data. The microphone 5 collects audio, and can output the collected audio as audio signals.

(Storage Section 110)

The storage section 110 is an apparatus for data storage, and can include a storage medium, a recording apparatus which records data to the storage medium, a reading apparatus which reads data from the storage medium, and an erasure apparatus which erases the data recorded in the recording medium. Here, for example, a nonvolatile memory such as a flash memory, an MRAM (Magnetoresistive Random Access Memory), an FeRAM (Ferroelectric Random Access Memory), a PRAM (Phase change Random Access Memory) or an EEPROM (Electronically Erasable and Programmable Read Only Memory), or a magnetic recording medium such as an HDD (Hard Disk Drive), may be used as the storage medium.

By having a hardware configuration such as described above, the Cube 1 implements functions which perform operations (display control, audio output control, transmission control or the like) in cooperation with the tablet terminals 20 by communicating with the tablet terminals 20, and can function as the information processing apparatus according to an embodiment of the present disclosure.

To continue, the operations of the Cube 1, which functions as the information processing apparatus according to an embodiment of the present disclosure, will be described in detail by using a plurality of embodiments.

3. Each of the Embodiments 3-1. The First Embodiment

The Cube 1 according to the first embodiment acquires captured images of the surroundings of the Cube 1 by the imaging section 3 fixed to the Cube 1, and can execute a security mode using these captured images. Further, the Cube 1 according to the present embodiment can execute a security mode in cooperation with the tablet terminals 20, in accordance with communication with the tablet terminals 20. Specifically, the Cube 1 starts the execution of a security mode, in the case where one of the tablet terminals 20 is detached from the Cube 1, or based on instructions or the like from the tablet terminals 20. Further, the Cube 1 transfers captured images (surveillance images) to the tablet terminals 20, based on instructions or the like from the tablet terminals 20, performs notification preparation (setting of detection information or notification information), and performs optical camouflage control (displaying a captured image of the opposite surface side on each surface). Hereinafter, a functional configuration of a CPU 100-1 of the Cube 1 according to the present embodiment, which executes such a security mode in cooperation with the tablet terminals 20, will be described by referring to FIG. 3.

(3-1-1. Functional Configuration)

Figure 3:
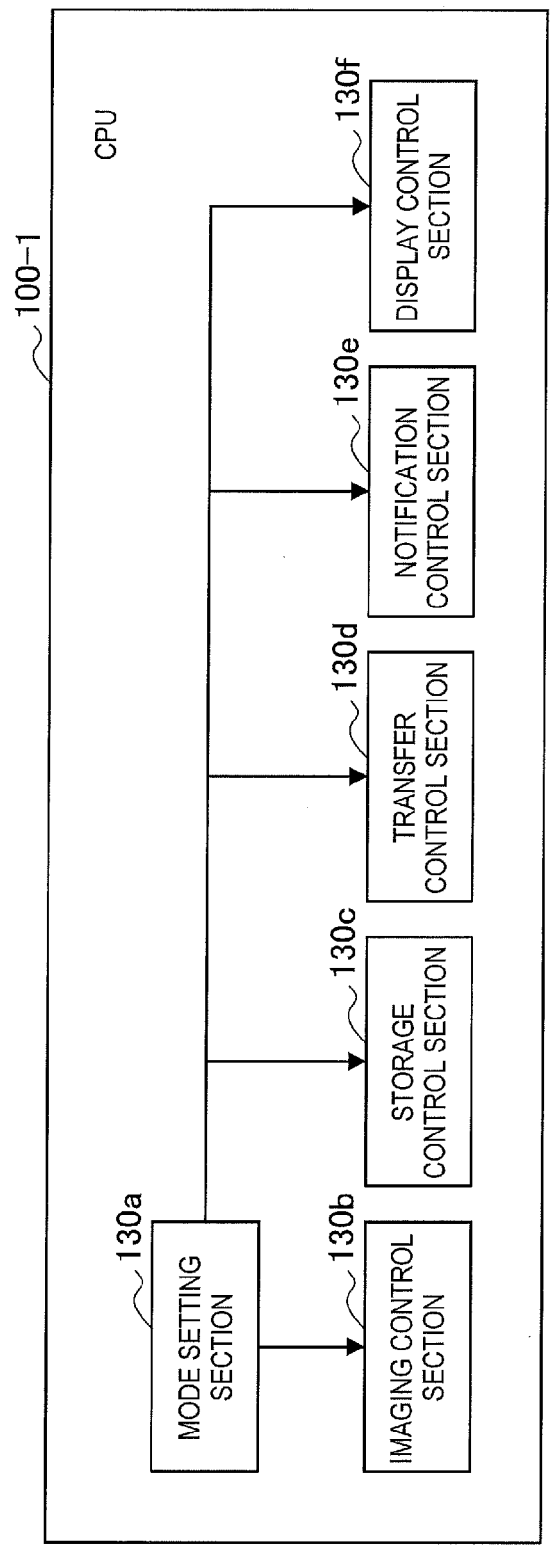
FIG. 3 is a block diagram which shows a functional configuration of a CPU of the Cube according to a first embodiment of the present disclosure.

FIG. 3 is a block diagram which shows a functional configuration of the CPU 100-1 of the Cube 1 according to the first embodiment. As shown in FIG. 3, the CPU 100-1 functions as a mode setting section 130a, an imaging control section 130b, a storage control section 130c, a transfer control section 130d, a notification control section 130e, and a display control section 130f.

The mode setting section 130a has a function which sets a storage mode, a transfer (transmission) mode, a security alarm mode, or an optical camouflage mode as the security mode. Execution start/end of the security mode and switching of each mode by the mode setting section 130a is performed in accordance with a detachment state of the tablet terminals 20 to the Cube 1, instructions from the tablet terminals 20, or user operations from the operation section 104.

The imaging control section 130b sets and controls various parameters (such as imaging direction, imaging range or zoom) related to imaging by the imaging section 3. Further, when the security mode is set by the mode setting section 130a, the imaging control section 130b starts imaging.

In the case where the storage mode is set as the security mode by the mode setting section 130a, the storage control section 130c performs control so that captured images of the surroundings of the Cube 1 captured by the imaging section 3 are stored in the storage section 110. In this way, the Cube 1 according to the present embodiment can function as a surveillance camera.

In the case where the transfer (transmission) mode is set as the security mode by the mode setting section 130a, the transfer control section 130d performs control so that captured images of the surroundings of the Cube 1 captured by the imaging section 3 are transmitted to the tablet terminals 20, via the Wifi processing section 121 and the Wifi antenna 122. In this way, the Cube 1 according to the present embodiment functions as a surveillance camera capable of transferring images, or by displaying the transferred images on the tablet terminals 20, a user can visually recognize the state of the surroundings of the Cube 1, even if the user is in another location. Further, in the case where one of the tablet terminals 20 attached to the Cube 1 has been detached, the transfer control section 130d may perform control so that image transfer is performed automatically to this tablet terminal 20, based on a device ID or user ID corresponding to this tablet terminal 20.

In the case where the security alarm mode is set as the security mode by the mode setting section 130a, the notification control section 130e performs control so that a prescribed notification is performed, in accordance with a detection result of the external conditions. Detection of the external conditions is performed by at least one or a combination of the imaging section 3, the geomagnetic sensor 112, the acceleration sensor 113, the gyro sensor 114, and a motion sensor (infrared sensor, ultrasonic sensor or the like), touch sensor or capacitive sensor (not shown in the figures) included in the Cube 1. A prescribed notification is, for example, an alarm, a siren, a notification to the police or fire department or the like. In this way, the Cube according to the present embodiment can function as a crime prevention/emergency apparatus.

In the case where the optical camouflage mode is set as the security mode by the mode setting section 130a, the display control section 130f performs control so that captured images of the opposite surface side directions are displayed on the display sections 2 included on each surface of the Cube 1. In this way, the Cube 1 according to the present embodiment is made artificially transparent, and can function as a surveillance camera or a crime prevention/emergency apparatus, in a state of not being noticed by an intruder or the like.

Heretofore, a functional configuration of the CPU 100-1 of the Cube 1 according to the present embodiment has been described in detail. To continue, the operation process according to the present embodiment will be described in detail by referring to FIG. 4 to FIG. 6.

(3-1-2. Operation Process)

Figure 4:
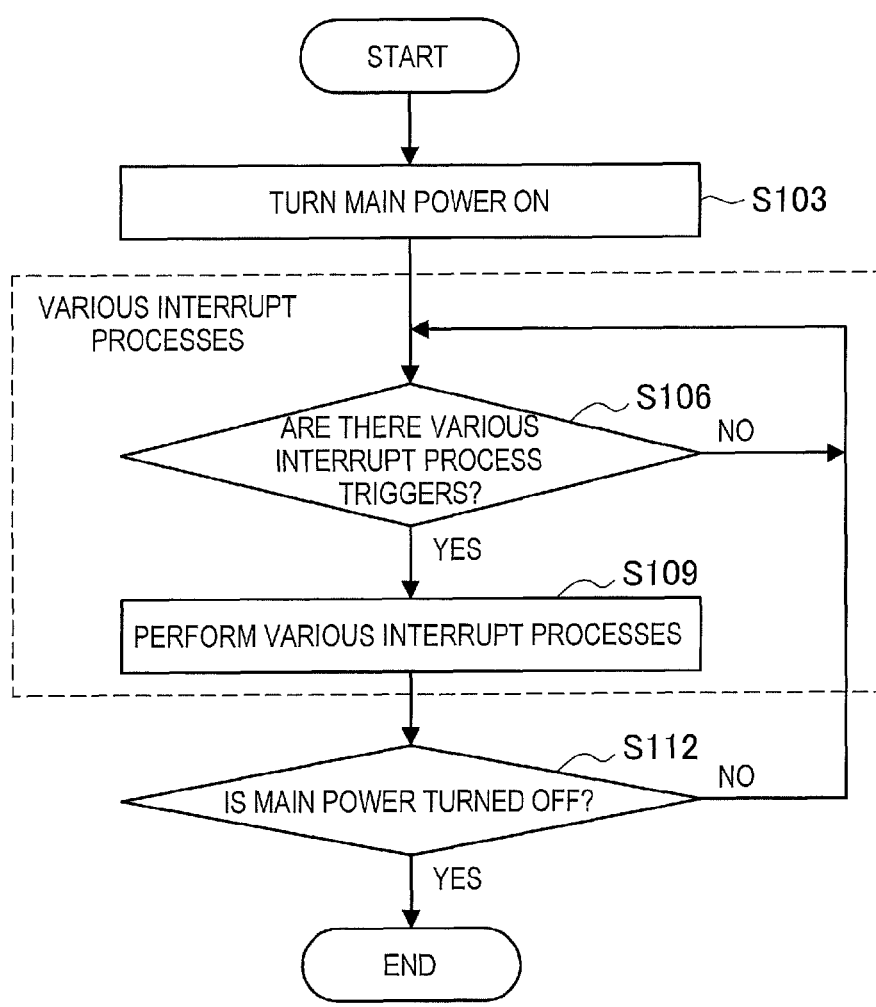
FIG. 4 is a flow chart which shows the basic operations of the Cube according to the first embodiment.

FIG. 4 is a flow chart which shows the basic operations of the Cube 1 according to the first embodiment. As shown in FIG. 4, first in step S103, the main power supply of the Cube 1 is turned ON. Specifically, for example, in the case where an operation is detected for power supply ON, by pressing a button or switch included as an operation section 104 on the Cube 1, the Cube 1 starts.

Next, in step S106, the CPU 100-1 judges whether or not there are various interrupt process triggers.

Next, in the case where there are various interrupt process triggers (S106/Yes), in step S109, the CPU 100-1 executes the various interrupt processes.

Then, in step S112, the above described steps S106 and S109 are repeated up to when the main power supply of the Cube 1 is turned OFF, and when the main power supply of the Cube 1 is turned OFF, the Cube 1 stops. Specifically, for example, an operation is detected for power supply OFF, by again pressing the button or switch included as the operation section 104 on the Cube 1, and the operation process of the Cube 1 ends.

To continue, the various interrupt processes shown in the above described steps S106 and S109 will be described by referring to FIG. 5 and FIG. 6.

Figure 5:
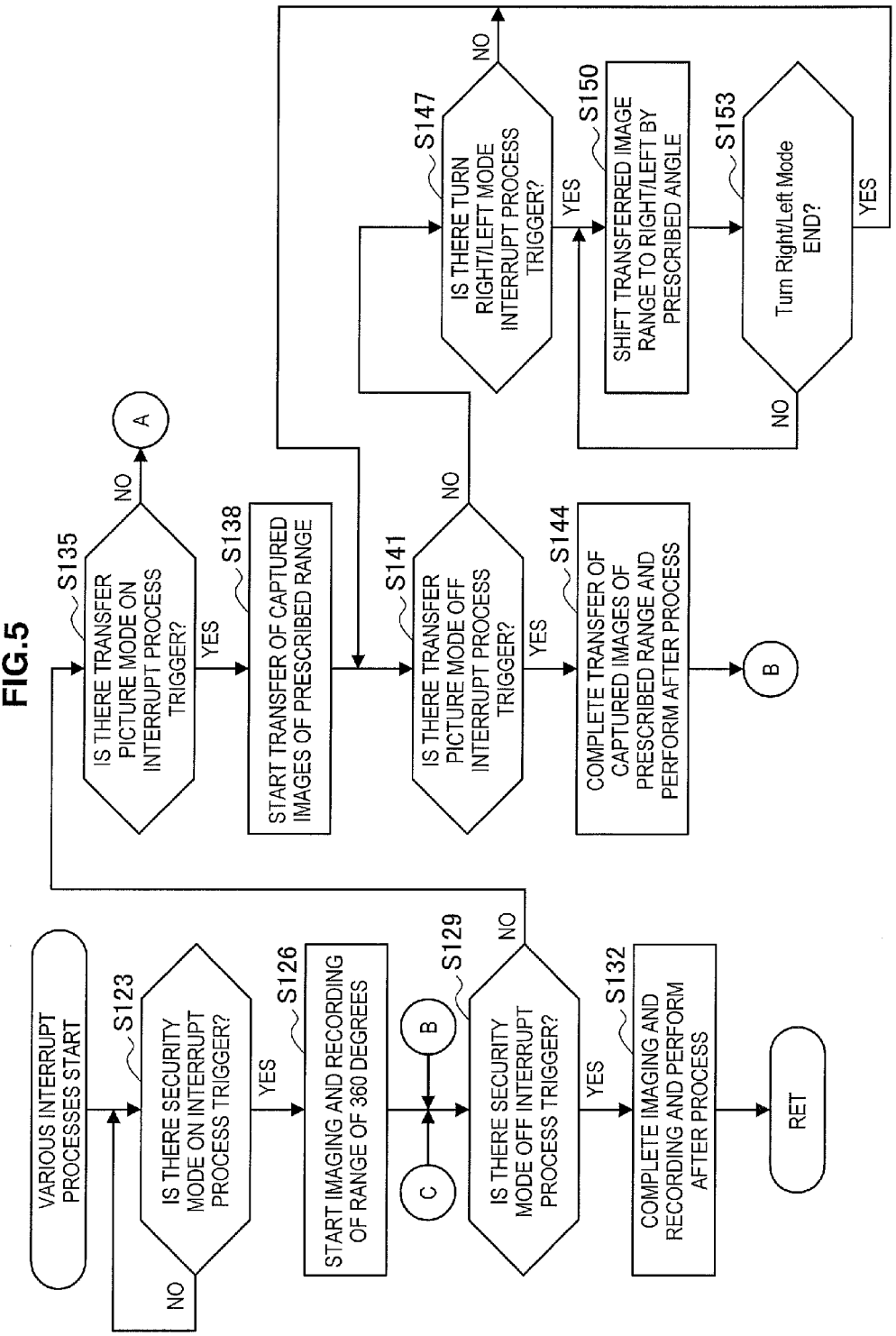
FIG. 5 is a flow chart which shows various interrupt processes in a security mode according to the first embodiment.
Figure 6:
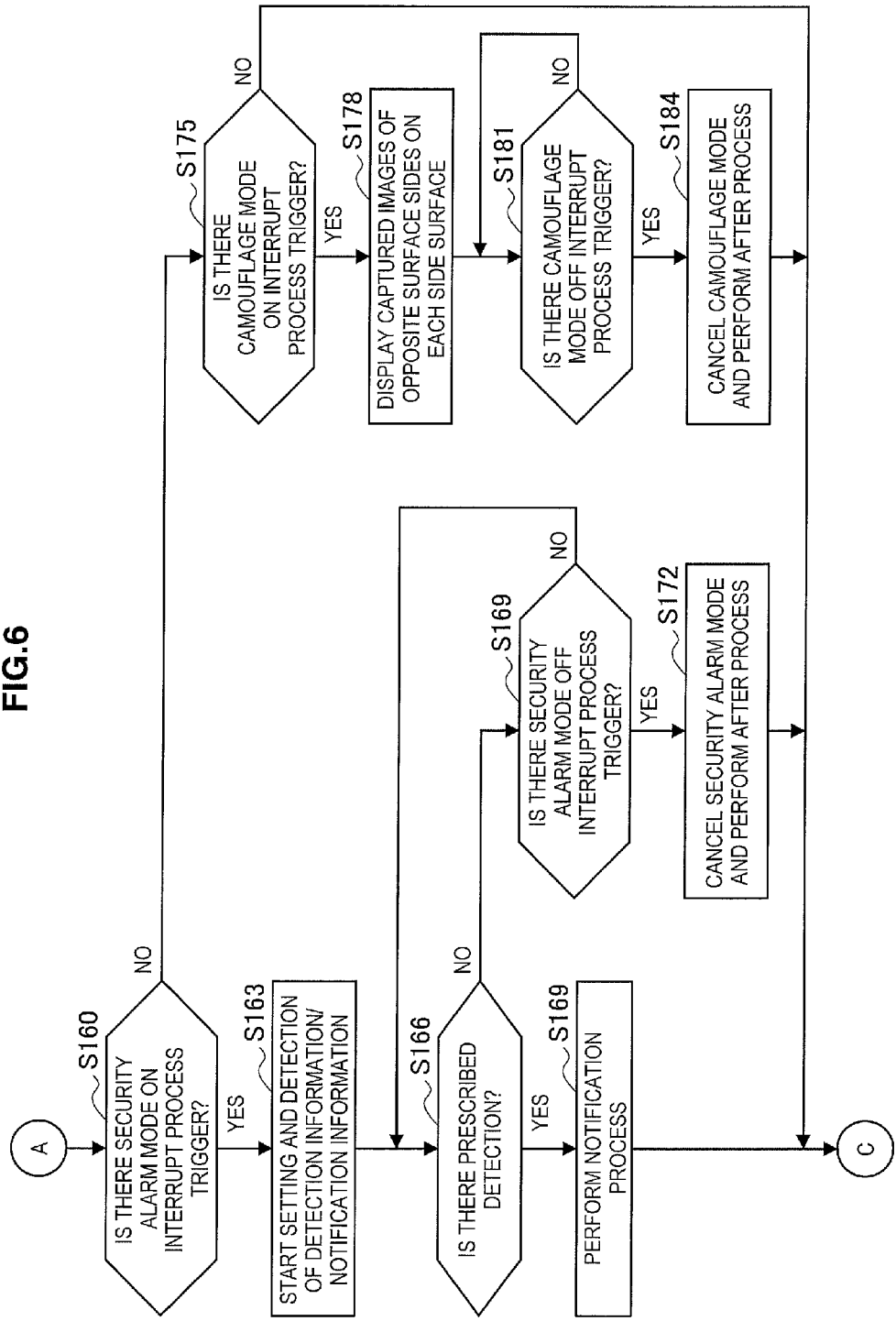
FIG. 6 is a flow chart which shows various interrupt processes in a security mode according to the first embodiment.

FIG. 5 and FIG. 6 are flow charts which show various interrupt processes in the security mode according to the first embodiment. First, in step S123 of FIG. 5, the CPU 100-1 judges whether or not there is a Security Mode ON interrupt process trigger. Specifically, for example, in the case where one of the tablet terminals 20 of a family registered in advance is not discovered even if searched for from the Wifi antenna 122 by connecting to a wireless LAN within the family home, the mode setting section 130a of the CPU 100-1 judges that there is a Security Mode ON interrupt process trigger. Further, in the case where the tablet terminals 20 are detached from all side surfaces (the surfaces other than the upper surface and the lower surface) of the Cube 1, the mode setting section 130a may judge that there is a Security Mode ON interrupt process trigger. Further, in the case where it is judged that there are no people in the surroundings based on an external condition detection result by a 360 degree camera or a motion sensor (not shown in the figures), the mode setting section 130a may judge that there is a Security Mode ON interrupt process trigger. Further, in the case where there is a security mode execution instruction by a user operation from the operation section 104 of the Cube 1, the mode setting section 130a may judge that there is a Security Mode ON interrupt process trigger.

Next, in the case where there is a Security Mode ON interrupt process trigger (S123/Yes), the mode setting section 130a sets the security mode (storage mode), and the imaging control section 130b starts imaging of the surroundings by the imaging section 3. Further, in accordance with the setting of the security mode (storage mode), the storage control section 130c performs control so that captured images captured by the imaging section 3 are stored in the storage section 110. In this way, the Cube 1 according to the present embodiment can function as a surveillance camera.

Next, in the case where there is a Security Mode OFF interrupt process trigger (S129/Yes), in step S132, the mode setting section 130a of the CPU 100-1 turns the Security Mode OFF, and imaging control by the imaging control section 130b and storage control by the storage control section 130c both end. The Security Mode OFF interrupt process trigger is a security mode end instruction or the like, for example, by bringing the tablet terminals 20 of the family registered in advance close to the Cube 1, by attaching the tablet terminals 20 to each side surface of the Cube 1, or by performing manual input from the operation section 104. Further, for example, the CPU 100-1 compresses the captured images stored in the storage section 110, as a process after the security mode is OFF, and allows the compressed captured images to be moved to a prescribed storage region along with the imaging date and time zone.

On the other hand, in the case where there is a Transfer Picture Mode ON interrupt process trigger (S135/Yes), in step S138, the mode setting section 130a sets the transfer picture mode, and the transfer control section 130d starts control which transmits the captured images of a prescribed surrounding captured by the imaging section 3 to the tablet terminals 20. For example, a Transfer Picture Mode ON interrupt process trigger is a transfer picture request from one or a plurality of the tablet terminals 20, or is an instruction or the like manually requested from the operation section 104. The transfer control section 130d transmits captured images of a prescribed surrounding to the tablet terminals 20 originally requesting the transfer picture request, or to the tablet terminals 20 set manually.

Captured images of a prescribed surrounding are captured images captured in the outer direction from at least one surfaces out of all the surfaces which form the Cube 1. For example, the transfer control section 130d may perform control so that the captured images captured in the outer direction from the surface from which one of the tablet terminals 20 has been detached are transmitted to this tablet terminal 20.

In this way, the Cube 1 according to the present embodiment functions as a surveillance camera capable of transferring images, or by displaying the transferred images on the tablet terminals 20, a user can visually recognize the state of the surroundings of the Cube 1, even if the user is in another location.

Next, in the case where there is a Transfer Picture Mode OFF interrupt process trigger (S141/Yes), in step S144, the mode setting section 130a turns the transfer picture mode OFF, and transmission control of captured images by the transfer control section 130d ends. For example, the Transfer Picture Mode OFF interrupt process trigger is a case where there is an image transfer suspension request from one or a plurality of the tablet terminals 20, or a case where a transfer picture mode end instruction is entered manually from the operation section 104. Further, for example, the CPU 100-1 deletes the device IDs and user IDs of the tablet terminals 20 originally requesting the transfer request as a process after the transfer picture mode is OFF.

On the other hand, in the case where there is no Transfer Picture Mode OFF interrupt process trigger (S141/No), and in the case where there is a Turn Right/Left Mode interrupt process trigger (S147/Yes), in step S150, the mode setting section 130a sets a turn right/left mode, and the transfer control section 130d performs control so that the range of the transferred captured images is shifted to the right or left in a prescribed range (by a prescribed angle). For example, in the case where the captured images currently transmitted are captured images captured in the outer direction of one surface out of all the surfaces of a cube shaped housing which forms the Cube 1, the transfer control section 130d performs switching so that the captured images captured in the outer direction from the right vicinity or the left vicinity of this one surface are transmitted. For example, the Turn Right/Left Mode interrupt process trigger is a turn right/left request from one or a plurality of tablet terminals 20, or is an instruction or the like requested manually from the operation section 104.

Then, in step S153, the transfer control section 130d continues turning right/left of the transfer range of the captured images shown in the above described step S150, up to when there is a Turn Right/Left Mode END interrupt process trigger.

Next, in step S160 of FIG. 6, the CPU 100-1 judges whether or not there is a Security Alarm Mode ON interrupt process trigger. For example, the Security Alarm Mode ON interrupt process trigger is a security alarm mode setting request from one or a plurality of tablet terminals 20, or is an instruction or the like requested manually from the operation section 104.

Next, in the case where there is a Security Alarm Mode ON interrupt process trigger (S160/Yes), in step S163, the mode setting section 130*a* sets a security alarm mode, and the notification control section 130*e* performs setting of detection information (detection method, detection conditions or the like) and notification information (notification method, notification conditions or the like), in according with the setting of the security alarm mode, and starts detection. The setting contents of the detection information and the notification information may be initial settings, or may be arbitrarily specified by a user.

The notification control section 130*e* sets a sensor to be used (imaging sensor, motion sensor, acceleration sensor or the like) as a detection method, and sets a condition, such as the case when a suspicious person is detected or a fire is detected, as a detection condition. For example, the case when a suspicious person is detected is a case where a face other than a user registered in advance is recognized by facial recognition, or is the case where a release password has not been entered within a prescribed time period after detecting a person. Further, the notification control section 130*e* sets an output of an alarm or siren, or a notification or the like to the police or fire department, as a notification method, and sets a condition, such as notifying the police department in the case where a release password has not been entered within a prescribed time period after an alarm output, as a notification condition. In this way, the Cube 1 according to the present embodiment can function as a crime prevention/emergency apparatus.

Next, in the case where there is a set prescribed detection (S166/Yes), in step S169, the notification control section 130*e* performs a notification process, in accordance with the set notification information.

On the other hand, in the case where there is a Security Alarm Mode OFF interrupt process trigger (S166/No, S169/Yes), in step S172, the mode setting section 130*a* cancels the security alarm mode, and notification control by the notification control section 130*e* ends. For example, the Security Alarm Mode OFF interrupt process trigger is a case where there has been a notification cancellation request from one or a plurality of the tablet terminals 20, or is a case where a security alarm mode end instruction has been entered manually from the operation section 104. Further, the CPU 100-1 ends detection by various sensors as an after process, and stores a detection history or notification history in the storage section 110.

To continue, in step S175, the CPU 100-1 judges whether or not there is a Camouflage (optical camouflage) Mode ON interrupt process trigger. For example, the Camouflage Mode ON interrupt process trigger is an optical camouflage mode setting request from one or a plurality of the tablet terminals 20, or is an instruction or the like requested manually from the operation section 104.

Next, in the case where there is a Camouflage Mode ON interrupt process trigger (S175/Yes), in step S178, the mode setting section 130*a* sets the optical camouflage mode, and the display control section 130*f* performs control so that captured images of the opposite surface sides are displayed on each surface of the Cube 1, in accordance with the setting of the optical camouflage mode. Here, the optical camouflage mode will be described by referring to FIG. 7.

Figure 7:
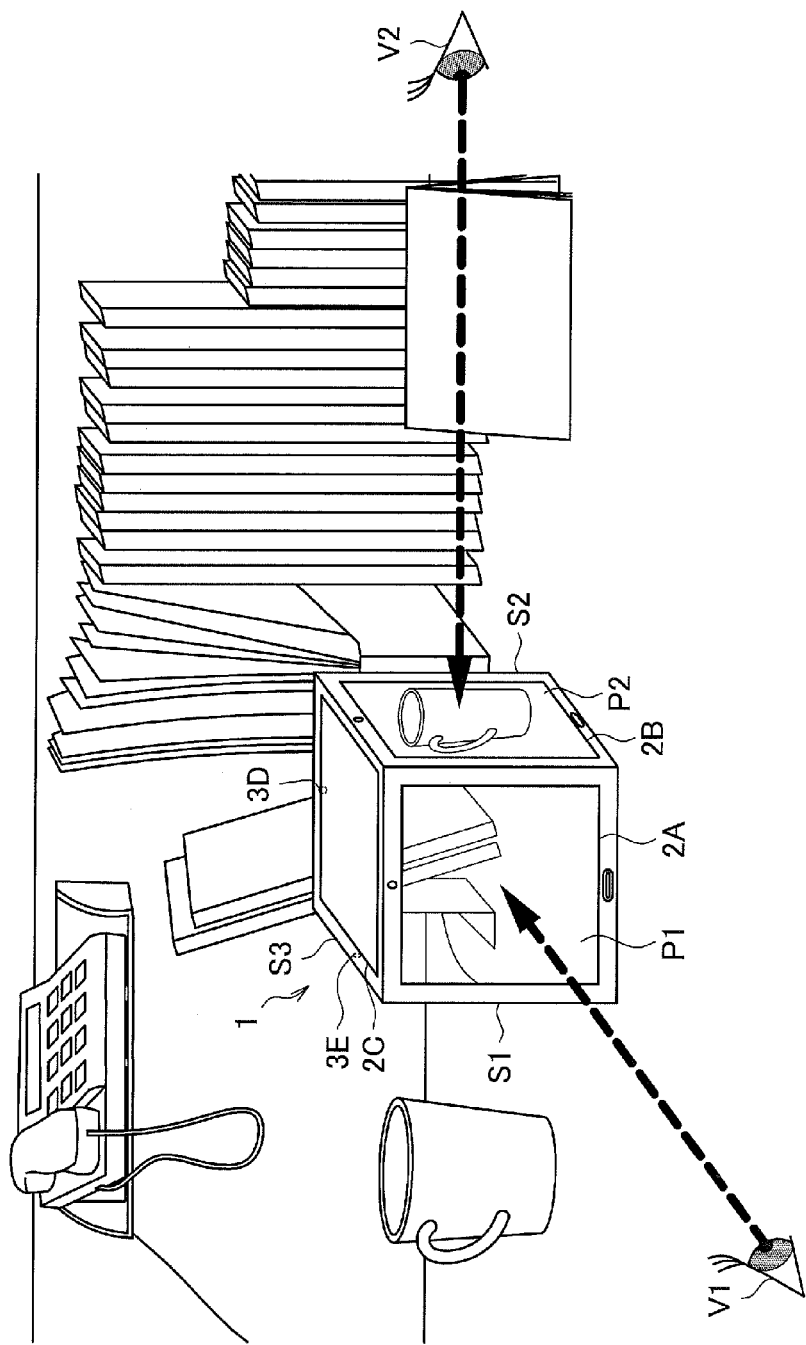
FIG. 7 is a figure for describing an optical camouflage mode according to the first embodiment.

As shown in FIG. 7, the display control section 130*f* displays captured images P1 and P2 of the opposite surface sides captured by the imaging sections 3D and 3E, which are included on surfaces opposite to each of the surfaces S1 and S2, on the display sections 2A and 2B included on the surfaces S1 and S2 of the cube shape which forms the Cube 1. The display control section 130*f* may display, in real time, the captured images P1 and P2 of the opposite surface sides captured by the imaging sections 3D and 3D. In this way, the Cube 1 is made artificially transparent, and it will become difficult to notice the Cube 1 in the case where the Cube 1 is viewed from viewpoint V1 or viewpoint V2.

Further, the display control section 130*f* may not display anything, such as shown in FIG. 7, on the display section 2C included on the upper surface S3 of the Cube 1, or may display a generated image based on the captured images P1 and P2 displayed on the display sections 2A and 2B of the surfaces S1 and S2 connected to the upper surface S3. Specifically, for example, the display control section 130*f* divides the display region into 4 by two straight lines which connect the tops of two opposing groups of the display section 2C, displays a generated image based on the captured image P1 on the display region of the side connected with the surface S1, and displays a generated image based on the captured image P2 on the display region of the side connected with the surface S2.

Next, in the case where there is a Camouflage Mode OFF interrupt process trigger (S181/Yes), in step S184, the mode setting section 130*a* cancels the camouflage (optical camouflage) mode, and display control by the display control section 130*f* ends. For example, the Camouflage Mode OFF interrupt process trigger is a case where there is a camouflage suspension request from one or a plurality of the tablet terminals 20, or is a case where an optical camouflage mode end instruction has been entered manually from the operation section 104. Further, the CPU 100-1 cancels the captured images P1 and P2 temporarily stored for optical camouflage, for example, as an after process.

Heretofore, the execution of a security mode by the Cube 1 according to the first embodiment has been described in detail. Note that, the Cube 1 according to the present embodiment acquires captured images of the surroundings of the Cube 1 by the imaging sections 23 of the tablet terminals 20 detachably attached to the Cube 1, and it is possible to execute a security mode using these captured images. Further, it is also possible for the Cube 1 to perform control, in an optical camouflage mode, so as to display prescribed captured images on the display sections 22 of the tablet terminals 20 detachably attached to the Cube 1.

3-2. The Second Embodiment

Next, a content output system by the Cube 1, the tablet terminals 20 detachable from the Cube 1, and the server 30, will be described as a second embodiment of the present disclosure. In the present embodiment, by outputting content (recommended content to a user) corresponding to IDs (device IDs, owner IDs), which are identification information corresponding to the tablet terminals 20, from the tablet terminals 20 attached to each surface of the Cube 1, the convenience will be improved.

Figure 8:
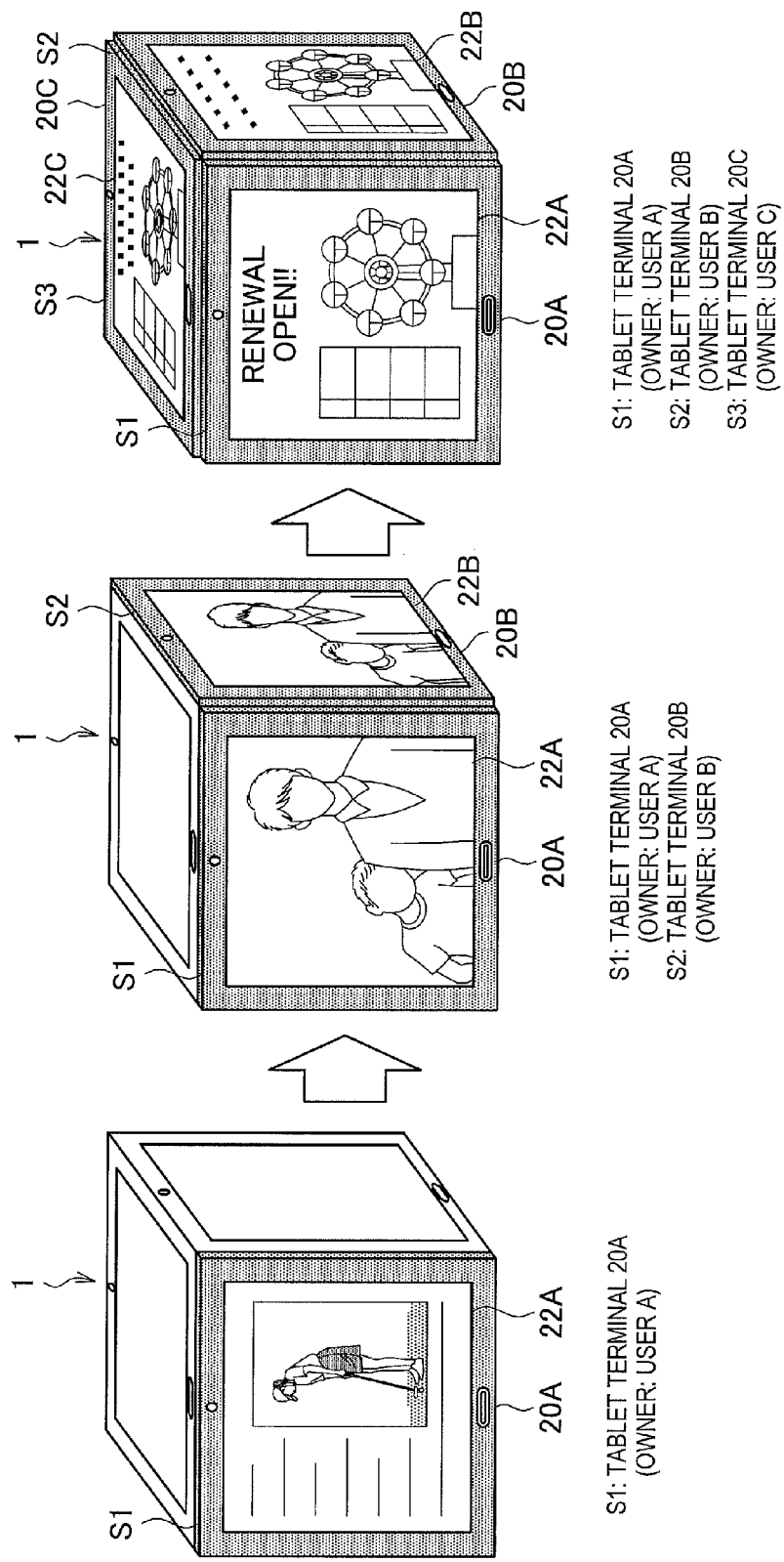
FIG. 8 is a figure for describing an outline of a content output system according to a second embodiment of the present disclosure.

Here, an outline according to the present embodiment will be described by using FIG. 8. FIG. 8 is a figure for describing an outline of a content output system according to the second embodiment. As shown in the left of FIG. 8, for example, when a tablet terminal 20A is attached to a surface S1 of the Cube 1, content corresponding to a user A, who is the owner of the tablet terminal 20A, will be displayed on a display section 22A of the tablet terminal 20A. For example, content corresponding to the user A is content recommended based on the gender, age, browsing history, viewing history or the like of the user A. In the example shown in the right of FIG. 8, in the case where the user A is a father who has golf as a hobby, a news video of golf, for example, is displayed on the display section 22A of the tablet terminal 20A attached to the Cube 1.

Next, as shown in the center of FIG. 8, when a new tablet terminal 20B is attached to a surface S2 of the Cube 1, content corresponding to the user A and a user B, who are the owners of the tablet terminals 20A and 20B, respectively, is displayed on the display sections 22A and 22B of the tablet terminals 20A and 20B. The content corresponding to the user A and the user B is content commonly recommended for the user A and the user B. For example, in the case where person tag information is added by facial recognition (automatically) in advance or manually to photograph content or video content, the photograph/video content to which a tag of the user A and a tag of the user B are added is displayed as content commonly recommended. Further, news videos or the like of hobbies common to the user A and the user B may be displayed.

In addition, as shown in the right of FIG. 8, when a new tablet terminal 20C is attached to the upper surface S3 of the Cube 1, content according to the user A, the user B and a user C, who are the owners of the tablet terminals 20A to 20C, respectively, is displayed on the display sections 22A to 22C of the tablet terminals 20A to 20C. The content corresponding to the user A, the user B and the user C is content commonly recommended for the user A, the user B and the user C. For example, in the case where the user A, the user B and the user C are a family, guidance images of leisure facilities, restaurants or the like for the family are displayed.

Note that, content displayed on each tablet terminal 20 may be elected upon performing a weighting on the commonality between the owners of each tablet terminal 20, by considering a position relation of the surfaces (positions) to which the plurality of tablet terminals 20 are attached. Specifically, for example, content commonly recommended for the owners of the tablet terminals 20 attached to adjoining surfaces is elected and displayed in preference to content for the owners of tablet terminals 20 attached to separated surfaces.

Content output control from the tablet terminals 20 detachably attached to the Cube 1 such as described above may be performed at the Cube 1 side, may be performed at the tablet terminals 20 side, or may be performed at the server 30 side. Here, as an example, a case in which the tablet terminals 20 and the server 30 independently perform content output control according to the present embodiment will be described by referring to FIG. 9 to FIG. 15.

(3-2-1. Configuration of the Tablet Terminals 20)

Figure 9:
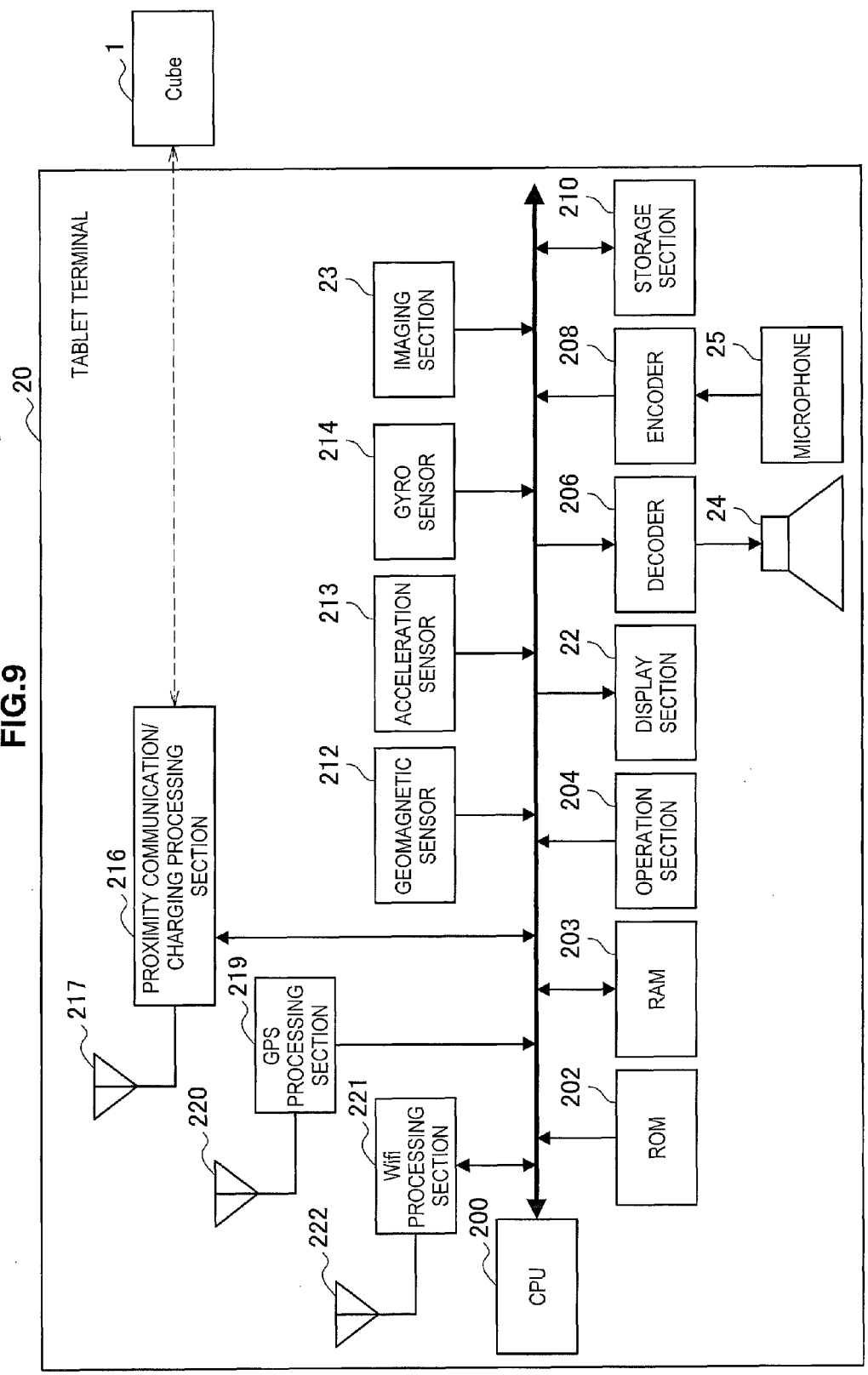
FIG. 9 is a block diagram which shows an example of a hardware configuration of a tablet terminal according to the second embodiment.

FIG. 9 is a block diagram which shows an example of a hardware configuration of one of the tablet terminals 20 according to the present embodiment. As shown in FIG. 9, the tablet terminal 20 has, for example, a proximity communication/charging antenna 217, a proximity communication/charging processing section 216, a GPS antenna 220, a GPS processing section 219, a Wifi antenna 222, a Wifi processing section 221, a geomagnetic sensor 212, an acceleration sensor 213, a gyro sensor 214, an imaging section 23, a CPU 200, a ROM 202, a RAM 203, an operation section 204, a display section 22, a decoder 206, a speaker 24, an encoder 208, a microphone 25, and a storage section 210. Since the basic functions of each element are the same as each element of the Cube 1 described above by referring to FIG. 2, a detailed description of these elements will be omitted here.

Note that, when transmitting or receiving data by performing wireless communication with the nearby Cube 1 (including contact and contactless), the proximity communication/charging antenna 217 can be supplied with power.

Further, the CPU 200 according to the present embodiment functions as a CPU 200-1, which will be described later by referring to FIG. 10.

Heretofore, a hardware configuration of one of the tablet terminals 20 according to the second embodiment has been described. Note that, the tablet terminals 20 are not limited to the configuration shown in FIG. 9, and may be thin client terminals having only the minimum necessary elements, such as a calculation section (CPU 200), each output section (display section 22, microphone 25), each input section (imaging section 23, operation section 204), and a communication section.

To continue, a functional configuration of the CPU 200-1 of the tablet terminal 20 according to the present embodiment will be described by referring to FIG. 10.

Figure 10:
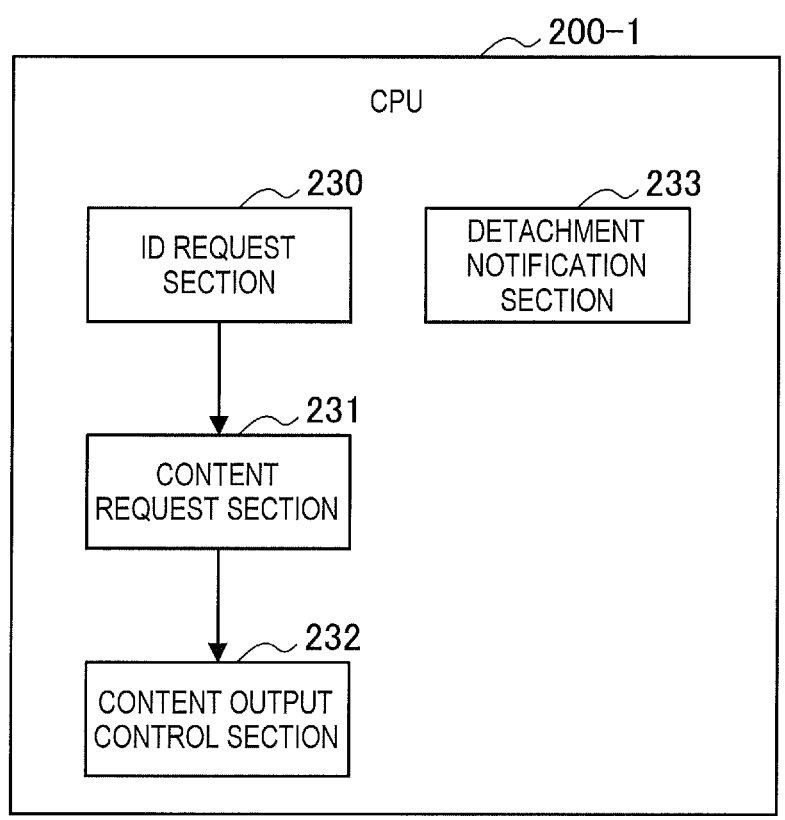
FIG. 10 is a block diagram which shows a functional configuration of a CPU of the tablet terminal according to the second embodiment.

FIG. 10 is a block diagram which shows a functional configuration of the CPU 200-1 of the tablet terminal 20 according to the second embodiment. As shown in FIG. 10, the CPU 200-1 according to the present embodiment functions as an ID request section 230, a content request section 231, a content output control section 232, and a detachment notification section 233.

In the case where an attachment to the Cube 1 has been detected by the proximity communication/charging processing section 216, the ID request section 230 requests transmission of an ID corresponding to the Cube 1. A case will be described in which a Cube ID is acquired from the Cube 1 as an example in the present embodiment, when the ID corresponding to the Cube 1 is at least one of a Cube ID and a group ID. The ID request section 230 supplies the acquired Cube ID to the content request section 231.

In the case where this tablet terminal 20 is attached to the Cube 1, the content request section 231 requests transmission of the content corresponding to the server 30. Specifically, the content request section 231 requests a Cube ID acquired by the ID request section 230, and an ID corresponding to this tablet terminal 20, to the server 30 on a network via the Wifi antenna 222. The ID corresponding to the tablet terminal 20 is at least one of a device ID specific to the tablet terminal 20, and a user ID which shows the owner of the tablet terminal 20.

The content output control section 232 performs control so that recommended content transmitted in accordance with a request from the server 30 is output from the display section 22 or the speaker 24.

In the case where this tablet terminal 20 is detached from the Cube 1, the detachment notification section 233 notifies the fact of detachment to the server 30. In this case, the detachment notification section 233 may perform this notification together with the Cube ID and the device ID or user ID.

(3-2-2. Configuration of the Server 30)

Heretofore, a configuration of one of the tablet terminals 20 according to the second embodiment has been described in detail. To continue, a configuration of the server 30 according to the second embodiment will be described in detail by referring to FIG. 11.

Figure 11:
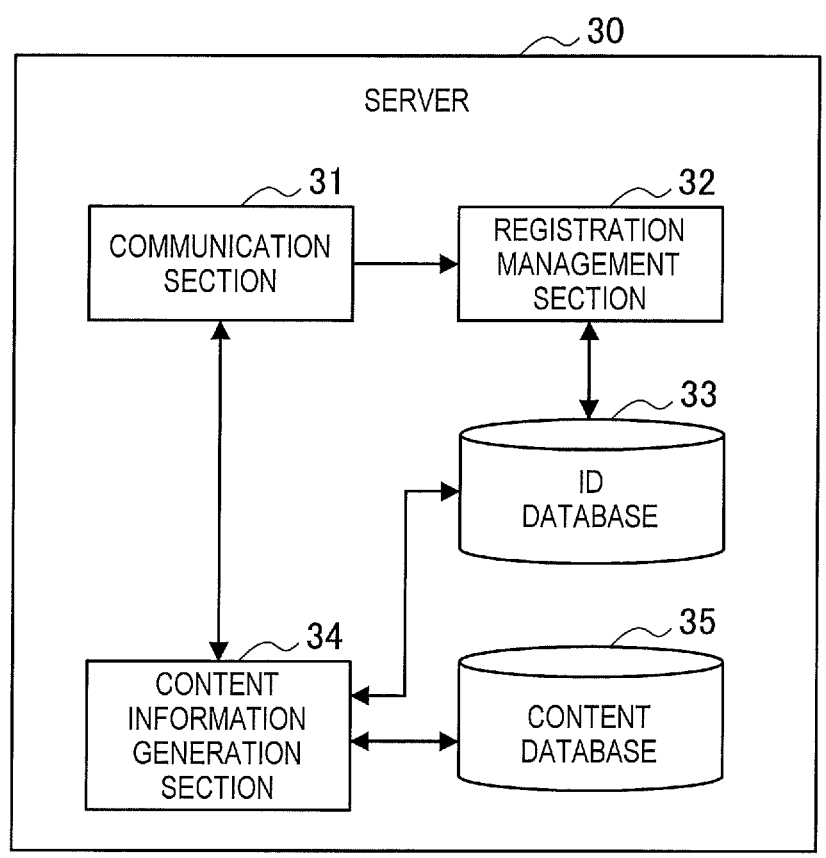
FIG. 11 is a block diagram which shows an example of a configuration of a server according to the second embodiment.

FIG. 11 is a block diagram which shows an example of the configuration of the server 30 according to the second embodiment. As shown in FIG. 11, the server 30 has a communication section 31, a registration management section 32, an ID database 33, a content information generation section 34, and a content database 35.

The communication section 31 performs data communication with the Cube 1 and the tablet terminals 20 via a network.

Specifically, the communication section 31 according to the present embodiment receives content transmission requests from the tablet terminals 20, or transmits content information to the tablet terminals 20.

The registration management section 32 manages an association of group IDs, Cube IDs, user IDs and device IDs stored in the ID database 33, or performs registration of new IDs and cancellation of registered IDs. Further, in the case were a plurality of Cubes 1 are connected to the server 30, an association between a group ID and the plurality of Cube IDs, or an association between the plurality of Cube IDs and each user ID/device ID, can be managed by having an ID database 33 at the server 30 side.

Figure 12:
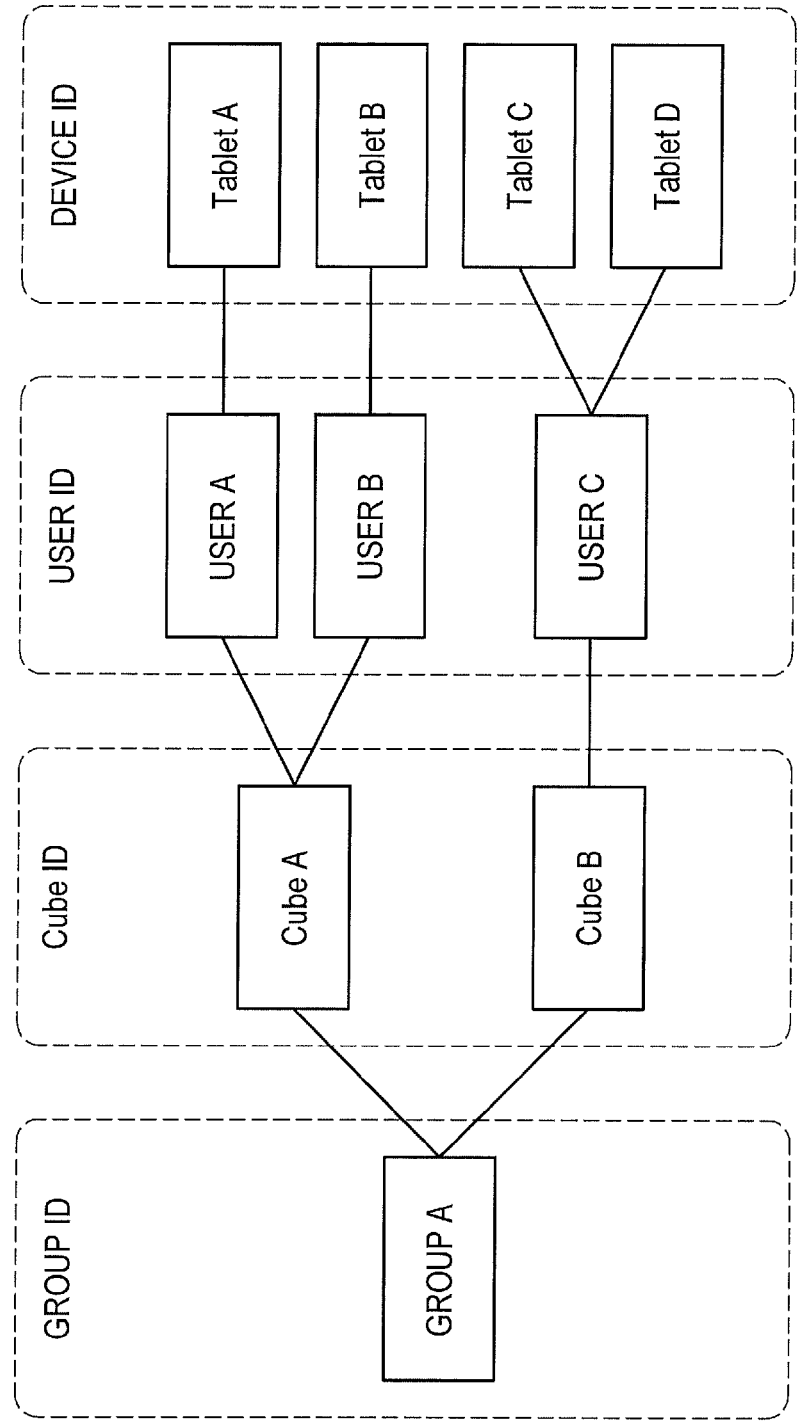
FIG. 12 is a figure which shows an example of an association of each ID stored in an ID database according to the second embodiment.

Here, an example of an association of each ID stored in the ID database 33 is shown in FIG. 12. As shown in FIG. 12, the group ID is an attribute of a group to which a plurality of user IDs belongs. In the example shown in FIG. 12, each of the users A to C belongs to a group A (for example, "Family").

Further, the Cube ID is used as a concept of a subgroup ID lower than the group ID, when there is an ID specific to each Cube. Further, in the present system, in the case where a plurality of Cubes 1 are used by one family (such as placing Cube 1A in the kitchen, and placing Cube 1B in the bedroom), an ID specific to a Cube is used. Further, in the present system, in the case where there is only one group, the Cube ID can be used as this group ID.

The user ID is associated with a Cube ID, when there is an ID specific to a user.

The device ID is associated to a user ID, when there is an ID specific to each tablet terminal. In the case where a plurality of tablet terminals are owned by one person, such as the user C, since it may be difficult to identify each of the tablets "tablet C" and "tablet D" using only the user ID "user C" as an ID corresponding to the tablet terminals, a device ID specific to the tablet terminals is used. Further, the device ID may be directly associated with the Cube ID.

In the example shown in FIG. 12, the present state is a state in which the tablet terminal 20A owned by the user A and the tablet terminal 20B owned by the user B are registered in association with a Cube 1A, and the tablet terminals 20C and 20D owned by the user C are registered in association with a Cube 1B. A relation of such an association can be changed by the registration management section 32.

The content information generation section 34 generates information for outputting content by the tablet terminal 20 of a request source. The information for outputting content is data for this content, a URL of the content, or an ID or the like of other tablet terminals 20 connected to the Cube 1 to which the tablet terminal 20 of a request source is attached.

Specifically, the content information generation section 34 generates content information in accordance with the device ID (or user ID) and Cube ID (or group ID) transmitted from the tablet terminal 20 of a request source. For example, the content information generation section 34 refers to tag information added to content stored in the content database 35, or a list of recommended content for each user, and extracts recommended content to the tablet terminals 20. The list of recommended content for each user is recommended content made into a list for each user by analyzing various types of information in advance, such as the age, gender, hobbies, browsing history or viewing history of the users.

Further, the content information generation section 34 may generate content information in accordance with the device ID/user ID transmitted from the tablet terminal 20 of a request source, and the device ID/user ID of the other tablet terminals 20 attached to the Cube 1 to which the tablet terminal 20 of a request source is attached. The content information generation section 34 relates the presence or not of the other tablet terminals 20 attached to the Cube 1 to which the tablet terminal 20 of a request source is attached, and can comprehend the presence or not of the other tablet terminals 20 by referring to the association of each ID stored in the ID database 33.

(3-2-3. Operation Process)

To continue, the operation process of a content output control system according to the second embodiment will be described by referring to FIG. 13 to FIG. 15.

Figure 13:
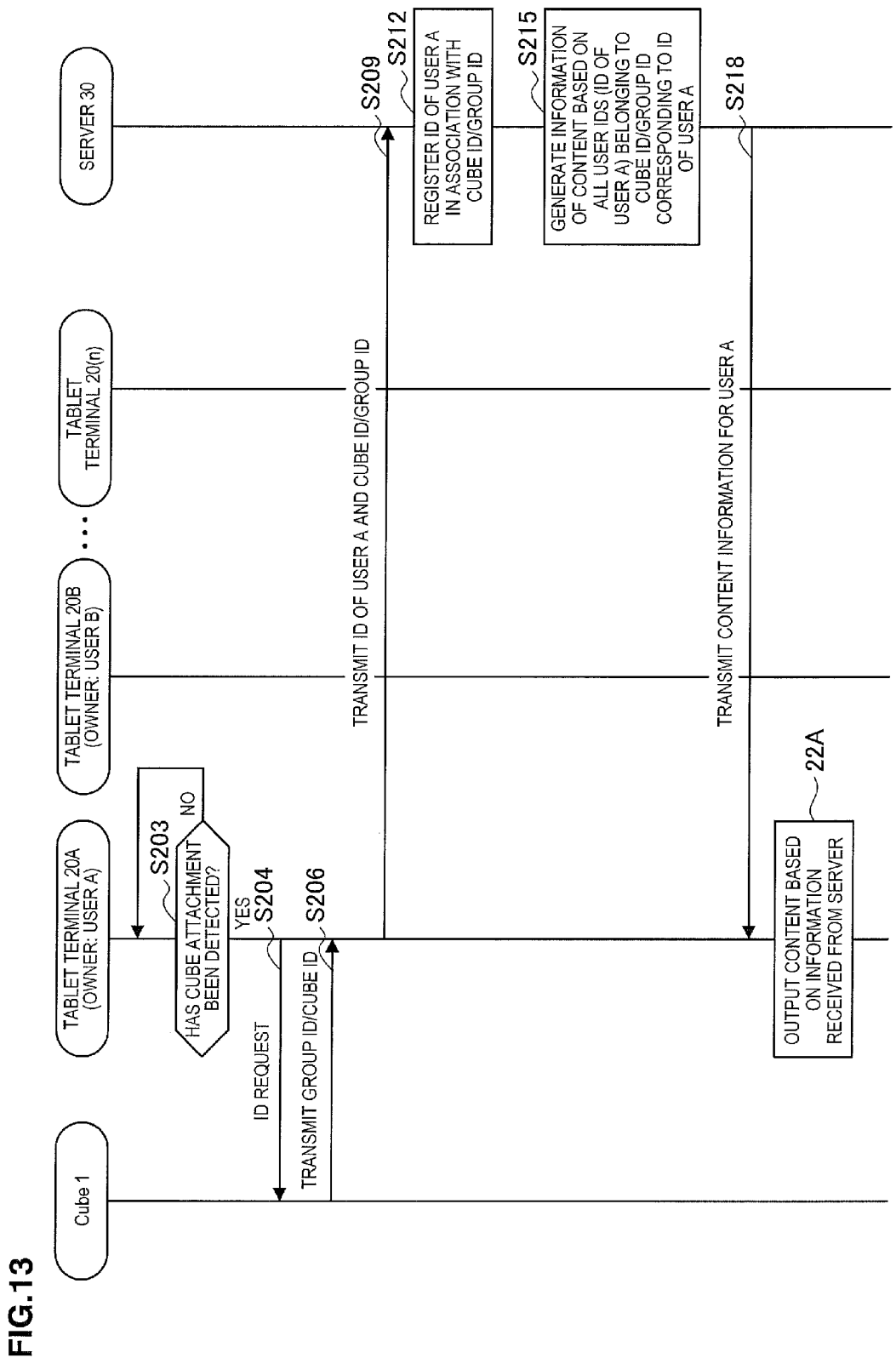
FIG. 13 is a flow chart which shows an operation process, in the case where a tablet terminal is attached, in the content output control system according to the second embodiment.

FIG. 13 is a flow chart which shows an operation process of the case where a tablet terminal 20A is attached, in the content output control system according to the second embodiment. As shown in FIG. 13, first in step S203, the tablet terminal 20A judges whether or not attachment to the Cube 1 has been detected by the proximity communication/charging processing section 216.

Next, when attachment to the Cube 1 has been detected (S203/Yes), in step S204, the ID request section 230 of the tablet terminal 20A performs a transmission request of an ID to the Cube 1.

Next, in step S206, the Cube 1 transmits a group ID or a Cube ID to the tablet terminal 20A, as an ID (identification information) corresponding to the Cube 1. Further, the Cube 1 may transmit the group ID or Cube ID together with an attachment position ID, which shows the surface of the Cube 1 to which the tablet terminal 20A has been attached.

Next, in step S209, the content request section 231 of the tablet terminal 20A transmits an ID corresponding to the tablet terminal 20A and an ID corresponding to the Cube 1 to the server 30, and performs a content request. The ID corresponding to the tablet terminal 20A is a user ID (for example, "user A") or a device ID, and the ID corresponding to the Cube 1 is a Cube ID (for example, "Cube A") or a group ID (for example, "group A"). In addition, in the case where an attachment position ID is acquired from the Cube 1, the tablet terminal 20A transmits this attachment position ID along with the content request to the server 30.

Next, in step S212, first the server 30 registers the user ID in the ID database 33 in association with the Cube ID/group ID, by the registration management section 32, in accordance with the content request transmitted from the tablet terminal 20A via the communication section 31.

To continue, in step S215, the content information generation section 34 recognizes all the user IDs (here, the ID of user A) belonging to the Cube ID or group ID associated with the ID of the user A, by referring to the ID database 33, and content information recommended for these user IDs is generated. Here, since it is assumed that all the user IDs belonging to the Cube ID or group ID is only the ID of the user A, an attachment position ID is not particularly considered when generating the recommended content information.

Next, in step S218, the server 30 transmits content information for the user A, which has been generated by the content information generation section 34, to the tablet terminal 20A of a request source via the communication section 31.

Then, in step S221, the tablet terminal 20A performs control so that content is output, based on the content information transmitted from the server 30, by the content output control section 232. For example, in the case where the content information is data of this content, the content output control section 232 outputs this data from the display section 22A or the speaker 24. Further, in the case where the content information is a URL, the content output control section 232 acquires content from a prescribed storage location based on the URL, and outputs the acquired content.

Heretofore, an operation process has been described in which content recommended for the user A is output to the tablet terminal 20A, when the tablet terminal 20A is attached to the Cube 1. To continue, output control of tablet terminals 20A and 20B, in the case were another tablet terminal 20B is newly attached to the Cube 1, will be described by referring to FIG. 14.

Figure 14:
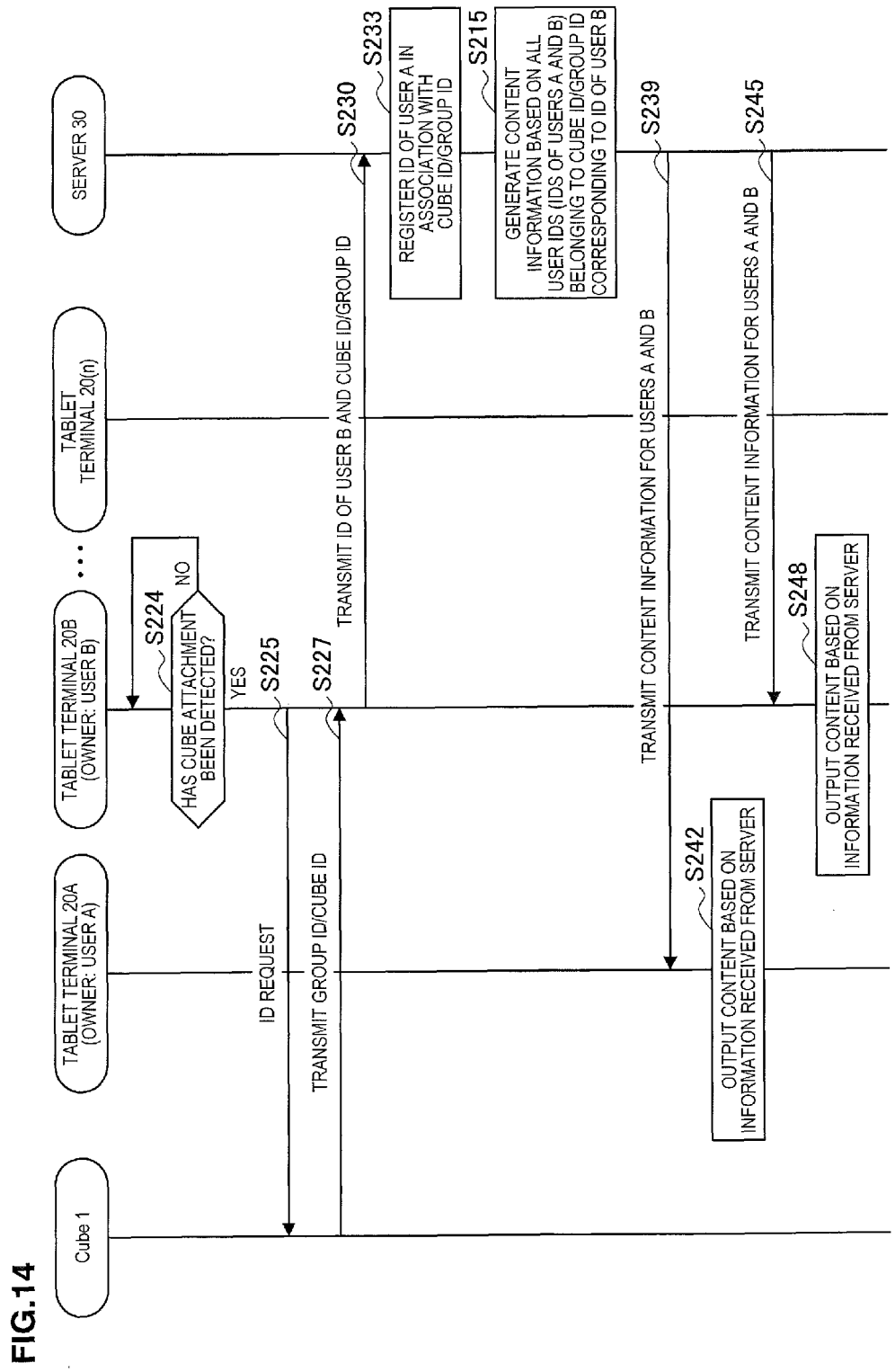
FIG. 14 is a flow chart which shows an operation process, in the case where a new tablet terminal is attached, in the content output control system according to the second embodiment.

FIG. 14 is a flow chart which shows an operation process of the case where a new tablet terminal 20B is attached, in the content output control system according to the second embodiment. As shown in FIG. 14, first in step S224, the tablet terminal 20B judges whether or not attachment to the Cube 1 has been detected by the proximity communication/charging processing section 216.

Next, when attachment to the Cube 1 has been detected (S224/Yes), in step S225, the ID request section 230 of the tablet terminal 20B performs a transmission request of an ID to the Cube 1.

Next, in step S227, the Cube 1 transmits a group ID or a Cube ID to the tablet terminal 20B, as an ID (identification information) corresponding to the Cube 1. Further, the Cube 1 may also transmit an attachment position ID, which shows the surface of the Cube 1 to which the tablet terminal 20B has been attached, to the tablet terminal 20B.

Next, in step S230, the content request section 231 of the tablet terminal 20B transmits an ID corresponding to the tablet terminal 20B and an ID corresponding to the Cube 1 to the server 30, and performs a content request. The ID corresponding to the tablet terminal 20B is a user ID (for example, "user B") or a device ID, and the ID corresponding to the Cube 1 is a Cube ID (for example, "Cube A") or a group ID (for example, "group A"). In addition, in the case where an attachment position ID is acquired from the Cube 1, the tablet terminal 20B transmits this attachment position ID along with the content request to the server 30.

Next, in step S233, first the server 30 registers the user ID in the ID database 33 in association with the Cube ID/group ID, by the registration management section 32, in accordance with the content request transmitted from the tablet terminal 20B via the communication section 31.

To continue, in step S236, the content information generation section 34 refers to the ID database 33, recognizes all the user IDs (the ID of user A and the ID of user B) belonging to the Cube ID or group ID associated with the ID of the user B, and generates content information recommended for these user IDs. In this case, the content information generation section 34 may generate content information recommended for the user A and the user B, by considering a position relation between an attachment position of the tablet terminal 20A in the Cube 1, and an attachment position of the tablet terminal 20B in the Cube 1.

Next, in step S239, the server 30 transmits content information for the user A and the user B, which has been generated by the content information generation section 34, to the tablet terminal 20A of the user A via the communication section 31.

Then, in step S242, the tablet terminal 20A performs control so that content is output, based on the content information transmitted from the server 30, by the content output control section 232.

Further, in step S245, the server 30 transmits content information for the user A and the user B, which has been generated by the content information generation section 34, to the tablet terminal 20B of the user B, which is a request source, via the communication section 31.

Then, in step S248, the tablet terminal 20B performs control so that content is output, based on the content information transmitted from the server 30, by the content output control section 232. For example, in the case where the content information is another user ID (the ID of user A), the content output control section 232 acquires content (such as a photograph or video), in which the other user ID and the user ID of this tablet terminal 20B (the ID of user B) are both tagged, from the storage section 210 or the like.

Heretofore, an operation process has been described in which content recommended for the user A and the user B is output to the tablet terminals 20A and 20B, when the tablet terminal 20B is attached in addition to the tablet terminal 20A. In this way, when the tablet terminal 20B is added to the Cube 1, the content recommended for the already attached tablet terminal 20A is automatically updated, and content commonly recommended for the tablet terminal 20A and the tablet terminal 20B is output. To continue, output control of the tablet terminal 20B, in the case where the attached tablet terminal 20A is detached from the Cube 1, will be described by referring to FIG. 15.

Figure 15:
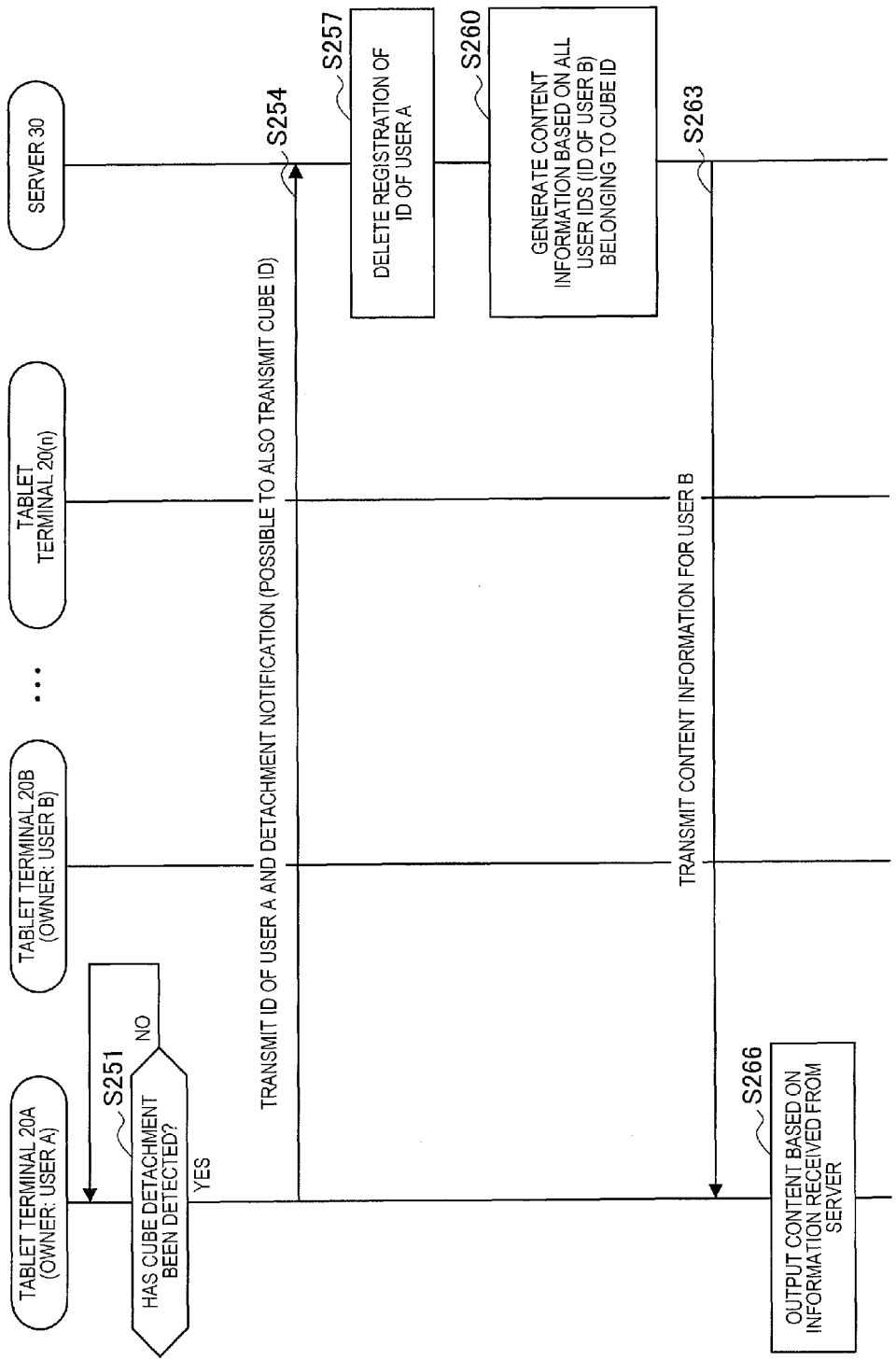
FIG. 15 is a flow chart which shows an operation process, in the case where a tablet terminal is detached, in the content output control system according to the second embodiment.

FIG. 15 is a flow chart which shows an operation process of the case where the tablet terminal 20A has been detached, in the content output control system according to the second embodiment. As shown in FIG. 15, first in step S251, the tablet terminal 20A judges whether or not detachment of this tablet terminal 20A from the Cube 1 has been detected by the proximity communication/charging processing section 216.

Next, when detachment from the Cube 1 has been detected (S251/Yes), in step S254, the detachment notification section 233 of the tablet terminal 20A performs a detachment notification, along with the ID corresponding to the tablet terminal 20A (for example, the ID of user A), to the server 30. In this case, the detachment notification section 233 may transmit the detached Cube ID, in addition to the ID corresponding to the tablet terminal 20A. Further, the tablet terminal 20A may continue to display recommended content displayed on the display section 22A, or may end the display of recommended content as a trigger of detachment from the Cube 1.

Next, in step S257, the server 30 deletes the registration of the ID of the user A from the association of each ID stored in the ID database 33, by the registration management section 32, in accordance with the detachment notification transmitted from the tablet terminal 20A via the communication section 31.

To continue, in step S260, the content information generation section 34 refers to the ID database 33, recognizes all the user IDs (the ID of user B) belonging to the Cube ID or group ID associated with the ID of the canceled user A, and generates content information recommended for these user IDs. Or, in the case where the Cube ID has been transmitted along with the detachment notification, the content information generation section 34 recognizes all the user IDs (the ID of user B) belonging to this Cube ID, and generates content information recommended for these user IDs.

Next, in step S263, the server 30 transmits content information for the user B, which has been generated by the content information generation section 34, to the tablet terminal 20B of the user B via the communication section 31.

Then, in step S266, the tablet terminal 20B performs control so that content is output, based on the content information transmitted from the server 30, by the content output control section 232.

Heretofore, a content output control process of the present system has been described, in the case where the tablet terminal 20A has been detached from the Cube 1. In this way, when the tablet terminal 20A is detached from the Cube 1, the content recommended for the other attached tablet terminal 20B is automatically updated, and content recommended for the tablet terminal 20B is output.

As described above, output control of recommended content, in accordance with the IDs of the tablet terminals 20, to the tablet terminals 20 according to the present embodiment is independently controlled by the tablet terminals 20 and the server 30. However, output control according to the present embodiment is not limited to being independently performed by the tablet terminals 20 and the server 30, and may be performed at the Cube 1 side, for example, such as described above. Hereinafter, a case in which the Cube 1 independently performs output control of estimated content, as a modified example of the present embodiment, will be described by referring to FIG. 16 to FIG. 17.

(3-2-4. Modified Example)

Figure 16:
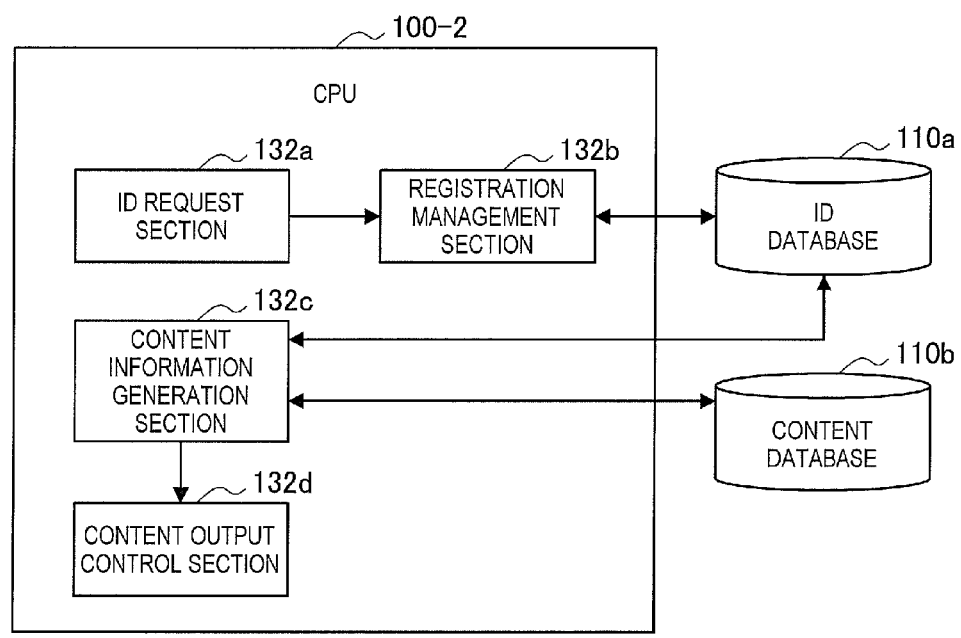
FIG. 16 is a block diagram which shows a functional configuration of the CPU of the Cube according to a modified example of the second embodiment.

FIG. 16 is a block diagram for describing a functional configuration of a CPU 100-2 of the Cube 1 according to a modified example of the second embodiment. As shown in FIG. 16, the CPU 100-2 functions as an ID request section 132a, a registration management section 132b, a content information generation section 132c, and a content output control section 132d.

In the case where attachment of one of the tablet terminals 20 to a surface of this Cube 1 is detected by the proximity communication/charging processing section 116, the ID request section 132a requests, to the tablet terminal 20, transmission of an ID (at least one of the device ID and user ID) corresponding to the tablet terminal 20. The ID request section 230 supplies the acquired user ID (or device ID) to the registration management section 132b.

The registration management section 132b manages the user IDs/device IDs stored in an ID database 110a of the storage section 110. Specifically, the registration management section 132b performs registration of new user IDs/device IDs and deletion of registered user IDs/device IDs.

When the tablet terminal 20 is attached to the Cube 1, the content information generation section 132c generates content information corresponding to the user ID/device ID of the tablet terminal 20. Specifically, the content information generation section 132c generates content information for outputting content recommended for a user based on the age, gender, hobbies, browsing history, viewing history or the like of the user, who is the owner of the tablet terminal 20. The recommended content may be acquired from a content database 110b of the storage section 110 built into this Cube 1, or may be acquired from a prescribed content server on a network via the Wifi antenna 122. Further, a list of recommended content for each user may be stored in the content database 110b.

In this case, the content information generation section 132c refers to the ID database 110a, recognizes user IDs/device IDs of other tablet terminals 20 presently attached to this Cube 1, and acquires information of content which can be commonly recommended for all user IDs/device IDs. Further, in the case where a plurality of tablet terminals 20 are attached to the Cube 1, the content information generation section 132c may acquire recommended content, by considering a position relation of the surfaces to which each of the tablet terminals 20 are attached. Specifically, for example, the content information generation section 132c acquires content which can be commonly recommended for the tablet terminals attached to adjoining surfaces in preference to content for tablet terminals attached to separated surfaces.

The content output control section 132d performs control so as to perform output from the display sections 22 or the speakers 24 of the tablet terminals 20 attached to the surfaces of the Cube 1, based on information of recommended content generated by the content information generation section 132c. Specifically, the content output control section 132d performs control so that information of recommended content is transmitted to the tablet terminals 20 via the proximity communication/charging antenna 117, and the transmitted information is output from the tablet terminals 20.

Heretofore, a functional configuration of the CPU 100-2 of the Cube 1 according to the modified example of the second embodiment has been described. In this way, the Cube 1 acquires an ID by communicating with one of the attached tablet terminals 20, and can perform cooperative operations in which content which can be recommended for a user is output from the output section of the tablet terminal 20 in accordance with this ID. Note that, in the case where a plurality of tablet terminals 20A and 20B are attached to the Cube 1, the content information generation section 132c may acquire recommended content from the tablet terminal 20A, for example, via the proximity communication/charging antenna 117. In this case, the content output control section 132d transmits the acquired recommended content to the other tablet terminal 20B via the proximity communication/charging antenna 117, and can perform control so that the same recommended content is output in the tablet terminals 20A and 20B. To continue, an operation process according to the modified example of the second embodiment will be described by referring to FIG. 17.

Figure 17:
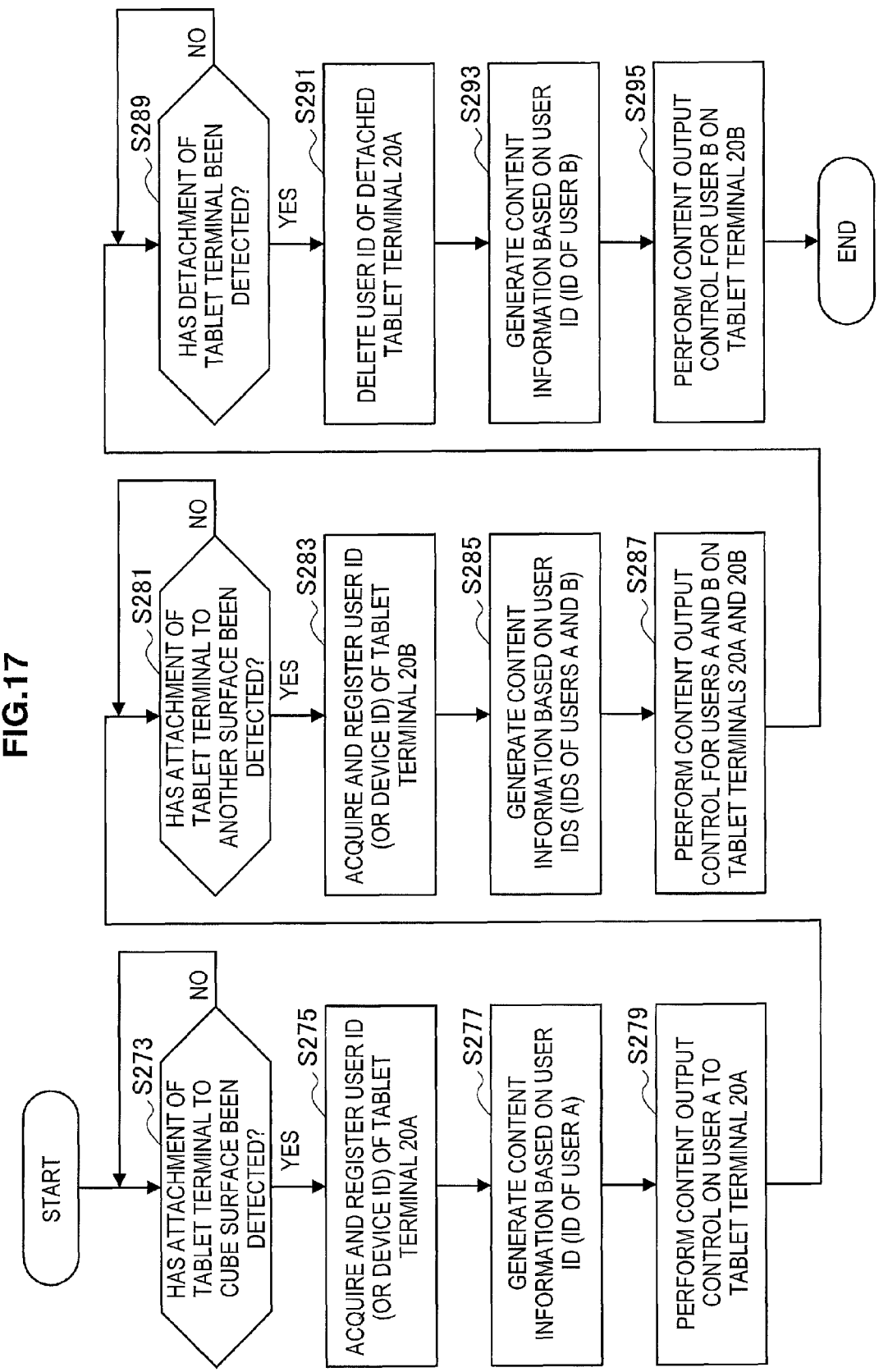
FIG. 17 is a flow chart which shows an output control process according to the modified example of the second embodiment.

FIG. 17 is a flow chart which shows an output control process according to the modified example of the second embodiment. As shown in FIG. 17, first in step S273, the Cube 1 judges whether or not attachment of one of the tablet terminals 20 to a surface of the Cube 1 has been detected by the proximity communication/charging processing section 116.

Next, when attachment to the Cube 1 has been detected (S273/Yes), in step S275, the ID request section 132a of the Cube 1 performs a transmission request of an ID to the tablet terminal 20, and acquires an ID corresponding to the tablet terminal 20. Here, a description will be made by assuming a case in which the tablet terminal 20A has been attached. The ID request section 132a of the Cube 1 supplies the ID (user ID/device ID) acquired from the tablet terminal 20A to the registration management section 132b. The registration management section 132b registers, in the ID database 110a, an ID of the tablet terminal 20A (for example, the ID of user A) acquired by the ID request section 132a.

Next, in step S277, the content information generation section 132c refers to the ID database 110a, recognizes all the IDs (here, the ID of user A) of the tablet terminal 20 presently attached to the Cube 1, and generates information content recommended for the user A.

Then, in step S279, the content output control section 132d performs control so that content recommended for the user A is output from the tablet terminal 20A, based on the content information generated in the content information generation section 132c.

To continue, when attachment of a new tablet terminal 20 to another surface of the Cube 1 has been detected (step S281/Yes), in step S283, the ID request section 132a of the Cube 1 performs a transmission request of an ID corresponding to the tablet terminal 20. Here, a description will be made by assuming a case in which the tablet terminal 20B has been newly attached. The ID request section 132a of the Cube 1 supplies the ID (user ID/device ID) acquired from the tablet terminal 20B to the registration management section 132b. The registration management section 132b registers, in the ID database 110a, an ID of the tablet terminal 20B (for example, the ID of user B) acquired by the ID request section 132a.

Next, in step S285, the content information generation section 132c refers to the ID database 110a, recognizes all the IDs (here, the IDs of user A and user B) of the tablet terminals 20 presently attached to the Cube 1. Further, the content information generation section 132c generates content information commonly recommended for the user A and the user B.

Then, in step S287, the content output control section 132d performs control so that content recommended for the user A and the user B is output from the tablet terminals 20A and 20B, based on the content information generated in the content information generation section 132c.

To continue, in step S289, the Cube 1 judges whether or not detachment of one of the tablet terminals 20 from the Cube 1 has been detected by the proximity communication/charging processing section 116.

When detachment of one of the tablet terminals 20 has been detected (S289/Yes), in step S291, the registration management section 132b deletes the ID of the detached tablet terminal 20 from the ID database 33. Here, a description will be made by assuming a case in which the tablet terminal 20A has been detached. In this case, the registration management section 132b deletes the user ID of the tablet terminal 20A (the ID of user A) from the ID database 33.

Next, in step S293, the content information generation section 132c refers to the ID database 110a, recognizes all the IDs (here, the ID of user B) of the tablet terminal 20 presently attached to the Cube 1, and generates content information for the user B.

Then, in step S295, the content output control section 132d performs control so that content recommended for the user B is output from the tablet terminal 20B, based on the content information generated in the content information generation section 132c.

Heretofore, an output control system according to the second embodiment has been described in detail. Note that, while one of the Cube 1 and the tablet terminal 20 transmits an ID, in accordance with a transmission request of an ID from the other (a request by the ID request section 230, the ID request section 132a), when the tablet terminal 20 is attached to the Cube 1, the timing of the ID transmission according to the present embodiment is not limited to this. For example, an ID may be automatically transmitted from one of the Cube 1 and the tablet terminal 20 to the other, as a trigger for detecting attachment of the tablet terminal 20 to the Cube 1. In addition, while in the above described second embodiment and the modified example the same content information generated based on a plurality of user IDs is output to a plurality of the tablet terminals 20 attached to the Cube 1, such as shown in FIG. 8, the output control according to the present embodiment is not limited to this. For example, in the present embodiment, it is possible for a plurality of different content information generated based on a plurality of user IDs (or device IDs) to be output from a plurality of tablet terminals 20 attached to the Cube 1.

3-3. The Third Embodiment

Next, a third embodiment of the present disclosure will be described by referring to FIG. 18 to FIG. 22. The Cube 1 according to the third embodiment can perform cooperative operations such as associating the IDs of the tablet terminals 20 on each surface, and implementing two-way communication with a remote tablet terminal 20, via a surface, in accordance with a call operation for the surface to which this ID corresponds. Hereinafter, an outline of the third embodiment will be described by referring to FIG. 18.

Figure 18:
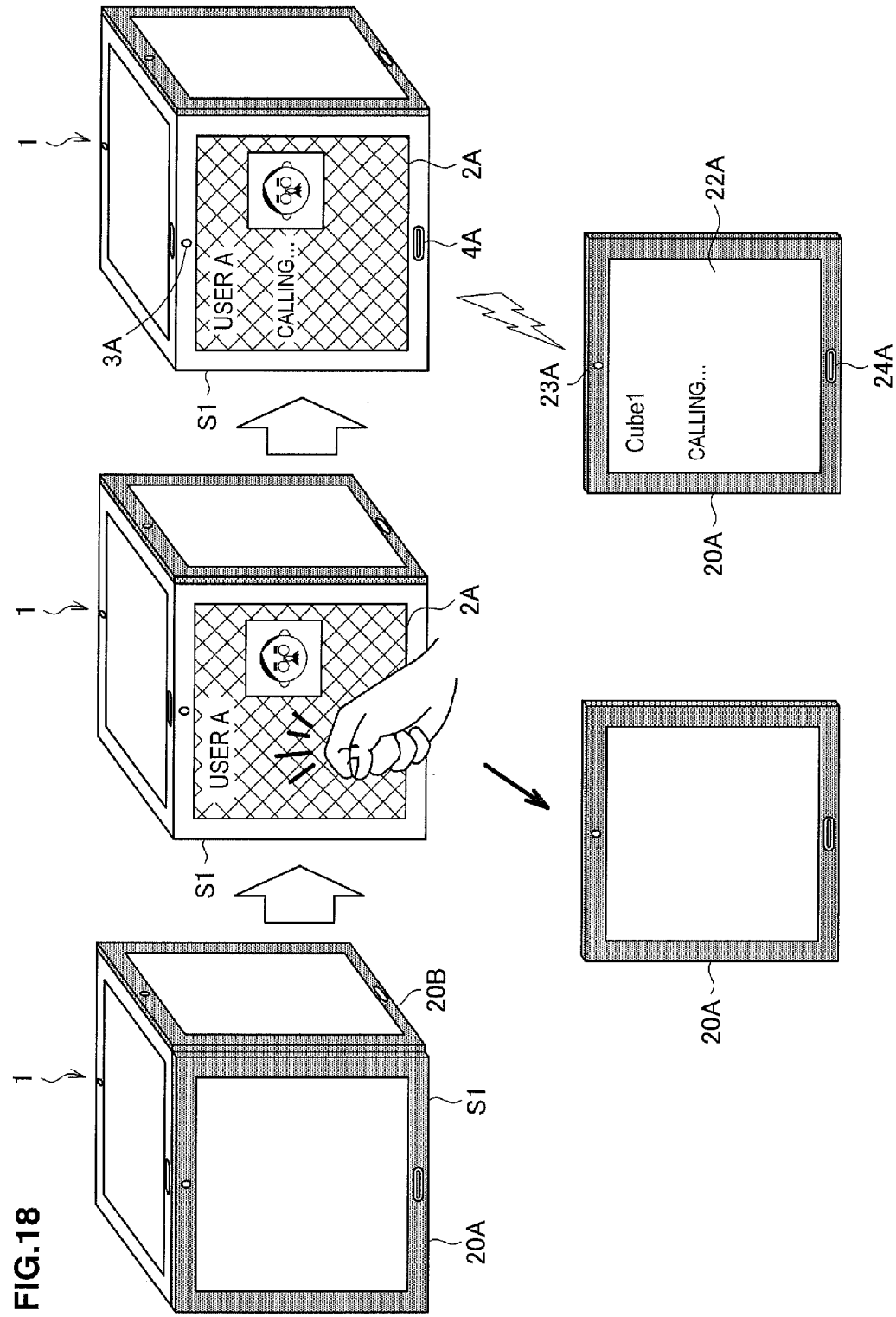
FIG. 18 is a figure for describing an outline of two-way communication with a tablet terminal via a surface of the Cube according to a third embodiment of the present disclosure.

FIG. 18 is a figure for describing an outline of two-way communication with the tablet terminals 20 via the surfaces of the Cube 1 according to the third embodiment. As shown in FIG. 18, the Cube 1 according to the present embodiment stores, in association with each surface, the IDs of the tablet terminals 20 detachably attached to each surface of the cube shape which forms the Cube 1.

Specifically, as shown in the left of FIG. 18, the ID (user ID/device ID) of the tablet terminal 20A attached to the surface S1 is stored in association with the surface S1 of the Cube 1, and the ID of the tablet terminal 20B attached to the surface S2 is stored in association with the surface S2.

Next, as shown in the center of FIG. 18, the Cube 1 continues to store an association of the surface S1 and the ID of the tablet terminal 20A, even if the tablet terminal 20A has been detached from the surface S1 of the Cube 1. Here, for example, as a case in which the tablet terminal 20A is detached from the Cube 1, a case will be assumed for a family in which a user A has the tablet terminal 20A in his or her own room by detaching the tablet terminal 20A from the Cube 1, in the case where the Cube 1 is placed in the living room.

As shown in the center of FIG. 18, the Cube 1 displays an image, on the display section 2A fixed to the surface S1, which specifies the owner (the user A) shown by the ID of the tablet terminal 20A presently stored in association with the surface. For example, the Cube 1 specifies that the owner of the tablet terminal 20 associated with the surface of the Cube 1 is identifiable, by at least one of a color, name, facial image, icon, avatar or character which has been set for each of the owners in advance. In this way, it is intuitively understood that the user A is associated with the surface S1.

In this case, as shown in the center of FIG. 18, for example, the user A can be called by a user B knocking the surface S1 or the like. Specifically, when it is detected that the surface S1 has been knocked, the Cube 1 performs calling of the tablet terminal 20A, based on the ID associated with the surface S1. For example, the Cube 1 calls the tablet terminal 20A, via a network from the Wifi antenna 122, or via a mobile phone network from a telephone network antenna (not shown in the figures) having a function to connect wirelessly to a mobile phone network for telephone calls and communication.

Also, when the tablet terminal 20A responds to a call, such as shown in the right of FIG. 18, a telephone call or video chat with the tablet terminal 20A is implemented, via an imaging section 3A, a speaker 4A, a microphone (not shown in the figures) or the like fixed to the surface S1 of the Cube 1.

Heretofore, an outline of the present embodiment has been described. To continue, a CPU 100-3 of the Cube 1 according to the present embodiment will be described by referring to FIG. 19.

(3-3-1. Functional Configuration)

Figure 19:
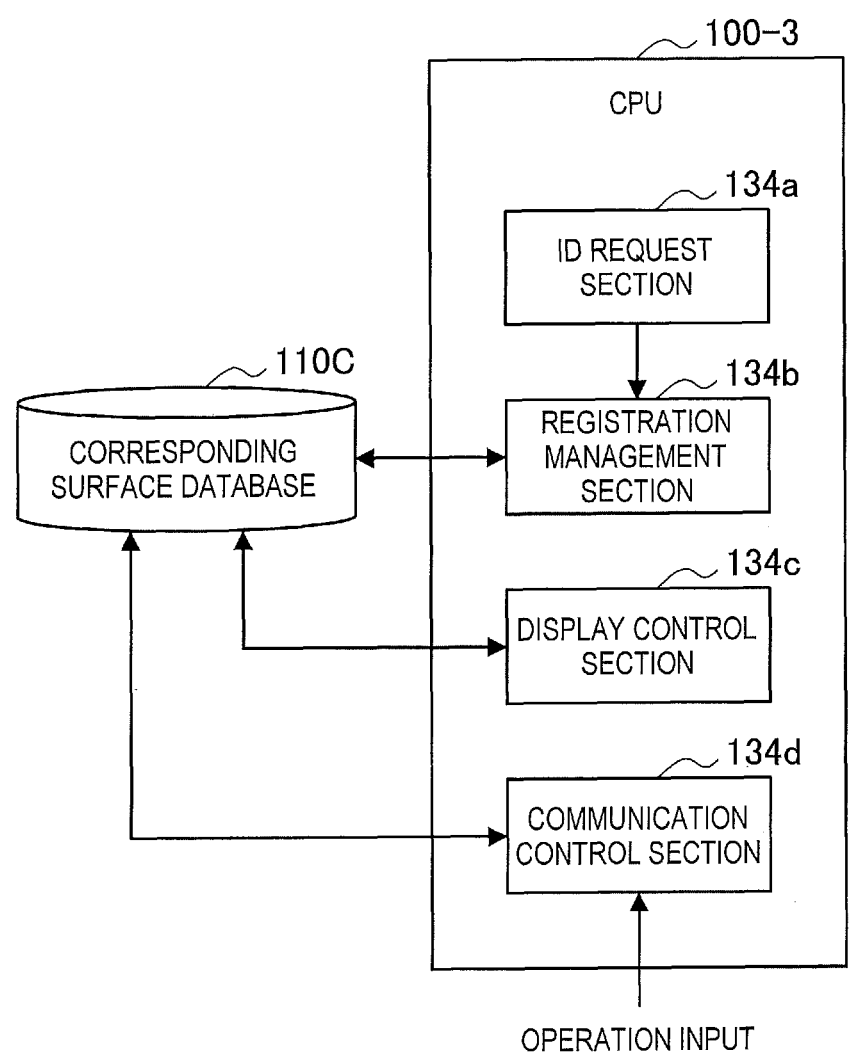
FIG. 19 is a block diagram which shows a functional configuration of the CPU of the Cube according to the third embodiment.

FIG. 19 is a block diagram which shows a functional configuration of the CPU 100-3 of the Cube 1 according to the third embodiment. As shown in FIG. 19, the CPU 100-3 according to the present embodiment functions as an ID request section 134a, a registration management section 134b, a display control section 134c, and a communication control section 134d.

In the case where attachment of one of the tablet terminals 20 to a surface of this Cube 1 has been detected by the proximity communication/charging processing section 116, the ID request section 134a requests transmission of an ID (at least one of a device ID and a user ID) to the tablet terminal 20. The ID request section 134a supplies the acquired user ID/device ID to the registration management section 134b.

The registration management section 134b manages an association of the user IDs/device IDs with the IDs of each surface (surface S1, surface S2, surface S3 or the like) of the Cube 1, which are stored in a corresponding surface database 110c of the storage section 110. Specifically, the registration management section 134b performs registration of new user IDs/device IDs and deletion of registered user IDs/device IDs.

The display control section 134c refers to the corresponding surface database 110c, and controls the display of the display sections 2 fixed to each surface, so as to specify the tablet terminals (or users who are the owners) associated to each surface of the Cube 1. For example, the display control section 134c performs control so as to display at least one of a prescribed color, name, facial image, icon, avatar, character or the like, which have been set for the users in advance, on the display sections 2 of the associated surfaces. Or, the display control section 134c defines the display section 2 set on the upper surface of the Cube 1 as a special display, and may display, on the display section 2 of the upper surface, a display which shows the users associated with the four side surfaces connected to the upper surface.

The communication control section 134d performs control so as to start communication (two-way communication such as a telephone call or video chat) with the tablet terminal 20 associated with surface on which a call operation has been performed, in accordance with the call operation by a user to at least one surface out of all the surfaces which form the Cube 1. Communication with the tablet terminal 20 is performed via a network from the Wifi antenna 122, or via a mobile phone network from a telephone network antenna (not shown in the figures). Further, the call operation (such as knocking) by the user to a surface of the Cube 1 may be detected, for example, by touch sensors (an example of the operation section 104) layered and set on the display section 2, or may be detected by buttons or switches (an example of the operation section 104) set on the surface. Note that, the communication control section 134d according to the present embodiment is not limited to a start control of two-way communication, and may be controlled so as to perform a one-way call notification to the tablet terminal 20. The tablet terminal 20 which receives the call notification may light up the display section 22, and may display "There is a call from Cube 1" on the display section 22.

Heretofore, a functional configuration of the CPU 100-3 according to the present embodiment has been described. Next, an operation process according to the present embodiment will be described by referring to FIG. 20 to FIG. 22.

(3-3-2. Operation Process)

Figure 20:
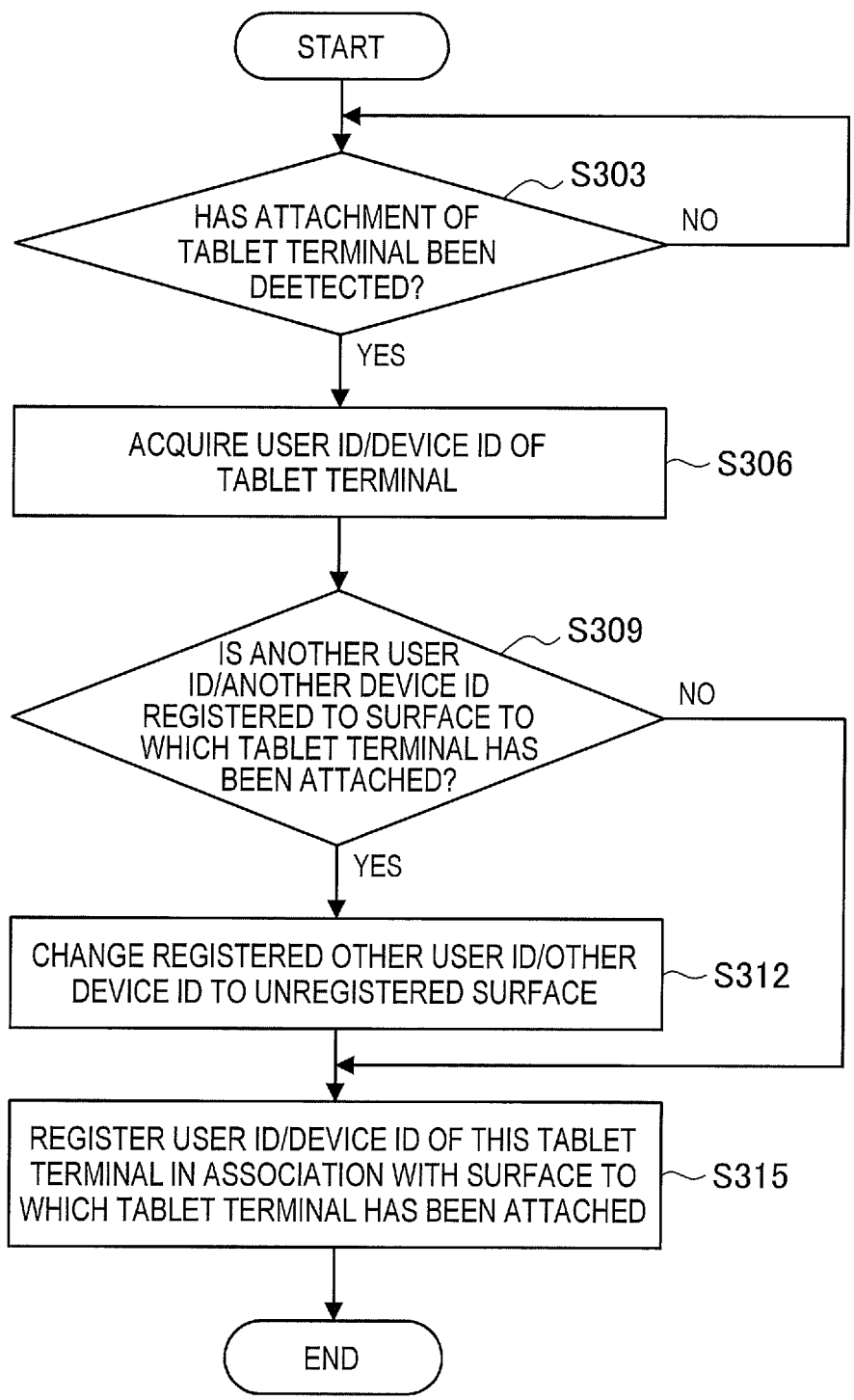
FIG. 20 is a flow chart which shows a registration process of an ID associated with each surface of the Cube according to the third embodiment.

FIG. 20 is a flow chart which shows a registration process of IDs corresponding to each surface of the Cube 1 according to the third embodiment. As shown in FIG. 20, first in step S318, the Cube 1 judges whether or not attachment of one of the tablet terminals 20 to the Cube 1 has been detected by the proximity communication/charging processing section 116.

In the case where attachment of one of the tablet terminals 20 has been detected (S303/Yes), in step S306, the ID request section 134a requests, to the tablet terminal 20, transmission of a user ID/device ID of the tablet terminal 20, and acquires the user ID/device ID. The ID request section 134a supplies the acquired ID of the tablet terminal 20 to the registration management section 134b.

Next, in step S309, the registration management section 134b refers to the corresponding surface database 110c, and judges whether or not another user ID/other device ID has already been registered to the surface to which the tablet terminal 20 has been attached.

In the case where another user ID/another device ID has already been registered (S309/Yes), in step S312, the registration management section 134b changes the registered other user ID/other device ID to an unregistered surface.

Figure 21:
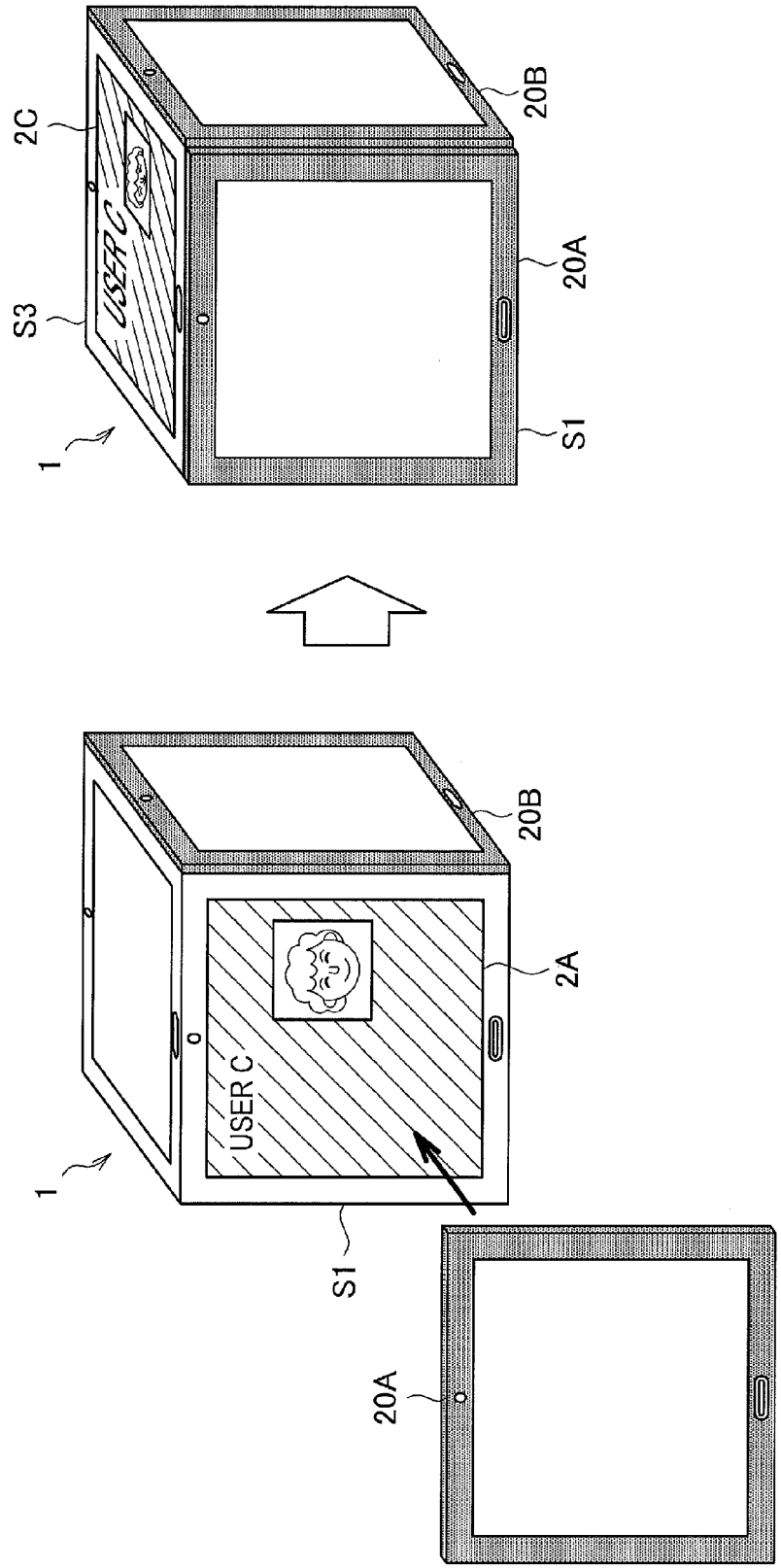
FIG. 21 is a figure for describing a case where another registered ID is changed to an unregistered surface according to the third embodiment.

For example, in the case where the ID of a user C has already been associated to the surface S1 of the Cube 1 and registered in the corresponding surface database 110c, an image which specifies the user C is displayed on the display section 2A of the surface S1, such as shown in the left of FIG. 21. In such a case, when the tablet terminal 20A is attached to the surface S1 of the Cube 1, the registration management section 134b of the Cube 1 changes the already registered ID of the user C to an unregistered surface, for example, to the upper surface S3. In accordance with this, the display control section 134c of the Cube 1 performs control so that an image which specifies the user C is displayed on the display section 2C of the upper surface S3 of the Cube 1, such as shown in the right of FIG. 21.

Then, in the case after the registration change or where there is no other user ID/other device ID registered (S309/No), in step S315, the registration management section 134b associates the ID of this tablet terminal 20 to the surface to which the tablet terminal 20 has been attached, and registers this association in the corresponding surface database 110c.

Heretofore, an association process (registration process) of the surfaces of the Cube 1 and the IDs of the tablet terminal 20s has been described. Note that, in the case where there are no unregistered surfaces in the above described step S312, the registration management section 134b may produce an unregistered surface, by deleting an ID with the oldest registration time (the registration is old). To continue, an operation in the case where the tablet terminal 20 has been detached from the Cube 1, and thereafter there is a call operation by another user to the surface of the Cube 1, will be described by referring to FIG. 22.

Figure 22:
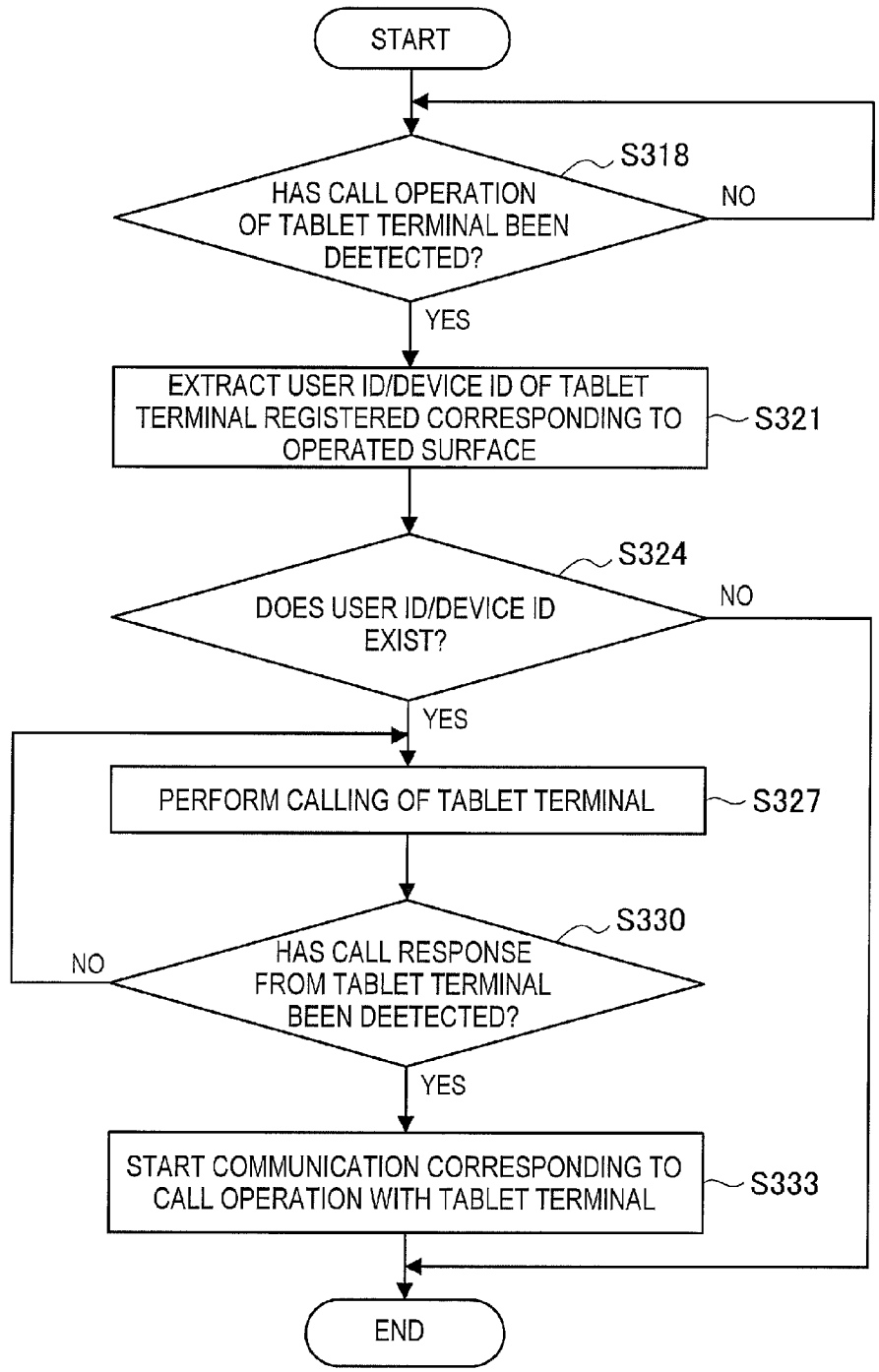
FIG. 22 is a flow chart which shows a communication control process of the Cube according to the third embodiment.

FIG. 22 is a flow chart which shows a communication control process of the Cube 1 according to the third embodiment. As shown in FIG. 22, first in step S318, the operation section 104 of the Cube 1 judges whether or not a call operation by a user to the tablet terminal 20 has been detected.

In the case where a call operation has been detected (S318/Yes), in step S321, the communication control section 134d extracts, from the corresponding surface database 110c, a user ID/device ID of the tablet terminal 20 which is registered corresponding to the surface at which the call operation has been detected.

Next, in step S324, the communication control section 134d judges whether or not a user ID/device ID associated to the surface at which the call operation has been detected exists in the corresponding surface database 110c.

In the case where a user ID/device ID exists in the corresponding surface database 110c (S324/Yes), the communication control section 134d performs a call operation of the tablet terminal 20 via a network/mobile phone network, based on the extracted user ID/device ID.

Next, in step S330, the communication control section 134d judges whether or not a call response from the tablet terminal 20 has been detected.

In the case where a call response has not been detected (S330/No), in step S327, the communication control section 134d repeats the call. In the case where there is no response from the tablet terminal 20 even if the call is repeated a prescribed number of times, the communication control section 134d ends the call.

On the other hand, in the case where a call response has been detected (S330/Yes), in step S333, the communication control section 134d performs control so as to start communication (such as a voice call or a video chat) corresponding to the call operation with the tablet terminal 20.

Heretofore, communication control according to the present embodiment has been described. Note that, communication control according to the present embodiment is not limited to that performed by the Cube 1, and may be performed by the Cube 1 and the server 30, for example. Specifically, in the case where the server 30 has a corresponding surface database and a registration management section, the processes of steps S309 to S315 shown in FIG. 20, and the processes of steps S321 to S333 shown in FIG. 22, may be performed at the server 30 side.

3-4. The Fourth Embodiment

Next, a fourth embodiment of the present disclosure will be described by referring to FIG. 23 to FIG. 25. By detecting a nearby tablet terminal 20, the Cube 1 according to the fourth embodiment can implement cooperative operations such as performing output control for content corresponding to the tablet terminal 20. Hereinafter, an outline of the fourth embodiment will be described by referring to FIG. 23.

Figure 23:
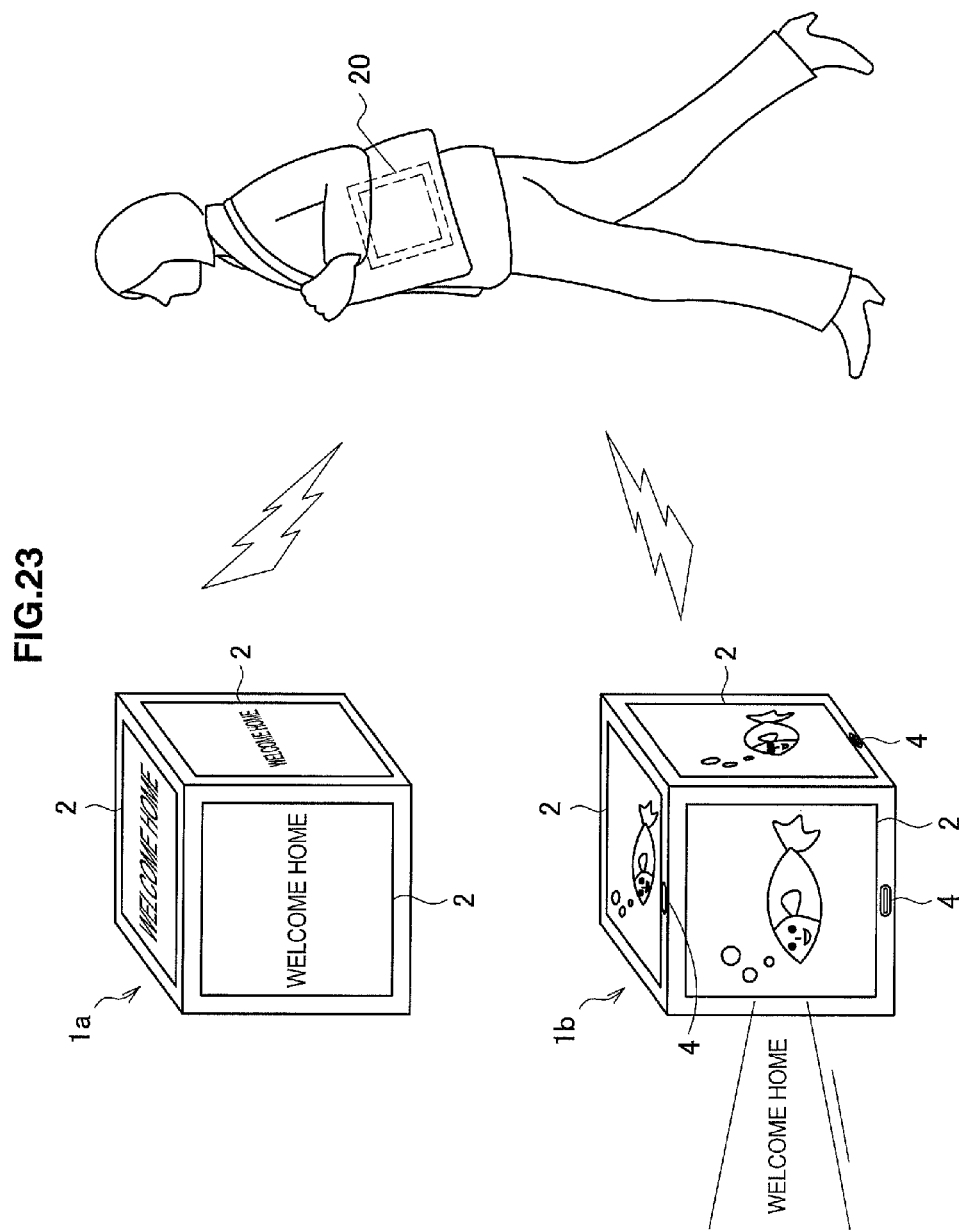
FIG. 23 is a figure for describing an outline of a fourth embodiment of the present disclosure.

FIG. 23 is a figure for describing an outline of the fourth embodiment. As shown in FIG. 23, when a Cube 1a according to the present embodiment detects that the tablet terminal 20 is nearby (comes closer), the Cube 1a outputs a message to the owner of the tablet terminal 20. Specifically, for example, as shown in FIG. 23, the Cube 1a displays a greeting message such as "Welcome Home" on the display section 2. An appropriate greeting is automatically selected for the greeting content in accordance with the time zone. Further, in the case where a message from another user has been registered, this message is displayed.

Further, the present embodiment is not limited to the display of a message, and audio output of a message may be performed in combination with the display of a message. For example, as shown in FIG. 23, a Cube 1b according to the present embodiment allows an agent to be displayed on the display section 2, and allows audio output of a greeting such as "Welcome Home" by the voice of the agent from the speaker 4.

Heretofore, an outline of the present embodiment has been described. To continue, a CPU 100-4 of the Cube 1 according to the present embodiment will be described by referring to FIG. 24.

(3-4-1. Functional Configuration)

Figure 24:
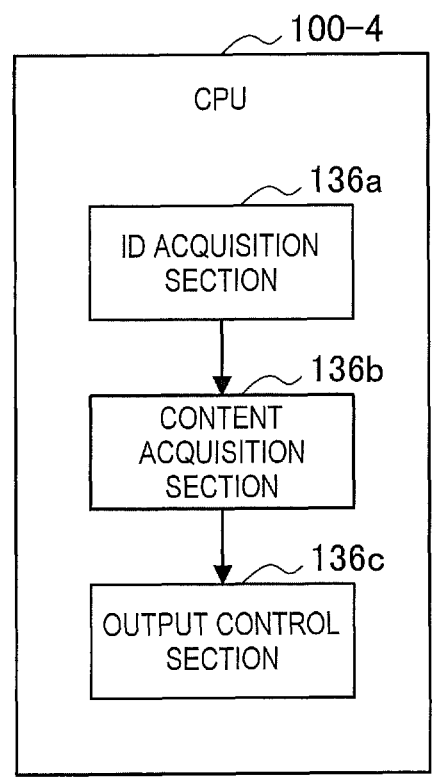
FIG. 24 is a block diagram which shows a functional configuration of the CPU of the Cube according to the fourth embodiment.

FIG. 24 is a block diagram which shows a functional configuration of the CPU 100-4 of the Cube 1 according to the fourth embodiment. As shown in FIG. 24, the CPU 100-4 according to the present embodiment functions as an ID acquisition section 136a, a content acquisition section 136b, and an output control section 136c.

The ID acquisition section 136a receives an ID (device ID/user ID) corresponding to one of the tablet terminals 20 transmitted from the tablet terminal 20. Specifically, a signal broadcast from the tablet terminal 20 at fixed intervals may be received, and an ID from this signal may be acquired, or polling to the tablet terminal 20 may be started to trigger the detection of a user by the imaging section 3, motion sensor or the like, and the ID may be received. Further, the ID acquisition section 136a can acquire only IDs which have been set as users of the Cube 1 in advance. In this way, access will be refused from the tablet terminals 20 which have not been set.

The content acquisition section 136b acquires prescribed content in accordance with the ID of the tablet terminal 20 acquired by the ID acquisition section 136a. The prescribed content may be acquired from the storage section 110 built into this Cube 1, or may be acquired from the server 30 via a network. For example, the content acquisition section 136b acquires, as the prescribed content, messages for the owner (user) of the tablet terminal 20, such as greeting content by a prescribed agent which has been set in advance by the user, or message content from other users to the user.

The output control section 136c performs control so as to output content acquired by the content acquisition section 136b from the display section 2, which is displayed on at least one surface of the Cube 1, or from the speaker 4. Note that, in the case where a detachable tablet terminal has been attached to a surface of the Cube 1, the output control section 136c can perform control so as to output content from the display section or speaker of the attached tablet terminal.

Heretofore, a functional configuration of the CPU 100-4 according to the present embodiment has been described. Next, an operation process according to the present embodiment will be described by referring to FIG. 25.

(3-4-2. Operation Process)

Figure 25:
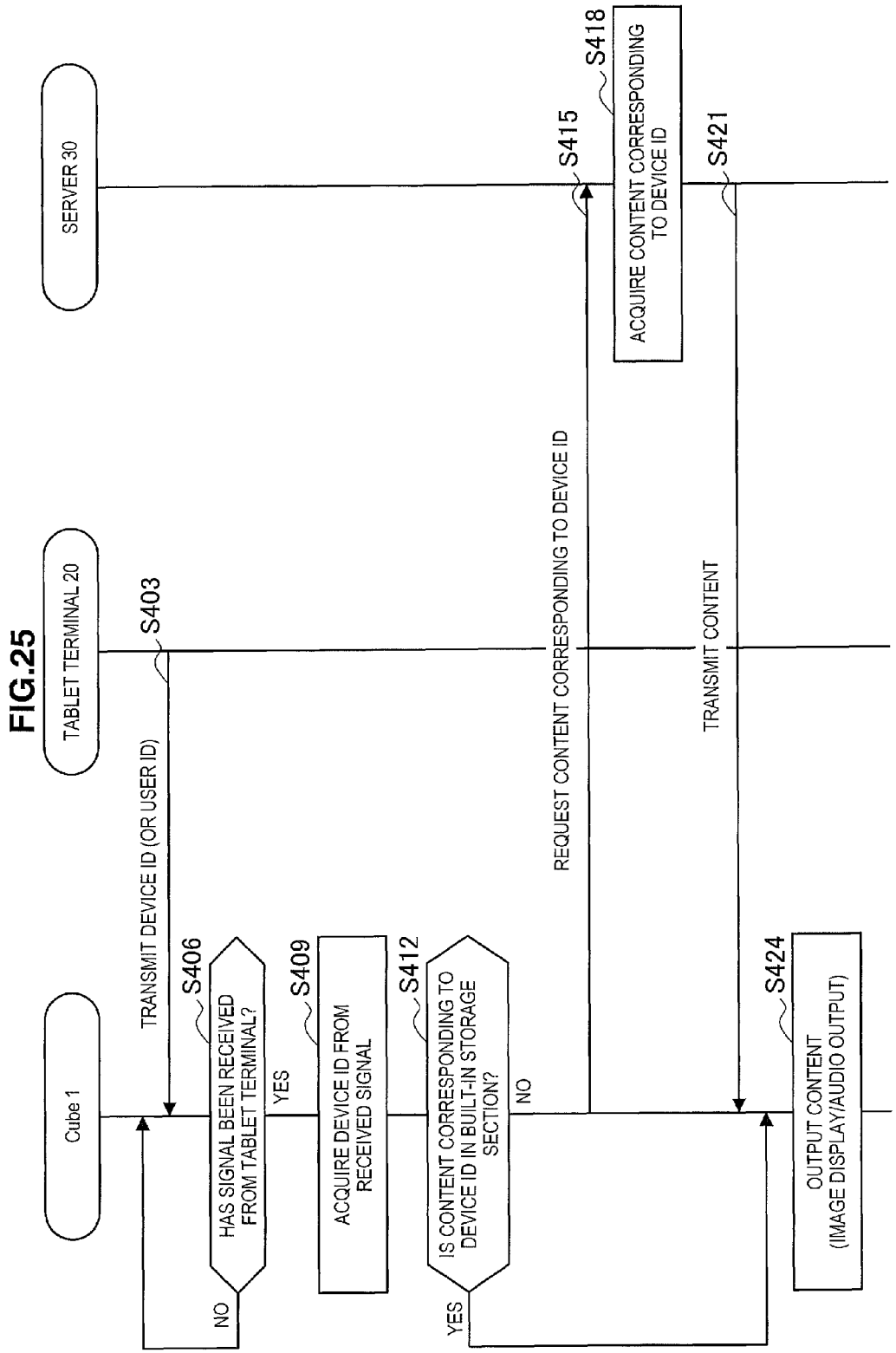
FIG. 25 is a flow chart which shows an operation process when the Cube according to the fourth embodiment outputs content corresponding to a nearby tablet terminal.

FIG. 25 is a flow chart which shows an operation process when content is output corresponding to one of the tablet terminals 20 near to the Cube 1 according to the fourth embodiment. As shown in FIG. 25, first in step S403, one of the tablet terminals 20 transmits a signal, which includes a device ID/user ID, to the Cube 1 automatically or in accordance with a request from the Cube 1.

Next, in the case where the signal has been received from the tablet terminal 20 (S406/Yes), in step S409, the ID acquisition section 136a of the Cube 1 acquires the device ID/user ID from the received signal. Here, the Cube 1 can receive a signal from the tablet terminal 20 which has approached within a prescribed range by the proximity communication/charging antenna 117.

Hereinafter, as an example, a description will be made by assuming a case in which the ID acquisition section 136a acquires a device ID from the tablet terminal 20.

Next, in step S412, the content acquisition section 136b judges whether or not content corresponding to the device ID of the tablet terminal 20 acquired by the ID acquisition section 136a is stored in the built-in storage section 110.

In the case where content is not stored in the storage section 110 (S412/No), in step S415, the content acquisition section 136b requests transmission of content corresponding to the device ID to a prescribed server 30 on a network.

Next, in step S418, the server 30 retrieves and acquires content corresponding to the device ID in accordance with the request from the Cube 1.

To continue, in step S421, the server 30 transmits the acquired content to the Cube 1.

Then, in the case where content corresponding to the ID of the tablet terminal 20 has been received from the server 30, or in the case where content can be acquired from the storage section 110 (S412/Yes), in step S424, the output control section 136c of the Cube 1 performs control so as to output the content.

Heretofore, an output control system according to the fourth embodiment has been described in detail.

3-5. The Fifth Embodiment

Next, a fifth embodiment of the present disclosure will be described by referring to FIG. 26 to FIG. 28. While a message is output for the owner of a nearby tablet terminal 20 in the above described fourth embodiment, output control according to an embodiment of the present disclosure is not limited to this, and a webpage registered in advance by the tablet terminal 20 can be output. In addition, it is possible for the Cube 1 according to the present embodiment to perform wireless power supply to the nearby tablet terminal 20. Hereinafter, an outline of the Cube 1 according to the fifth embodiment, which performs cooperative operations such as the output of such a webpage corresponding to a nearby tablet terminal 20 and the supply of power (power transmission) to the tablet terminal 20, will be described by referring to FIG. 26.

Figure 26:
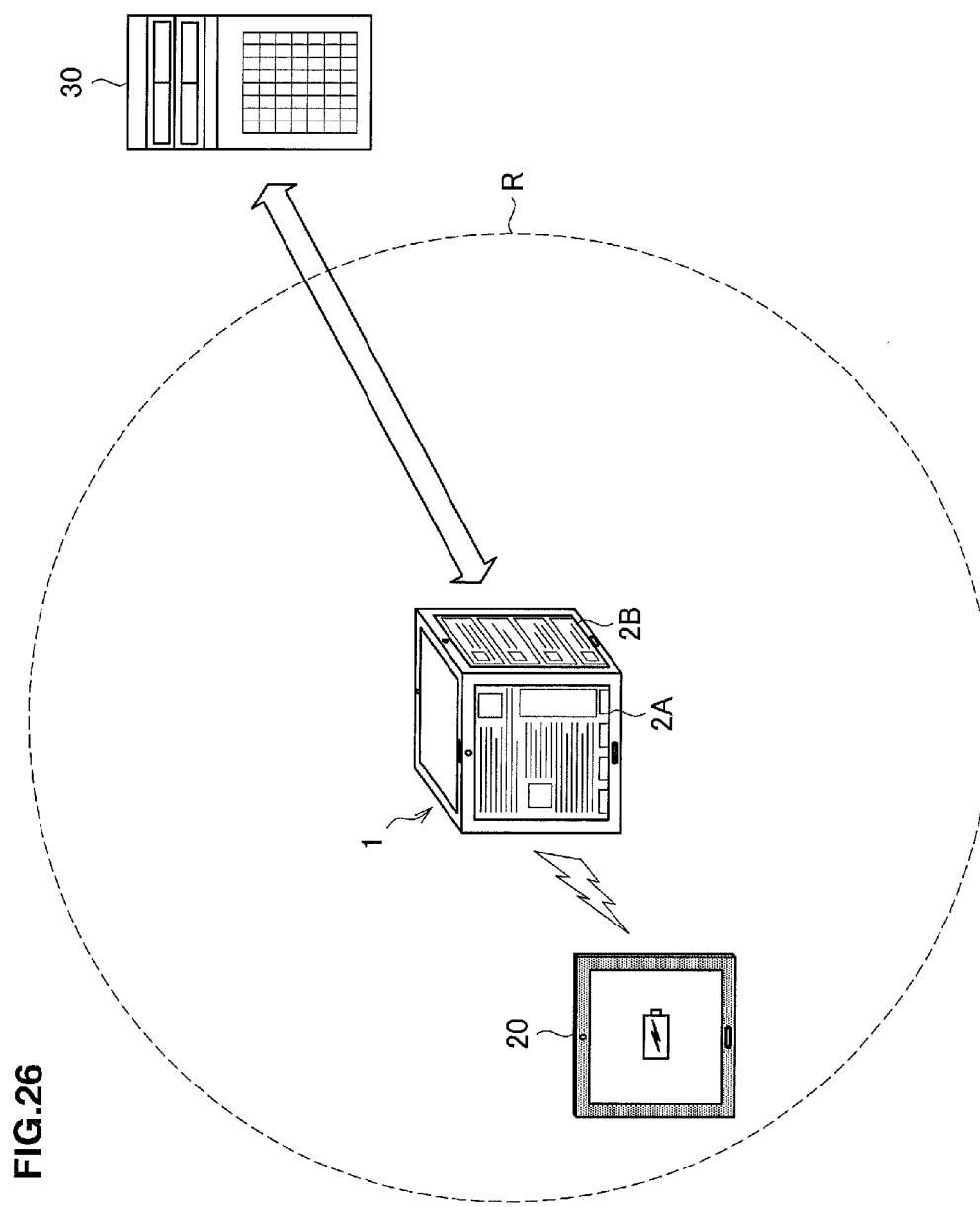
FIG. 26 is a figure for describing an outline of the functions of the Cube according to a fifth embodiment of the present disclosure.

FIG. 26 is a figure for describing an outline of the functions of the Cube 1 according to the fifth embodiment. As shown in FIG. 26, when one of the tablet terminals 20 approaches within a prescribed range R centering on the Cube 1, the Cube 1 starts wireless power supply to the tablet terminal 20. The Cube 1 may perform control so as to start wireless power supply in the case where the remaining battery amount of the tablet terminal 20 is equal to or less than a prescribed value. Further, in this case, the tablet terminal 20 may display a mark shown while supplying power.

Further, in the case where power supply starts and a URL of a webpage, which has been registered as a bookmark or favorite in advance in the tablet terminal 20, is received from the tablet terminal 20, the Cube 1 connects to the server 30 via a network, and acquires the webpage shown by this URL. Also, in the case where there is a plurality of bookmarks or the like, the Cube 1 displays each of the webpages on each of the display sections 2A and 2B of each surface which forms the Cube 1. In this way, a user can browse, with the Cube 1, the webpages bookmarked in advance by the tablet terminal 20, even if the remaining battery amount of the tablet terminal 20 is low, or during charging by the Cube 1.

Heretofore, an outline of the present embodiment has been described. To continue, a CPU 100-5 of the Cube 1 according to the present embodiment will be described by referring to FIG. 27.

(3-5-1. Functional Configuration)

Figure 27:
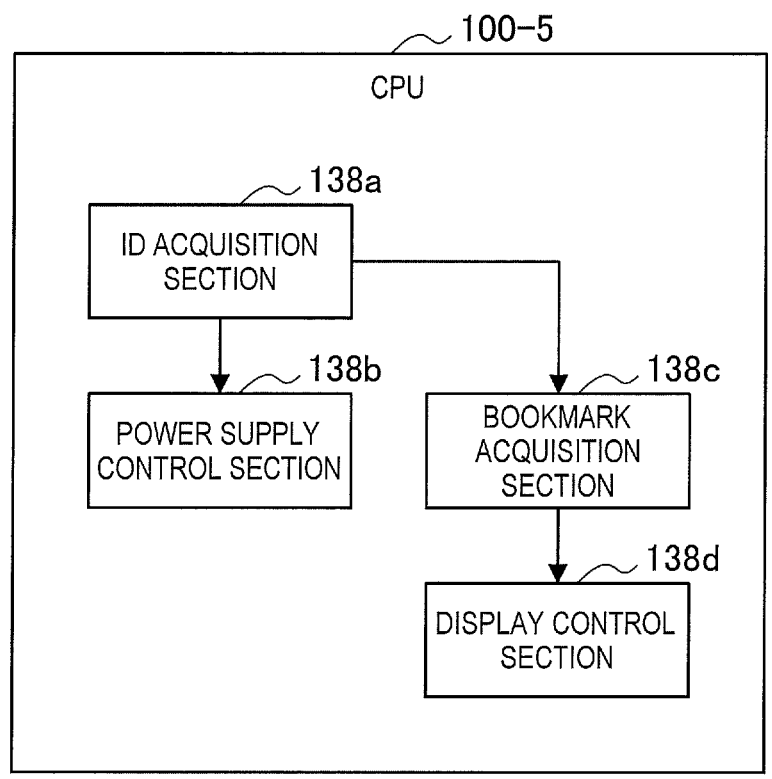
FIG. 27 is a block diagram which shows a functional configuration of the CPU of the Cube according to the fifth embodiment.

FIG. 27 is a block diagram which shows a functional configuration of the CPU 100-5 of the Cube 1 according to the fifth embodiment. As shown in FIG. 27, the CPU 100-5 according to the present embodiment functions as an ID acquisition section 138*a*, a power supply control section 138*b*, a bookmark acquisition section 138*c*, and a display control section 138*d*.

The ID acquisition section 138*a* receives an ID (device ID/user ID) corresponding to one of the tablet terminals 20 transmitted from the tablet terminal 20. Specifically, a signal broadcast from the tablet terminal 20 at fixed intervals may be received, and an ID from this signal may be acquired, or polling to the tablet terminal 20 may be started, to trigger the detection of a user by an imaging section 3, motion sensor or the like, and an ID may be received. Further, the ID acquisition section 138*a* can acquire only IDs which have been set as users of the Cube 1 in advance. In this way, access will be refused from the tablet terminals 20 which have not been set.

The power supply control section 138*b* performs control so as to supply power by the proximity communication/charging processing section 116 and the proximity communication/charging antenna 117 to the tablet terminal 20 from which an ID has been acquired by the ID acquisition section 138*a*. Further, the power supply control section 138*b* may start wireless power supply in the case where the remaining battery amount of the tablet terminal 20 is equal to or below a prescribed value.

The bookmark acquisition section 138*c* requests information of a bookmark which shows the URL of a webpage registered in advance for the tablet terminal 20 from which an ID has been acquired by the ID acquisition section 138*a*, and acquires the webpage shown by this URL (bookmark).

The display control section 138*d* performs control so as to display the webpage acquired by the bookmark acquisition section 138*c* on the display section 2. Further, in the case where a plurality of webpages corresponding to a plurality of bookmarks have been acquired, the display control section 138*d* performs control so as to display each of the webpages on the display sections 2 of each surface which forms the Cube 1. Note that, in the case where tablet terminals detachable from the surfaces of the Cube 1 have been attached, the display control section 138*d* can perform control so as to display the webpages from the display sections of the attached tablet terminals.

Heretofore, a functional configuration of the CPU 100-5 according to the present embodiment has been described. Next, an operation process according to the present embodiment will be described by referring to FIG. 28.

(3-5-2. Operation Process)

Figure 28:
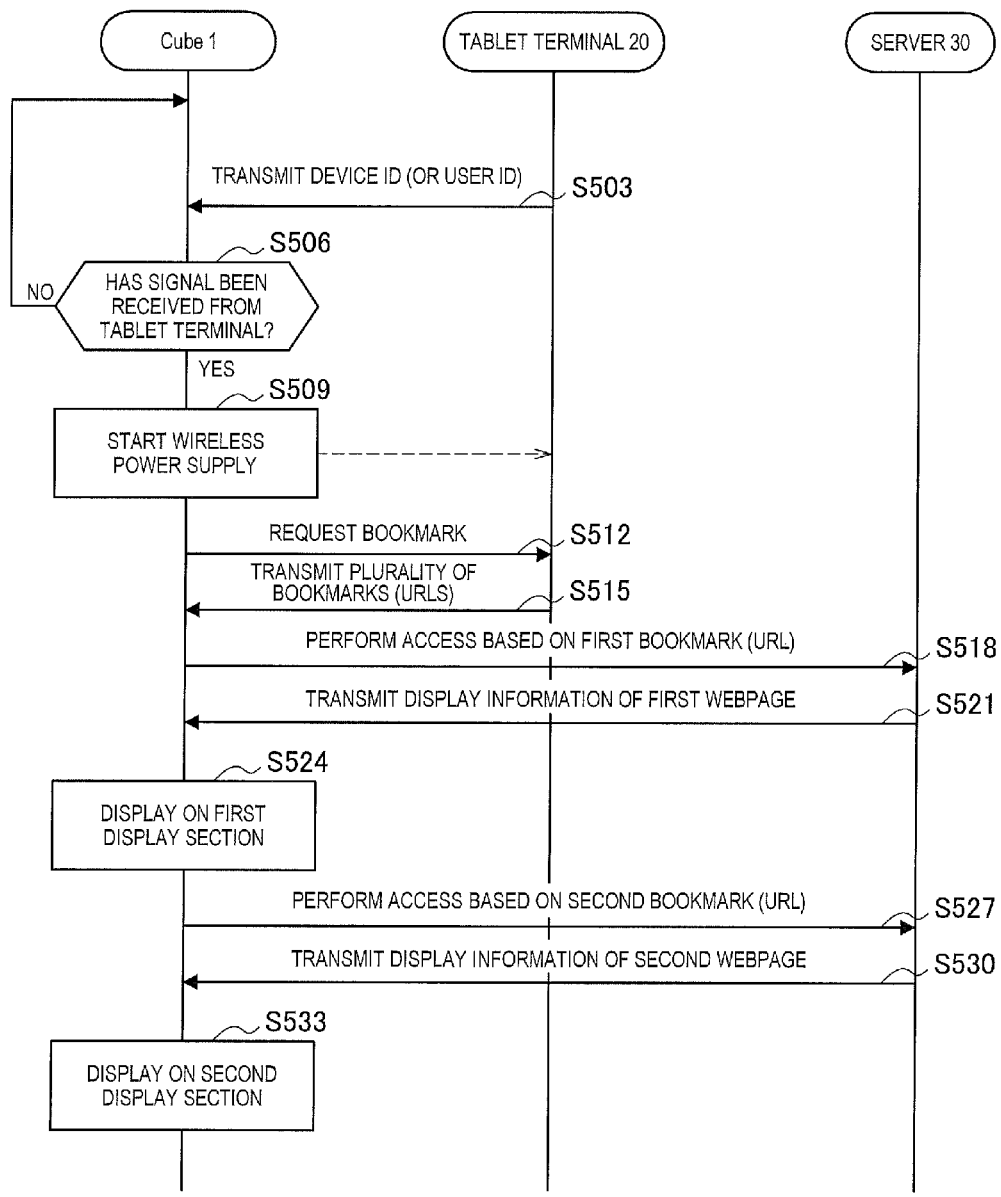
FIG. 28 is a flow chart which shows an operation process when the Cube according to the fifth embodiment performs cooperative operations by communicating with a nearby tablet terminal.

FIG. 28 is a block diagram which shows an operation process when the Cube 1 according to the fifth embodiment performs cooperative operations by communicating with a nearby tablet terminal 20. As shown in FIG. 28, first in step S503, the tablet terminal 20 transmits a signal, which includes a device ID/user ID, to the Cube 1 automatically or in accordance with a request from the Cube 1.

Next, in step S506, the ID acquisition section 138*a* of the Cube 1 judges whether or not a signal has been received from the tablet terminal 20. Specifically, the ID acquisition section 138*a* judges whether or not a device ID/user ID can be acquired from a signal received from the tablet terminal 20. Here, the Cube 1 can receive a signal from the tablet terminal 20 which has approached within a prescribed range by the proximity communication/charging antenna 117. Further, the ID acquisition section 138*a* can acquire only IDs set as users of the Cube 1 in advance. In this way, access will be refused from the tablet terminals 20 which have not been set.

Hereinafter, as an example, a description will be made by assuming a case in which the ID acquisition section 138*a* has acquired a device ID from the tablet terminal 20.

Next, in the case where a signal has been received from the tablet terminal 20 (S506/Yes), in step S509, the power supply control section 138*b* starts power supply, via the proximity communication/charging antenna 117, for the tablet terminal 20 from which a device ID has been acquired by the ID acquisition section 138*a*.

Next, in step S512, the bookmark acquisition section 138*c* requests a bookmark to the tablet terminal 20 from which a device ID has been acquired by the ID acquisition section 138*a*.

Next, in step S515, the tablet terminal 20 transmits, to the Cube 1, information (hereinafter, called bookmark information) of the URL (Uniform Resource Locator) of a webpage registered as a bookmark or registered as a favorite by a user in advance. In the case where a plurality of bookmarks have been registered in the tablet terminal 20, a plurality of bookmark information (URLs) is transmitted.

To continue, in step S518, the bookmark acquisition section 138*c* accesses the server 30 (for example, a DNS server), and requests the webpage shown by the URL, based on the bookmark information (URL) transmitted from the tablet terminal 20. Note that, a case will be assumed in the flow shown in FIG. 28 in which the bookmark acquisition section 138*c* receives a plurality of bookmark information from the tablet terminal 20, and the bookmark acquisition section 138*c* performs a request of the webpage which is shown by first bookmark information.

Next, in step S521, the server 30 transmits display information of a first webpage shown by the received first bookmark information.

Next, in step S524, the display control section 138*d* of the Cube 1 displays the first webpage on a first display section (for example, the display section 2A shown in FIG. 26) included on a surface of the Cube 1, based on the display information of the first webpage transmitted from the server 30.

To continue, in step S527, the bookmark acquisition section 138*c* accesses the server 30, and requests the webpage shown by the URL based on second bookmark information (URL).

Next, in step S530, the server 30 transmits display information of a second webpage shown by the requested second bookmark information.

Next, in step S533, the display control section 138*d* of the Cube 1 displays the second webpage on a second display section (for example, the display section 2B shown in FIG. 26) included on a surface of the Cube 1, based on the display information of the second webpage transmitted from the server 30.

Heretofore, a detailed description has been made for a system in which the Cube 1 according to the fifth embodiment performs cooperative operations by communicating with a nearby tablet terminal 20.

3-6. The Sixth Embodiment

Figure 29:
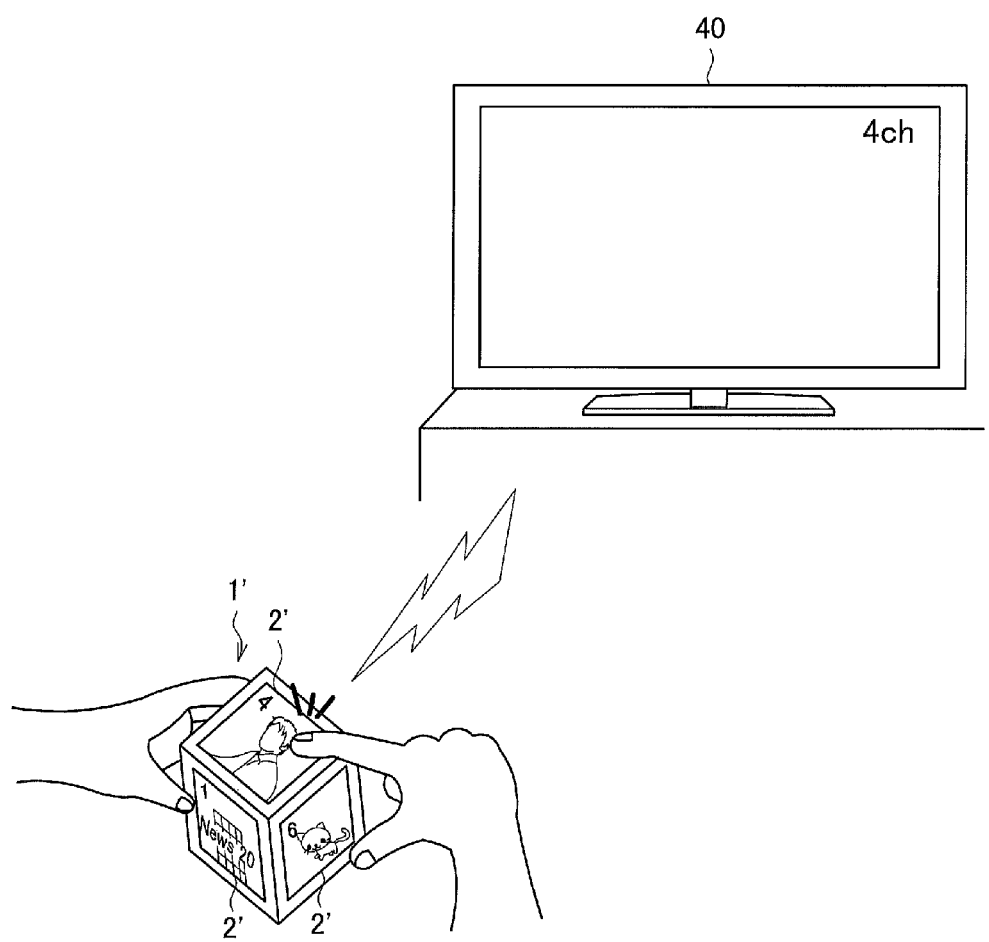
FIG. 29 is a figure for describing an operation outline of the Cube according to a sixth embodiment of the present disclosure.

Next, a sixth embodiment of the present disclosure will be described by referring to FIG. 29 to FIG. 32. FIG. 29 is a figure for describing an operation outline of a Cube 1' according to the sixth embodiment.

As shown in FIG. 29, the Cube 1' according to the sixth embodiment can be held in the hand of a user and be easily operated, when the size of the housing which forms the Cube 1' is a small size (palm sized). Such a small-sized Cube 1' is used, for example, as a remote controller of a television apparatus 40 (a large-sized display device for the home).

Specifically, as shown in FIG. 29, channel videos are displayed on display sections 2' included on each surface of the Cube 1', and control can be performed so as to switch the channel of the television apparatus 40 to a channel of a surface which a user has tapped.

Heretofore, an outline of the present embodiment has been described. To continue, a CPU 100-6 of the Cube 1' according to the present embodiment will be described by referring to FIG. 30.

(3-6-1. Functional Configuration)

Figure 30:
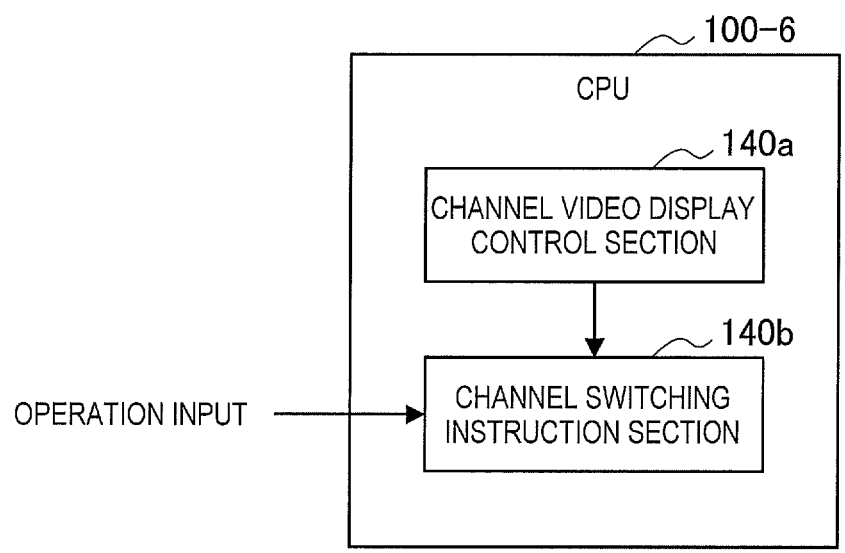
FIG. 30 is a block diagram which shows a functional configuration of the CPU of the Cube according to the sixth embodiment.

FIG. 30 is a block diagram which shows a functional configuration of the CPU 100-6 of the Cube 1' according to the sixth embodiment. As shown in FIG. 30, the CPU 100-6 according to the present embodiment functions as a channel video display control section 140*a*, and a channel switching instruction section 140*b*.

The channel video display control section 140*a* acquires channel videos from the television apparatus 40, when set to a channel switching mode, and performs control so as to display the acquired channel videos on the display sections 2' of each surface for each of the channels. Note that, the channel video display control section 140*a* may perform control so as to divide one surface and display a plurality of channel videos. Further, the channel video display control section 140*a* may divide the channel videos into groups, and may perform control so as to switch the groups of each channel video displayed on the display sections 2' of each surface in accordance with a user operation.

When a user operation (such as a tap operation or a touch operation) has been detected for a surface on which a channel video is displayed, the channel switching instruction section 140*b* instructs the television apparatus 40, so as to switch to a channel corresponding to the operated surface.

Heretofore, a functional configuration of the CPU 100-6 according to the present embodiment has been described. Next, an operation process of the present embodiment will be described by referring to FIG. 31.

(3-6-2. Operation Process)

Figure 31:
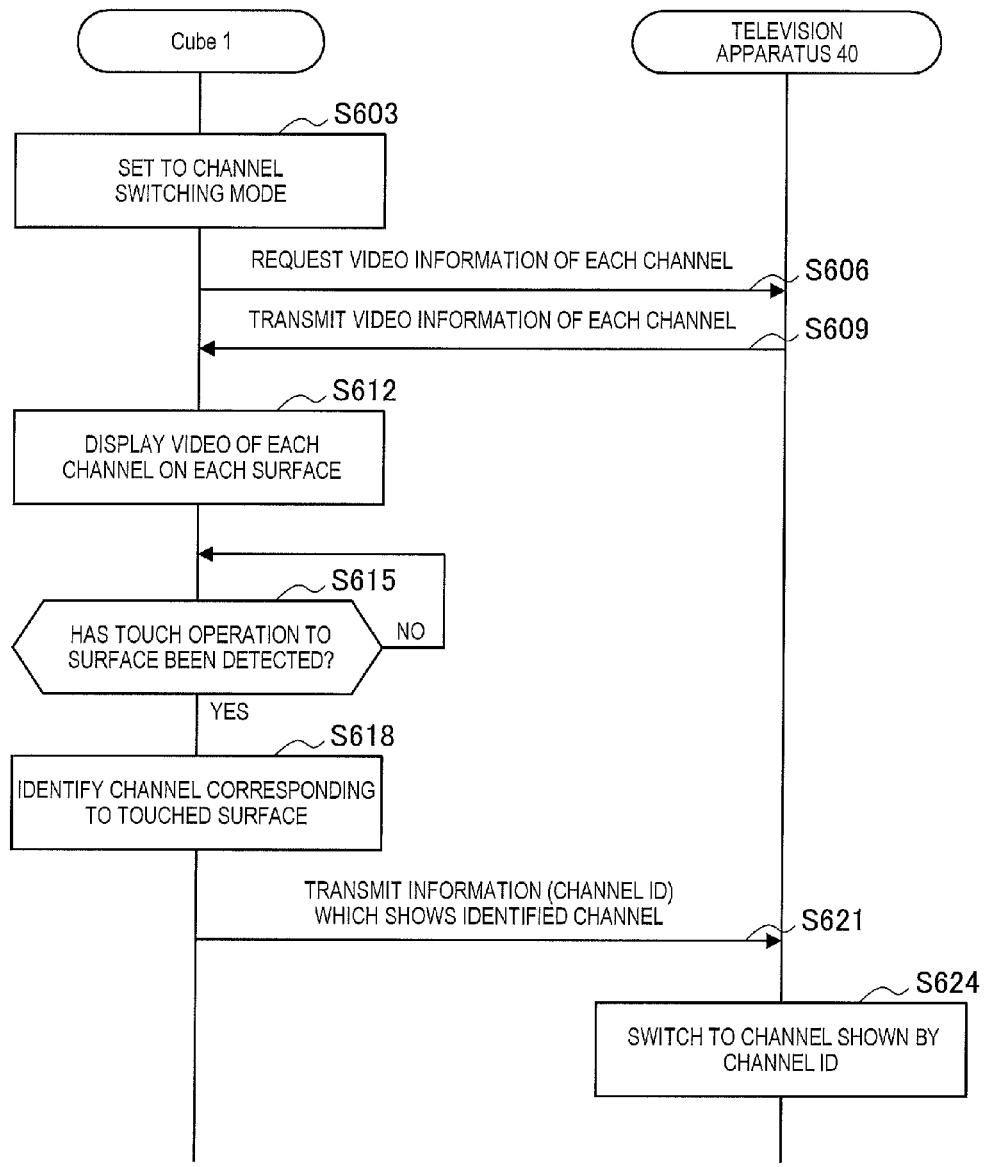
FIG. 31 is a flow chart which shows a channel switching process by the Cube according to the sixth embodiment.

FIG. 31 is a flowchart which shows a channel switching process by the Cube 1' according to the sixth embodiment. As shown in FIG. 31, first in step S603, the Cube 1' is set to a channel switching mode in accordance with a user operation.

Next, in step S606, the Cube 1' set to a channel switching mode requests transmission of video information (a moving image or still image) of each channel to the television apparatus 40 which is present in the surroundings. Wireless communication between the Cube 1' and the television apparatus 40 may be performed via the proximity communication/charging antenna 117, or may be performed by a household wireless LAN via the Wifi antenna 122.

Next, in step S609, the television apparatus 40 transmits video information of each channel to the Cube 1'.

Next, in step S612, the channel video display control section 140*a* of the Cube 1' displays a video of each channel on the display sections 2' of each surface of the Cube 1', based on the video information of each channel transmitted from the television apparatus 40. In this way, a user can select a channel they want to view on the television apparatus 40 by visually confirming each channel video displayed on each surface of the Cube 1'.

To continue, in step S615, the channel switching instruction section 140*b* judges whether or not a user operation (channel selection operation) to a surface of the Cube 1' has been detected by the operation section 104. A channel selection operation is, for example, a touch operation, a tap operation or the like detected by touch sensors (an example of the operation section 104) included on the display sections 2' of each surface.

When a channel selection operation has been detected (S615/Yes), in step S618, the channel switching instruction section 140*b* identifies the channel corresponding to the operated surface.

Next, in step S621, the channel switching instruction section 140*b* transmits information (a channel ID) which shows the identified channel to the television apparatus 40.

Then, in step S624, the television apparatus 40 performs control so as to switch to the channel shown by the channel ID received from the Cube 1'.

Heretofore, a channel switching process by a small-sized Cube 1' according to the present embodiment has been described in detail. Note that, the utilization of the small-sized Cube 1' according to the present embodiment is not limited to channel switching. Accordingly another utilization method of the small-sized Cube 1' according to the present embodiment will be described by using FIG. 32A and FIG. 32B as the following modified example.

(3-6-3. Modified Example)

Figure 32A:
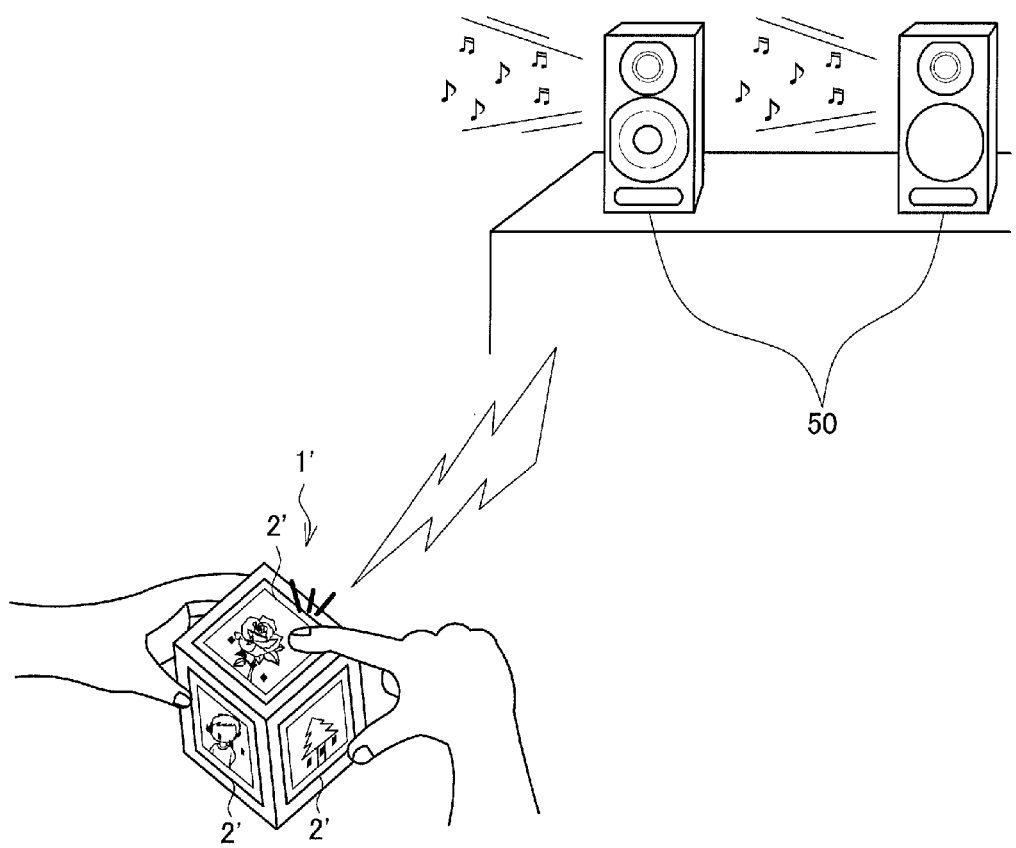
FIG. 32A is a figure for describing a case where the Cube according to a first modified example of the sixth embodiment is used for the selection of audio content.

FIG. 32A is a figure for describing a case where the Cube 1' according to a modified example of embodiment 6 is utilized for the selection of audio content. As shown in FIG. 32A, the Cube 1' displays images (such as a title, jacket image or music video) corresponding to each audio content on the display sections 2' of each surface, and performs control so as to reproduce the audio content corresponding to a surface selectively operated by a user from an audio playback device 50 which is an external device. Specifically, the Cube 1' wirelessly connects to the audio playback device 50, and can perform playback instructions by transmitting audio content.

Note that, the Cube 1' may simultaneously display images corresponding to different audio content on each of a plurality of surfaces of the Cube 1', or may display an image corresponding to sequential audio content on one surface.

Figure 32B:
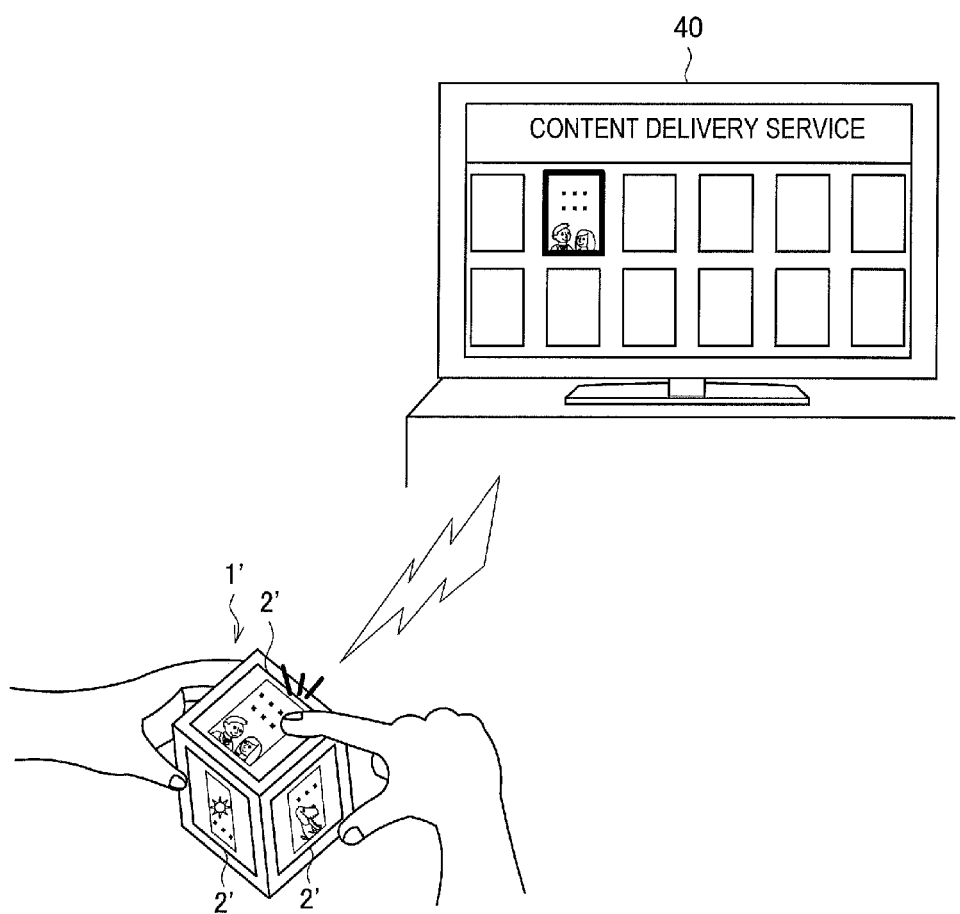
FIG. 32B is a figure for describing a case where the Cube according to a second modified example of the sixth embodiment is used for the selection of video content.

FIG. 32B is a figure for describing a case in which the Cube 1' according to a second modified example of the sixth embodiment is utilized for the selection of video content (such as a movie, drama or music video). As shown in FIG. 32B, the Cube 1' displays images (such as a title image) corresponding to each video content on the display sections 2' of each surface, and performs control so as to reproduce the video content corresponding to a surface selectively operated by a user from a television apparatus 40 which is an external device. Specifically, the Cube 1' wirelessly connects to the television apparatus 40, and can perform playback instructions by transmitting the video content. Further, as shown in FIG. 32B, the Cube 1' may display a cursor together with the video content selected by the Cube 1', by allowing images (such as a title image) corresponding to each video content to also be displayed on the television apparatus 40.

Further, systems have been proposed in recent years which can purchase or rent video content via a network, and it is possible for the Cube 1' to connect to a prescribed content server on a network, and display video content capable of being purchased or rented on each surface of the Cube 1'.

Note that, the Cube 1' may simultaneously display different video content on each of a plurality of surfaces of the Cube 1', or may display sequential video content on one surface.

3-7. The Seventh Embodiment

Figure 33:
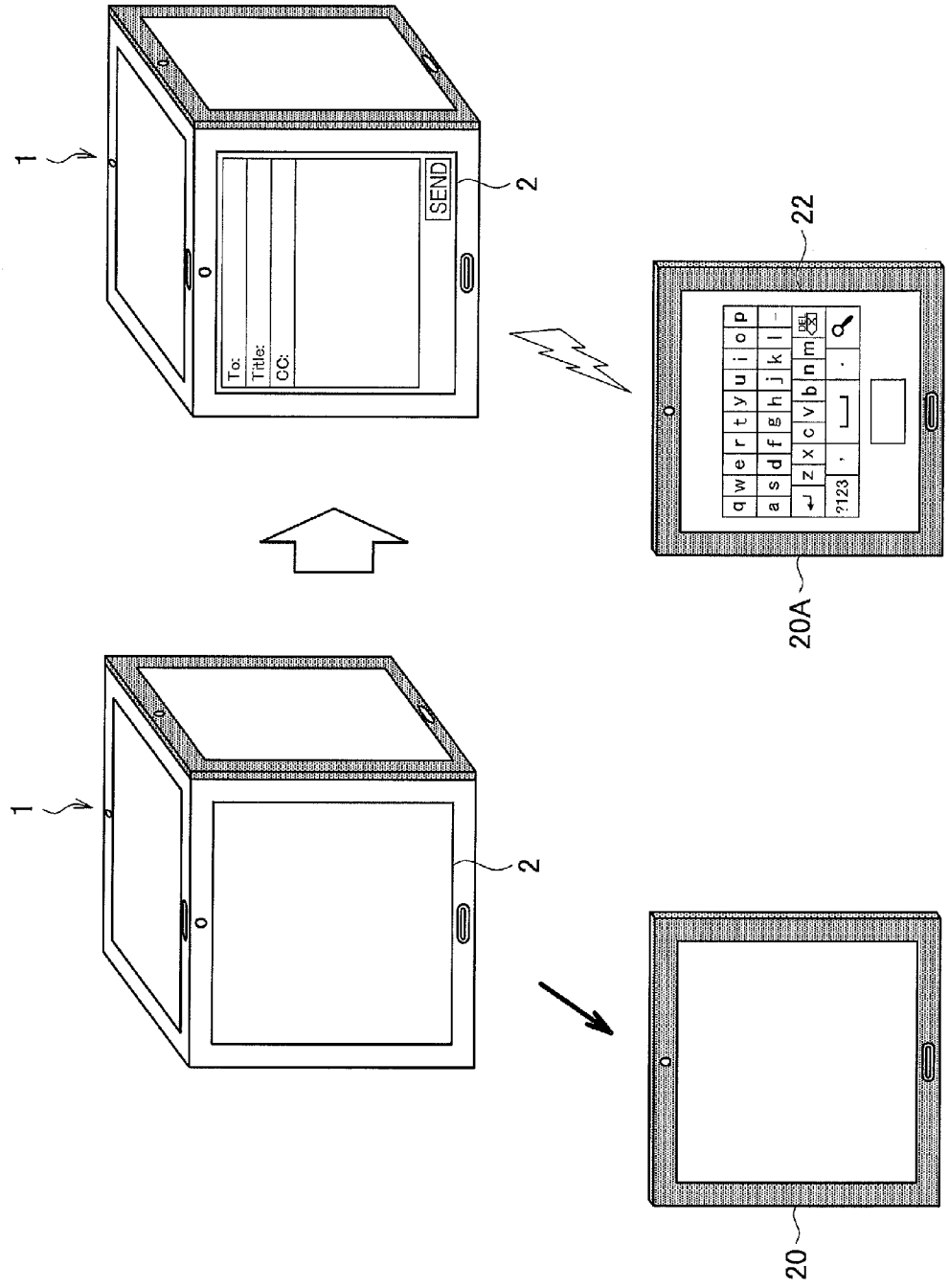
FIG. 33 is a figure for describing an outline of the Cube according to a seventh embodiment of the present disclosure.

Next, a seventh embodiment of the present disclosure will be described by referring to FIG. 33 to FIG. 36. FIG. 33 is a figure for describing an outline of the Cube 1 according to the seventh embodiment. When a character input mode such as a mail creation screen is set, the Cube 1 according to the seventh embodiment is allowed to display a character input screen on the display section 22 of one of the tablet terminals 20 such as shown in the right of FIG. 33, when the detachably attached tablet terminal 20 is detached such as shown in the left of FIG. 33. Here the display section 22 of the tablet terminal 20 is implemented by a touch panel display on which touch sensors are layered, and data input is performed by touch operations of a user on the character input screen.

One the other hand, a character output screen (for example, a mail creation screen) is displayed on the display section 2 of the surface of the Cube 1 to which the tablet terminal 20 has been detached. Also, information input from the character input screen (such as a software keyboard) of the tablet terminal 20 is reflected on the character output screen displayed on the Cube 1.

In this way, in the case where the tablet terminal 20 has been detached, the Cube 1 according to the present embodiment can perform display control of cooperative input/output screens. As described above, since a character input screen is displayed on the detached tablet terminal 20, and is used as an input apparatus to the Cube 1, a user can place the Cube 1 on a table, for example, and the tablet terminal 20 can perform character input in the user's hand.

Heretofore, an outline of the present embodiment has been described by referring to FIG. 33. To continue, the functions of a CPU 100-7 of the Cube 1 according to the present embodiment will be described by referring to FIG. 34.

(3-7-1. Functional Configuration)

FIG. 34 is a block diagram which shows a functional configuration of the CPU 100-7 according to the seventh embodiment. As shown in FIG. 34, the CPU 100-7 functions as an input screen display control section 142a and an output screen display control section 142b.

The input screen display control section 142a performs control so as to allow a prescribed screen (input screen) for inputting information such as characters or figures to be displayed on a display section. Specifically, the input screen display control section 142a performs control so as to allow an input screen to be displayed on the display section 22 of one of the tablet terminals 20 detached from the Cube 1, via the proximity communication/charging processing section 116 and the proximity communication/charging antenna 117.

The output screen display control section 142b performs control so as to allow a prescribed screen (output screen) for outputting (displaying) information such as characters or figures to be displayed on a display section. Specifically, the output screen display control section 142b performs control so as to allow an output screen to be displayed on the display section 2 fixed to the surface from which the tablet terminal 20 has been detached. Further, the output screen display control section 142b performs control to allow information input from the tablet terminal 20 to be reflected on the output screen, via the proximity communication/charging processing section 116 and the proximity communication/charging antenna 117.

Further, the output screen display control section 142b can perform control so as to allow the output screen to be displayed on the television apparatus 40 (an example of a large-sized display device for the home), via the Wifi processing section 121 and the Wifi antenna 122, in accordance with a user operation which specifies an enlarged display.

Further, it is possible for the output screen display control section 142b to also perform control so as to allow the output screen to be projected from a projector section 124 built into the Cube 1 (or a small-sized projector attached to the outside of the Cube 1), in accordance with a user operation which specifies a further enlarged display.

(3-7-2. Operation Process)

Next, an operation process of the present embodiment will be described by referring to FIG. 35. FIG. 35 is a flow chart which shows an input/output screen display control process according to the seventh embodiment. As shown in FIG. 35, first in step S702, the Cube 1 is set to a character input mode. The character input mode is automatically set when a screen capable of performing character input, such as a mail creation screen, a document creation screen or a comment input form of a website, is displayed on a display section (the display section 22 of the tablet terminal 20A detachably attached to the Cube 1).

Next, in step S703, the proximity communication/charging processing section 116 of the Cube 1 judges whether or not the tablet terminal 20 attached to a surface of the Cube 1 has been detached.

Next, when detachment of the tablet terminal 20 has been detected (S703/Yes), in step S706, the input screen display control section 142a of the Cube 1 performs display control on the character input screen for the detached tablet terminal 20.

Next, in step S709, the tablet terminal 20 displays the character input screen on the display section 22 (touch panel display), in accordance with control from the Cube 1. For example, the character input screen is a screen on which a software keyboard or a mouse operation region (executing a touch pad function) is displayed. In this way, a user can perform character input from the tablet terminal 20 placed in the user's hand by detaching from the Cube 1.

To continue, in step S712, the tablet terminal 20 transmits, to the Cube 1, input information input from the character input screen.

Next, when detachment of the tablet terminal 20 has been detected in the above described step S703 (S703/Yes), in step S715, the output screen display section 142b of the Cube 1 displays the character output screen on the display section 2 fixed to the surface from which the tablet terminal 20 has been detached. The character output screen is the above described mail creation screen, document creation screen, comment input form of a website or the like. Also, when input information has been transmitted from the tablet terminal 20 in the above described step S712, the output screen display section 142b allows this input information to be reflected on the character output screen. In this way, since character information input from the tablet terminal 20 by the user is reflected on the character output screen displayed on the display section 2 of the Cube 1, the convenience of the Cube 1 and the tablet terminal 20 will be further improved.

Next, in step S718, the output screen display control section 142b of the Cube 1 judges whether or not an enlargement request by the user has been received. The reception of an enlargement request is received by one action, such as the operation of buttons, switches or touch sensors (an example of the operation section 104) included in the Cube 1, or the shaking of the Cube 1 (detection by the acceleration sensor 113 or the gyro sensor 114). Further, the enlargement request is a request in which enlarged display of the character output screen by a screen larger than the screen of the display section 2 of the Cube 1 is specified. For example, output of the character output screen on a large-sized display device having a display section larger than the display section 2 of the Cube 1 can be included as a method which displays the character output screen enlarged.

Accordingly, in the case where an enlargement request has been received (S718/Yes), next in step S721, the output screen display control section 142b of the Cube 1 transmits the character output screen to the television apparatus 40 which is present in the vicinity, and performs control so as to display the character output screen on the display section of the television apparatus 40. Communication with the television apparatus 40 is performed, for example, via the Wifi processing section 121 and the Wifi antenna 122, or via a wireless LAN within the home.

Next, in step S724, the television apparatus 40 displays the character output screen transmitted from the Cube 1 on the display section of the television apparatus 40. Since it is assumed that the display section of the television apparatus 40 is larger than the display section 2 of the Cube 1, enlarged display of the character output screen is implemented by displaying the character output screen on the display section of the television apparatus 40.

Figure 36A:
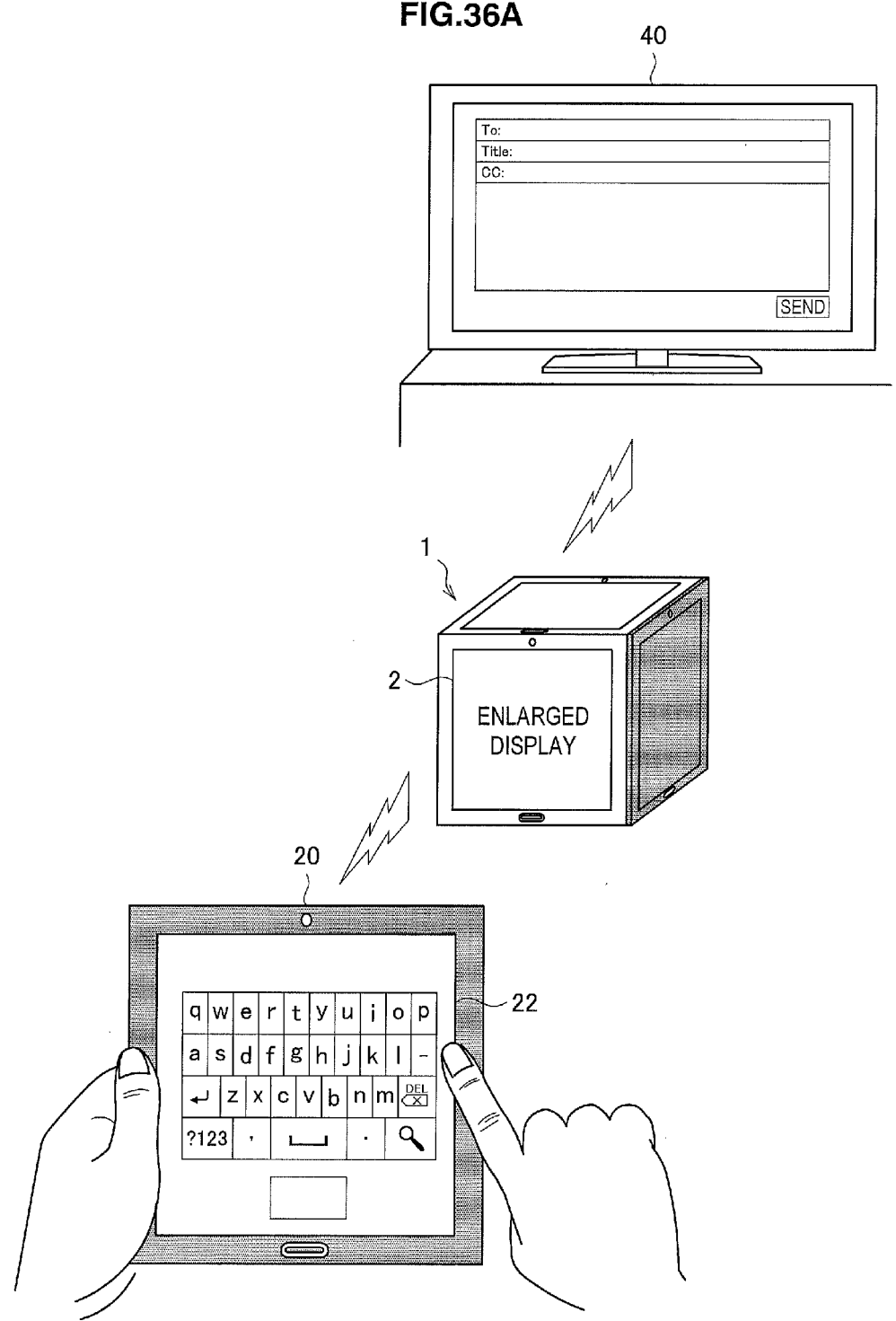
FIG. 36A is a figure for describing an example, in a case where a character output screen is displayed enlarged, in the Cube according to the seventh embodiment.

Here, an explanatory diagram in such a case of performing enlarged display on the television apparatus 40 is illustrated in FIG. 36A. FIG. 36A is a figure for describing an example, in a case where the character output screen is displayed enlarged, in the Cube 1 according to the seventh embodiment. As shown in FIG. 36A, the Cube 1 wirelessly communicates with the television apparatus 40, and is allowed to display the character output screen. In this case, the Cube 1 displays "Enlarged Display" on the display section 2 of the Cube 1, and specifies that an enlarged display process is being executed. Further, the Cube 1 receives information input from the character input screen displayed on the display section 22 of the tablet terminal 20, and is allowed to reflect this information on the character output screen displayed on the television apparatus 40.

To continue, in step S727, the output screen display control section 142b of the Cube 1 judges whether or not a further enlargement request by the user has been received.

In the case where an enlargement request has been received (S727/Yes), in step S730, the output screen display control section 142b of the Cube 1 projects the character output screen with the projector section 124 built into the Cube 1, and performs control so as to perform enlarged display of the character output screen. The projector section 124 is not limited to that built into the Cube 1, and may be an externally attached small-sized projector (a pico-projector).

Figure 36B:
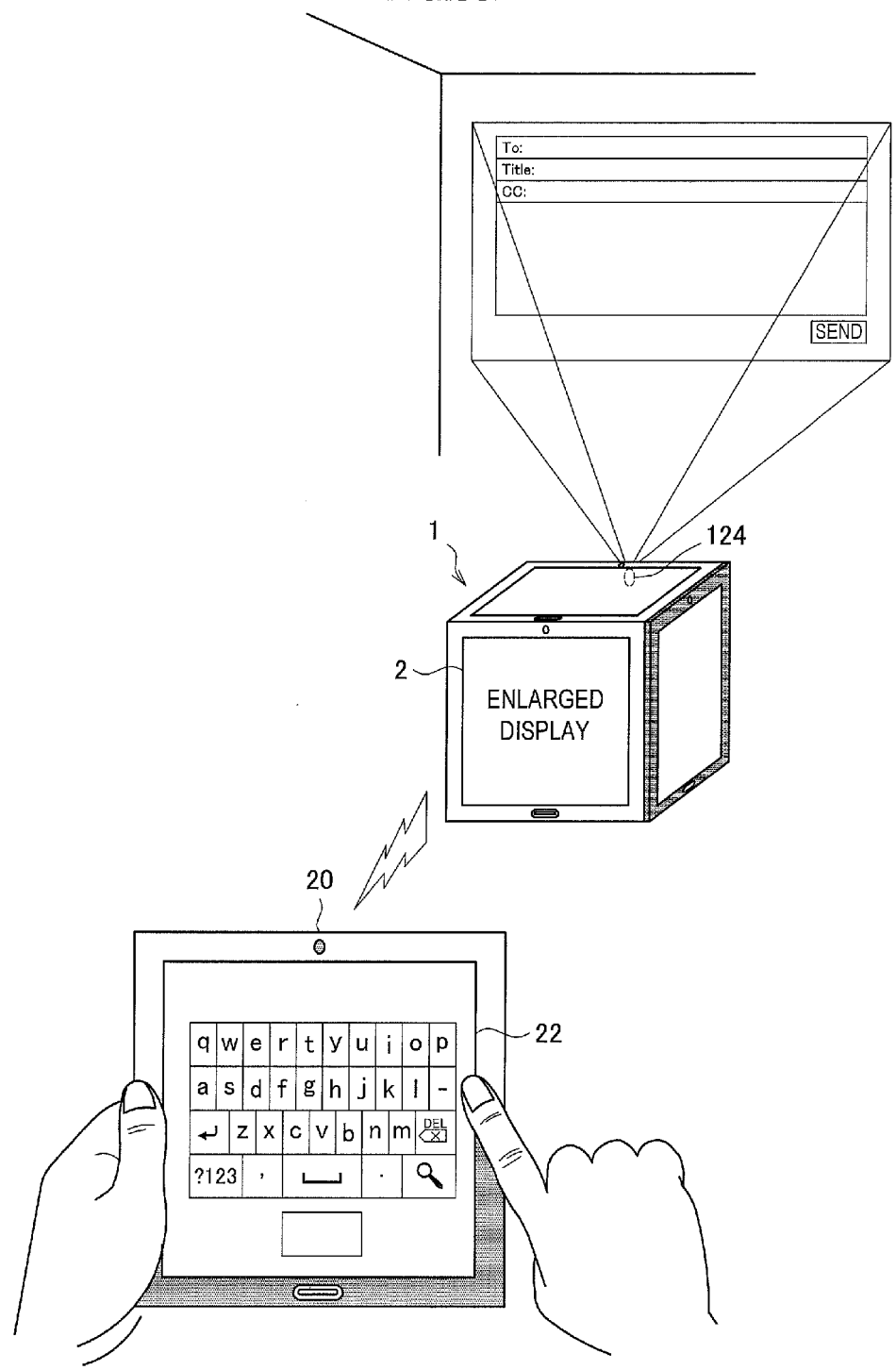
FIG. 36B is a figure for describing an example, in a case where a character output screen is displayed enlarged, in the Cube according to the seventh embodiment.

Here, an explanatory diagram in such a case of performing enlarged display with the projector section 124 is illustrated in FIG. 36B. FIG. 36B is a figure for describing an example, in a case where the character output screen is displayed enlarged, in the Cube 1 according to the seventh embodiment. As shown in FIG. 36B, the Cube 1 has the projector section 124, and projects the character output screen on a wall of a room or the like. In this case, the Cube 1 displays "Enlarged Display" on the display section 2 of the Cube 1, and specifies that an enlarged display process is being executed. Further, the Cube 1 receives information input from the character input screen displayed on the display section 22 of the tablet terminal 20, and is allowed to reflect this information on the projected screen (the projected character output screen).

Heretofore, display control of the input/output screen according to the present embodiment has been described. Note that, the processes shown in steps S727 to S730 of FIG. 35 may not necessarily be performed after the processes shown in steps S718 to S724, and may be implemented, for example, at the time when there is a projection instruction by a user operation.

4. Supplementation

4-1. Application of a Double Display

The Cube 1 according to an embodiment of the present disclosure will become a double display structure, when display sections 2 are fixed to each surface of a cube shaped housing which forms the Cube 1, such as shown in FIG. 1, and one of the tablet terminals 20 which has a display section 22 is detachably attached to the upper surface.

In this case, when the tablet terminal 20 has been attached, the Cube 1 can perform cooperative operations such as automatically displaying the display content, which is displayed on the display section 2 of the Cube 1, on the display section 22 of the tablet terminal 20. In this case, since the content displayed on the display section 2 can be continuously viewed with the display section 22 of the tablet terminal 20, even if the tablet terminal 20 is superimposed on the display section 2 of the Cube 1, the convenience will be improved.

Further, when the tablet terminal 20 has been detached, the Cube 1 can perform cooperative operations such as automatically displaying the display content, which is displayed on the display section 22 of the tablet terminal 20, on the display section 2 of the Cube 1. In this way, since the content displayed on the display section 22 of the tablet terminal 20 can be continuously viewed with the display section 2 of the detached surface, even if the tablet terminal 20 has been detached from the Cube 1, the convenience will be improved.

Heretofore, display control of the Cube 1, in the case of a double display structure, has been supplemented. Note that, the Cube 1 according to an embodiment of the present disclosure may not necessarily be a double display structure, and for example, may be a structure in which there is no display section 2 on the surface to which the tablet terminal 20 is detachably attached, or a structure in which the tablet terminal 20 is not able to be detached from the surface to which the display section 2 is fixed.

4-2. Application of a Multi-Surface Display

As described above in the sixth embodiment, the small-sized (palm sized) Cube 1' according to an example of the present disclosure can be held in the hand of a user and be easily operated. It is assumed that such a small-sized Cube 1' is also utilized as a mobile smart device, in addition to the utilization method described in the sixth embodiment. For example, the Cube 1' can be allowed to simultaneously display different applications on each surface. Hereinafter, a specific description will be made by referring to FIG. 37.

Figure 37:
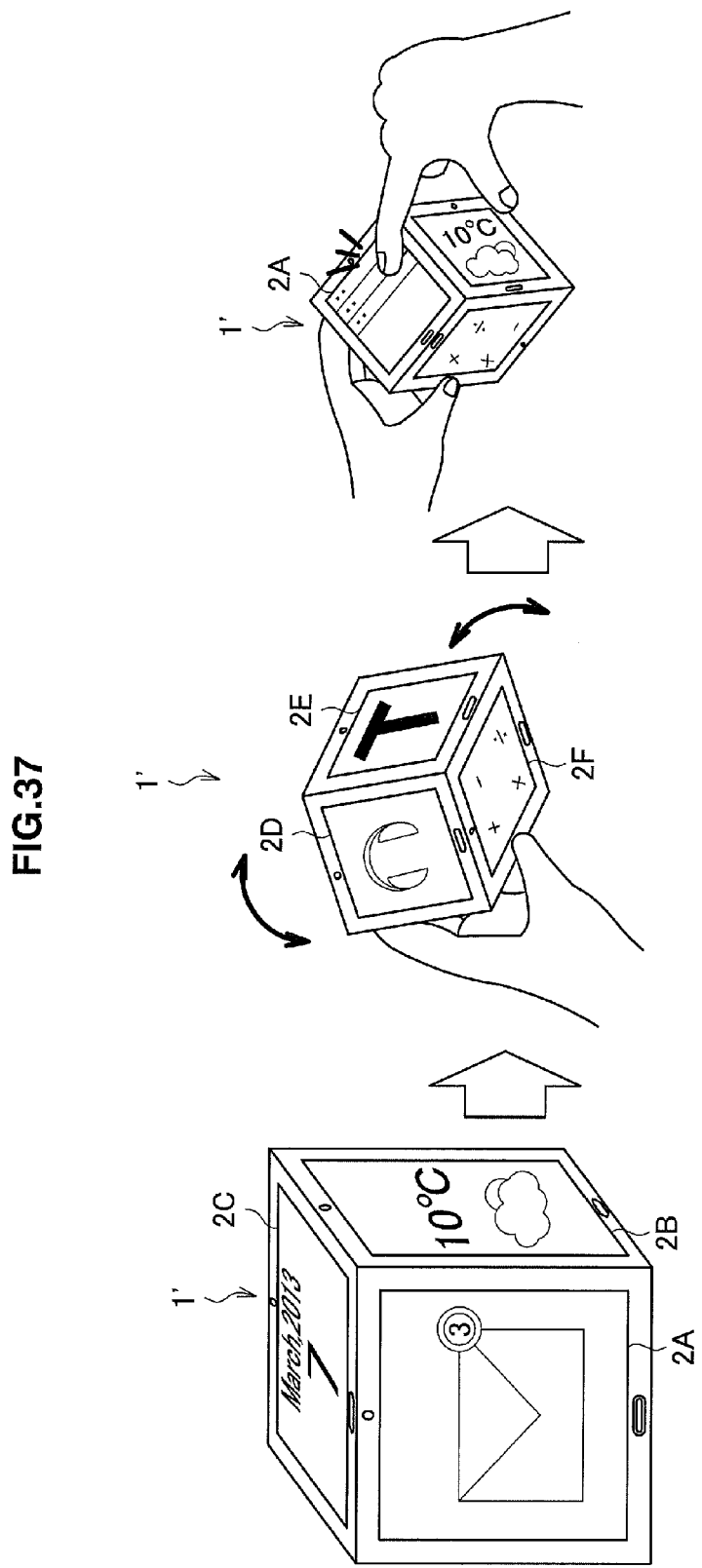
FIG. 37 is a figure for describing a case were different applications are simultaneously displayed on each surface of a small-sized Cube according to an embodiment of the present disclosure.

FIG. 37 is a figure for describing a case where the small-sized Cube 1' according to an embodiment of the present disclosure simultaneously displays different applications on each surface. As shown in the left of FIG. 37, the Cube 1' can be allowed to simultaneously display different applications on each of a plurality of display sections 2A, 2B and 2C included on each surface. Further, as shown in the center of FIG. 37, a user can move with the Cube 1' held in his or her hand, can easily visually recognize the display section 2F of the bottom surface and the display sections 2D and 2E of the opposite surfaces sides, and different applications are simultaneously displayed on each of the display sections 2F, 2D and 2E.

In addition, the display sections 2A to 2E of the Cube 1' may be touch panel displays on which touch sensors (an example of the operation section 104) are layered, and in this case, such as shown in the right of FIG. 37, can receive touch operations by a user on each surface. Further, the Cube 1' may detect touch operations by the user on one surface as individual operations for the applications deployed at this surface, or may detect the touch operations as common operations for the applications deployed at all surfaces. For example, in the case where different webpages are displayed on each of the display sections 2A to 2E of the Cube 1', when an update operation is performed as a common operation on one surface, an update process is automatically performed at all surfaces.

In this way, by allowing the small-sized Cube 1' according to an embodiment of the present disclosure to simultaneously display different applications on each surface, a plurality of display sections (multi-surface display) included on each surface can be applied, and the convenience will be improved.

Heretofore, an application method of the small-sized Cube 1' according to an embodiment of the present disclosure has been supplemented. Note that, the Cube 1' according to an embodiment of the present disclosure may not necessarily include a display section 2 on all surfaces, and for example, may include a display section 2 on at least one or more surfaces.

4-3. Combination with an Imaging Apparatus

Further, it is possible for the Cube 1 according to an embodiment of the present disclosure to perform cooperative operations with an imaging apparatus. Hereinafter, a specific description will be made by referring to FIG. 38.

FIG. 38 is a figure for describing cooperative operations of an imaging apparatus with the Cube 1 according to an embodiment of the present disclosure. As shown in the left of FIG. 38, a small-sized imaging apparatus 6 is a 360 degree camera capable of imaging in every direction, and can perform imaging without a user noticing the direction of the camera.

Next, as shown in the center of FIG. 38, when the small-sized imaging apparatus 6 is placed on the Cube 1, imaging data of the imaging apparatus 6 is automatically transmitted to the Cube 1 by proximity communication, and the Cube 1 can display the acquired imaging data on the display section 2. In this way, by placing the imaging apparatus 6 on the Cube 1, the user can enjoy viewing the imaging data captured by the imaging apparatus 6.

Further, as shown in the right of FIG. 38, the Cube 1 wirelessly connects to the television apparatus 40 which is present in the vicinity, and can allow the imaging data acquired from the imaging apparatus 6 to the transmitted and displayed on the television apparatus 40. In this way, the user can enjoy sharing the imaging data with other users.

4-4. Other

Further, the Cube 1 according to an embodiment of the present disclosure may have elastic bodies, in which strain gauges are enclosed, attached to each corner. In this case, the Cube 1 detects contact with a desk surface by the strain gauges, and can detect the current posture of the Cube 1. In this way, the Cube 1 can implement energy conservation, by switching the display section 2 of the bottom surface OFF, out of all the display sections 2 included on each surface of the Cube 1, based on the detected posture of the Cube 1. Note that, it is possible for the posture of the Cube 1 to be detected by the above described gyro sensor 114, instead of the strain gauges.

Further, by attaching elastic bodies, in which strain gauges are enclosed, to each corner of the Cube 1, the adherence of dirt or damage to the display sections 2 included on each surface of the Cube 1 can be prevented, even if the Cube 1 is placed on a desk surface or the like.

The method which prevents the adherence of dirt or damage of the display section 2 may be a method which concavely forms a protection surface included on the display sections 2, other than the above described method which attaches elastic bodies, in which strain gauges are enclosed, to each corner.

Further, the Cube 1 according to an embodiment of the present disclosure has a heat removal function which removes heat from the main body. Specifically, for example, when ducts are included in the Cube 1 for removing heat from the main body at each surface, the Cube 1 performs duct switching so as to remove heat from the opposite surface side to a surface on which operations are performed by a user.

5. Conclusion

As described above, by performing cooperative operations by communicating with nearby tablet terminals (including contact and contactless), the Cube 1 according to the embodiments of the present disclosure can implement operation controls which were not able to be envisioned by cube display devices of the related art, and can improve the convenience.

It should be understood by those skilled in the art that various modifications, combinations, sub-combinations and alterations may occur depending on design requirements and other factors insofar as they are within the scope of the appended claims or the equivalents thereof.

For example, it may not be necessary for each step in the processes executed by the Cube 1 and the tablet terminals 20 of the present disclosure to be performed in a time series process, in accordance with the order described in the sequence diagrams or flow charts. For example, each step in the processes of the Cube 1 may be performed in parallel, even if the processes are performed in an order different from the order described by the flow charts.

Further, a computer program for causing hardware, such as a CPU, ROM and RAM built into the Cube 1, the tablet terminals 20 or the server 30, to exhibit functions similar to the configurations of each of the above described Cube 1, tablet terminals 20 or server 30 can be created. Further, a storage medium having this computer program stored therein can also be provided.

Additionally, the present technology may also be configured as below.

(1) An information processing apparatus including:
  a housing which has a polyhedron shape and includes at least one surface on which an output section is provided;
  a communication section which communicates with at least one mobile terminal; and
  a control section which performs output control from the output section in cooperation with the mobile terminal by communicating with the mobile terminal.

(2) The information processing apparatus according to (1),
  wherein the polyhedron shape is a cube shape.

(3) The information processing apparatus according to (1) or (2),
  wherein the output section is a display section or an audio output section fixed to each surface of the housing having the polyhedron shape, or is a display section or an audio output section of the mobile terminal detachably provided on each surface.

(4) The information processing apparatus according to any one of (1) to (3),
  wherein the communication section detects that the mobile terminal is nearby, by receiving information transmitted from the mobile terminal, and
  wherein, in a case where the mobile terminal is nearby, the control section performs control in a manner that content corresponding to information transmitted from the mobile terminal is output from the output section.

(5) The information processing apparatus according to (4),
  wherein the content corresponding to the information transmitted from the mobile terminal is a message for an owner of the mobile terminal or a webpage bookmarked in advance in the mobile terminal.

(6) The information processing apparatus according to any one of (1) to (5),
  wherein the control section performs control in a manner that wireless power supply is performed on the mobile terminal which comes closer to the information processing apparatus.

(7) The information processing apparatus according to any one of (1) to (6),
  wherein, in a case where the mobile terminal attached to the surface has been detached, the control section performs control in a manner that an input screen is displayed on a display section of the mobile terminal, and performs control so that an output screen which outputs information input from the input screen is displayed on the display section provided on each surface of the housing having the polyhedron shape.

(8) The information processing apparatus according to (7),
  wherein the control section performs control in a manner that the output screen is displayed from an external display device or is projected from a projection section provided in the information processing apparatus in accordance with an enlarged display instruction by a user.

(9) The information processing apparatus according to any one of (1) to (8),
  wherein the communication section receives at least one piece of identification information corresponding to the at least one mobile terminal attached to the surface, and
  wherein the control section performs control in a manner that content based on the received piece of identification information is displayed on a display section of the at least one mobile terminal attached to the surface.

(10) The information processing apparatus according to (9),
  wherein the control section performs control in a manner that content based on a position relation of the respective surfaces to which the plurality of mobile terminals are attached, and the identification information of the mobile terminals, is displayed on the display sections of the plurality of mobile terminals.

(11) The information processing apparatus according to any one of (1) to (10), further including:
  an operation section which detects a user operation on each surface of the housing having the polyhedron shape,
  wherein the control section stores each surface of the housing having the polyhedron shape and identification information corresponding to the mobile terminal in association, and controls communication with the mobile terminal shown by the identification information associated with a surface on which a call operation is detected by the operation section.

(12) The information processing apparatus according to any one of (1) to (11), further including:
  at least one imaging section which captures a surrounding of the information processing apparatus,
  wherein the control section performs control in a manner that a security mode using a captured image captured by the imaging section is executed in accordance with a result of communication with the mobile terminal.

(13) The information processing apparatus according to (12),
  wherein the at least one imaging section includes a plurality of imaging sections provided on the respective surfaces of the housing having the polyhedron shape, or includes one imaging section which is provided inside the housing having the polyhedron shape and captures an outer direction of each surface.

(14) The information processing apparatus according to (12) or (13),
  wherein, in a case where the mobile terminal is not present around the information processing apparatus, the control section performs control in a manner that execution of the security mode is started.

(15) The information processing apparatus according to any one of (12) to (14),
  wherein the security mode is a storage mode for storing a captured image captured by the imaging section in a storage section.

(16) The information processing apparatus according to any one of (12) to (15),
  wherein the security mode is a transmission mode for transmitting a captured image captured by the imaging section to the mobile terminal.

(17) The information processing apparatus according to (16),
  wherein a range of captured images to be transmitted to the mobile terminal changes in accordance with an instruction from the mobile terminal.

(18) The information processing apparatus according to any one of (12) to (17),
  wherein the security mode is a security alarm mode for issuing a prescribed notification in accordance with a detection result of an external condition.

(19) The information processing apparatus according to any one of (12) to (18), wherein the security mode is an optical camouflage mode which displays a captured image of an opposite surface side direction on a display section provided on each surface of the housing having the polyhedron shape.

(20) A non-transitory computer-readable storage medium having a program stored therein, the program causing a computer to function as:
 a communication section which communicates with a mobile terminal; and
 a control section which performs output control from an output section, the output section being provided on a housing which has a polyhedron shape and includes at least one surface, in cooperation with the mobile terminal by communicating with the mobile terminal.

(21) A control method including the steps of:
 communicating with a mobile terminal; and
 performing output control from an output section, the output section being provided on a housing which has a polyhedron shape and includes at least one surface, in cooperation with the mobile terminal by communicating with the mobile terminal.

What is claimed is:

1. An information processing apparatus comprising:
 a housing which has a polyhedron shape and includes at least one surface on which an output section is provided;
 a communication section which communicates with at least one mobile terminal; and
 a control section which performs output control from the output section in cooperation with the mobile terminal by communicating with the mobile terminal,
 wherein in a case where the communication section detects that the mobile terminal is nearby to the information processing apparatus, the control section controls the output section to output content.

2. The information processing apparatus according to claim 1, wherein the polyhedron shape is a cube shape.

3. The information processing apparatus according to claim 1, wherein the output section is a display section or an audio output section fixed to each surface of the housing having the polyhedron shape, or is a display section or an audio output section of the mobile terminal detachably provided on each surface.

4. The information processing apparatus according to claim 1, wherein the communication section detects that the mobile terminal is nearby, by receiving information transmitted from the mobile terminal, and
 wherein, in a case where the mobile terminal is nearby, the control section performs control in a manner that the content corresponding to information transmitted from the mobile terminal is output from the output section.

5. The information processing apparatus according to claim 4, wherein the content corresponding to the information transmitted from the mobile terminal is a message for an owner of the mobile terminal or a webpage bookmarked in advance in the mobile terminal.

6. The information processing apparatus according to claim 1, wherein the control section performs control in a manner that wireless power supply is performed on the mobile terminal which comes closer to the information processing apparatus.

7. The information processing apparatus according to claim 1, wherein, in a case where the mobile terminal attached to the surface has been detached, the control section performs control in a manner that an input screen is displayed on a display section of the mobile terminal, and performs control so that an output screen which outputs information input from the input screen is displayed on the display section provided on each surface of the housing having the polyhedron shape.

8. The information processing apparatus according to claim 7, wherein the control section performs control in a manner that the output screen is displayed from an external display device or is projected from a projection section provided in the information processing apparatus in accordance with an enlarged display instruction by a user.

9. The information processing apparatus according to claim 1,
 wherein the communication section receives at least one piece of identification information corresponding to the at least one mobile terminal attached to the surface, and
 wherein the control section performs control in a manner that content based on the received piece of identification information is displayed on a display section of the at least one mobile terminal attached to the surface.

10. The information processing apparatus according to claim 9, wherein the control section performs control in a manner that content based on a position relation of respective surfaces to which a plurality of mobile terminals are attached, and the identification information of the plurality of mobile terminals, is displayed on the display sections of the plurality of mobile terminals.

11. The information processing apparatus according to claim 1, further comprising:
 an operation section which detects a user operation on each surface of the housing having the polyhedron shape,
 wherein the control section stores each surface of the housing having the polyhedron shape and identification information corresponding to the mobile terminal in association, and controls communication with the mobile terminal shown by the identification information associated with a surface on which a call operation is detected by the operation section.

12. The information processing apparatus according to claim 1, further comprising:
 at least one imaging section which captures a surrounding of the information processing apparatus,
 wherein the control section performs control in a manner that a security mode using a captured image captured by the imaging section is executed in accordance with a result of communication with the mobile terminal.

13. The information processing apparatus according to claim 12, wherein the at least one imaging section includes a plurality of imaging sections provided on the respective surfaces of the housing having the polyhedron shape, or includes one imaging section which is provided inside the housing having the polyhedron shape and captures an outer direction of each surface.

14. The information processing apparatus according to claim 12, wherein, in a case where the mobile terminal is not present around the information processing apparatus, the control section performs control in a manner that execution of the security mode is started.

15. The information processing apparatus according to claim 12, wherein the security mode is a storage mode for storing the captured image captured by the imaging section in a storage section.

16. The information processing apparatus according to claim 12, wherein the security mode is a transmission mode for transmitting the captured image captured by the imaging section to the mobile terminal.

17. The information processing apparatus according to claim 16, wherein a range of captured images to be transmitted to the mobile terminal changes in accordance with an instruction from the mobile terminal.

18. The information processing apparatus according to claim 12, wherein the security mode is a security alarm mode for issuing a prescribed notification in accordance with a detection result of an external condition.

19. The information processing apparatus according to claim 12, wherein the security mode is an optical camouflage mode which displays a captured image of an opposite surface side direction on a display section provided on each surface of the housing having the polyhedron shape.

20. A non-transitory computer-readable storage medium having stored thereon, a set of computer-executable instructions that when executed by a computer causes the computer to perform steps comprising:
- in an information processing apparatus:
    - communicating with a mobile terminal via a communication section;
    - performing output control from an output section, the output section being provided on a housing which has a polyhedron shape and includes at least one surface, in cooperation with the mobile terminal by communicating with the mobile terminal; and
    - controlling the output section to output content in the case where the communication section detects that the mobile terminal is nearby to the information processing apparatus.

* * * * *